(12) United States Patent
Gallagher et al.

(10) Patent No.: US 7,537,065 B2
(45) Date of Patent: May 26, 2009

(54) ANGLE GRINDER

(75) Inventors: William Gallagher, Shrewsbury, PA (US); David W. Weiford, Parkville, MD (US); William Goddard, Shrewsbury, PA (US); Eric Hatfield, Owings Mills, MD (US)

(73) Assignee: Black & Decker Inc., Newark, DE (US)

( * ) Notice: Subject to any disclaimer, the term of this patent is extended or adjusted under 35 U.S.C. 154(b) by 1176 days.

(21) Appl. No.: 10/339,634

(22) Filed: Jan. 9, 2003

(65) Prior Publication Data

US 2003/0190877 A1 Oct. 9, 2003

Related U.S. Application Data

(60) Provisional application No. 60/347,426, filed on Jan. 10, 2002.

(51) Int. Cl.
*B23B 45/02* (2006.01)
(52) U.S. Cl. .................. 173/170; 173/216; 173/217
(58) Field of Classification Search ................ 173/170, 173/216, 217, 218, 169; 408/124
See application file for complete search history.

(56) References Cited

U.S. PATENT DOCUMENTS

| | | |
|---|---|---|
| 870,220 A | 11/1907 | Brooks |
| 1,548,020 A | 8/1925 | Black et al. |
| 1,554,861 A | 9/1925 | Leverich |
| 1,920,269 A | 8/1933 | Murphy |
| 1,937,586 A | 12/1933 | Ortt |
| 2,070,718 A | 2/1937 | Ehrlich |
| 2,123,222 A | 7/1938 | Albertson |
| 2,155,082 A * | 4/1939 | Decker .................. 173/217 |
| 2,173,339 A | 9/1939 | Myers |
| 2,238,096 A | 4/1941 | Baker et al. |
| 2,267,781 A | 12/1941 | Albertson |
| 2,290,215 A | 7/1942 | Stenberg |
| 2,366,079 A | 12/1944 | Wilson |
| 2,461,628 A | 2/1949 | Chadwick |

(Continued)

FOREIGN PATENT DOCUMENTS

DE 2816398 4/1978

(Continued)

OTHER PUBLICATIONS

J. Do Huu Duc, Partial European Search Report on Application No. EP03000261, Apr. 29, 2003, The Hague, European Patent Office.

(Continued)

*Primary Examiner*—Rinaldi I. Rada
*Assistant Examiner*—Nathaniel Chukwurah
(74) *Attorney, Agent, or Firm*—Harness, Dickey & Pierce, P.L.C.

(57) ABSTRACT

An angle grinder is provided including a rotating handle configuration allowing the handle of the angle grinder to be locked in different positions relative to the angle grinder housing. A switch mounting configuration is provided for simplifying the assembly of the switch device. A gear wheel lock mechanism is also provided to allow the grinding wheel spindle to be prevented from rotating during removal or installation of a grinding wheel on the spindle. A gear case cooling and air bleed arrangement are also provided.

6 Claims, 29 Drawing Sheets

U.S. PATENT DOCUMENTS

| | | | |
|---|---|---|---|
| 2,785,515 A | 3/1957 | Sansig | |
| 2,838,701 A | 6/1958 | Kuhagen | |
| 2,946,315 A | 7/1960 | Doeden | |
| 3,036,839 A | 5/1962 | Williamson, Jr. | |
| 3,244,203 A | 4/1966 | Leydig et al. | |
| 3,699,825 A | 10/1972 | Misuraca | |
| 3,845,336 A | 10/1974 | Moores, Jr. et al. | |
| 3,899,852 A | 8/1975 | Batson | |
| 4,125,968 A | 11/1978 | Mackey | |
| 4,184,577 A | 1/1980 | Miller | |
| 4,346,793 A | 8/1982 | Fuse et al. | |
| 4,381,037 A | 4/1983 | Cuneo | |
| 4,434,586 A | 3/1984 | Muller et al. | |
| 4,467,896 A | 8/1984 | Sauerwein et al. | |
| 4,597,227 A | 7/1986 | Gentischer et al. | |
| 4,637,170 A | 1/1987 | Block | |
| 4,690,252 A | 9/1987 | Kottke et al. | |
| 4,779,382 A | 10/1988 | Rudolf et al. | |
| 4,785,540 A | 11/1988 | Arvidsson | |
| 4,850,154 A | 7/1989 | Grammer et al. | |
| RE33,335 E | 9/1990 | Gentisher et al. | |
| 4,974,325 A | 12/1990 | Hartlein | |
| 4,980,994 A | 1/1991 | Helm et al. | |
| 4,989,374 A | 2/1991 | Rudolf et al. | |
| 5,022,188 A | 6/1991 | Borst | |
| 5,058,909 A | 10/1991 | Rudolf et al. | |
| 5,065,476 A | 11/1991 | Dohse et al. | |
| 5,113,951 A * | 5/1992 | Houben et al. | 173/75 |
| 5,157,873 A | 10/1992 | Rudolf et al. | |
| 5,199,223 A | 4/1993 | Rudolf et al. | |
| 5,201,146 A | 4/1993 | Fushiya | |
| 5,259,145 A | 11/1993 | Fushiya et al. | |
| 5,263,283 A | 11/1993 | Rudolf et al. | |
| 5,339,572 A | 8/1994 | Eicher | |
| 5,407,381 A | 4/1995 | Schaefer et al. | |
| 5,464,365 A | 11/1995 | Kirn | |
| 5,466,183 A | 11/1995 | Kirn et al. | |
| 5,558,571 A | 9/1996 | Toyoshima et al. | |
| 5,567,100 A | 10/1996 | Nakamura | |
| 5,601,483 A | 2/1997 | Rudolf et al. | |
| 5,681,214 A | 10/1997 | Kleider et al. | |
| 5,704,257 A | 1/1998 | Kottke et al. | |
| 5,778,649 A | 7/1998 | Losdahl et al. | |
| 5,871,322 A | 2/1999 | Nakamura | |
| 5,967,243 A * | 10/1999 | Jacobsson | 173/216 |
| 6,109,366 A * | 8/2000 | Jansson et al. | 173/216 |
| 6,293,859 B1 | 9/2001 | Fink et al. | |
| 6,327,961 B1 | 12/2001 | Rozek | |
| 6,461,088 B2 * | 10/2002 | Potter et al. | 408/124 |
| 6,810,970 B1 * | 11/2004 | Kraenzler et al. | 173/217 |

FOREIGN PATENT DOCUMENTS

| | | |
|---|---|---|
| DE | 2816485 | 10/1979 |
| DE | 3120871 C2 | 5/1981 |
| DE | 3018774 C2 | 11/1981 |
| DE | 3114906 A1 | 10/1982 |
| DE | 3902874 C2 | 2/1989 |
| DE | G9107823.7 | 6/1991 |
| DE | 40 36 354 A1 | 5/1992 |
| DE | 4336620 C2 | 10/1993 |
| DE | 4344128 A1 | 12/1993 |
| DE | 4432973 A1 | 9/1994 |
| DE | 4332986 C2 | 3/1995 |
| DE | 4422247 A1 | 1/1996 |
| DE | 19650364 A1 | 12/1996 |
| DE | 19532299 C2 | 3/1997 |
| DE | 19752810 A1 | 11/1997 |
| DE | 19821145 A1 | 5/1998 |
| EP | 0261374 A1 | 8/1987 |
| EP | 0319813 B1 | 11/1988 |
| EP | 0345896 A2 | 12/1989 |
| EP | 0495181 B1 | 11/1991 |
| EP | 0569361 B1 | 11/1991 |
| EP | 0521259 B1 | 5/1992 |
| EP | 0493033 | 7/1992 |
| EP | 0650805 A1 | 8/1994 |
| EP | 0380974 B2 | 4/1997 |
| IT | 609607 | 9/1960 |
| JP | 58-13953 | 1/1983 |
| JP | 61-100381 | 5/1986 |
| JP | 62-124882 | 6/1987 |
| JP | 1-64373 | 4/1989 |
| SU | 1404304 A | 3/1986 |
| WO | WO97/25542 | 7/1997 |
| WO | WO98/25034 | 6/1998 |

OTHER PUBLICATIONS

J. Do Huu Duc, Annex to the European Search Report on Application No. EP03000261, Apr. 29, 2003.

US 4,941,292, 07/1990, Rudolf et al. (withdrawn)

\* cited by examiner

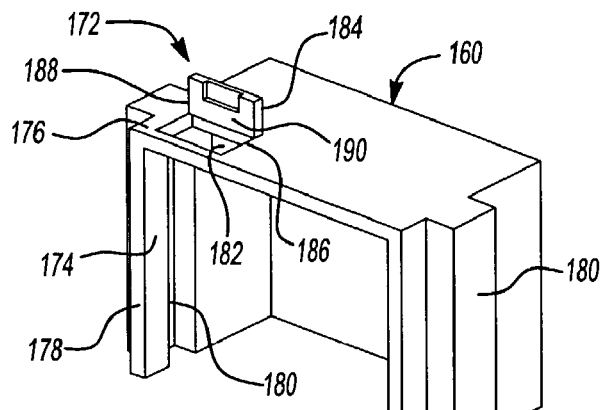
Fig-10
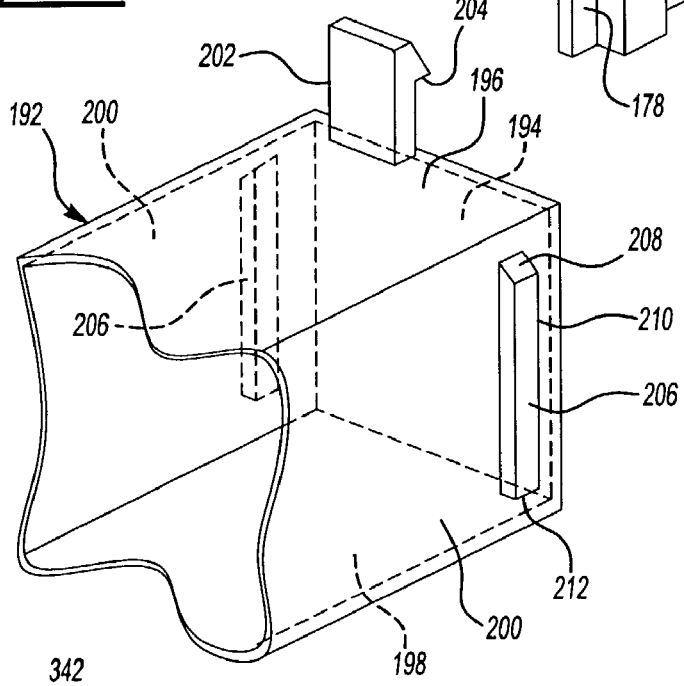
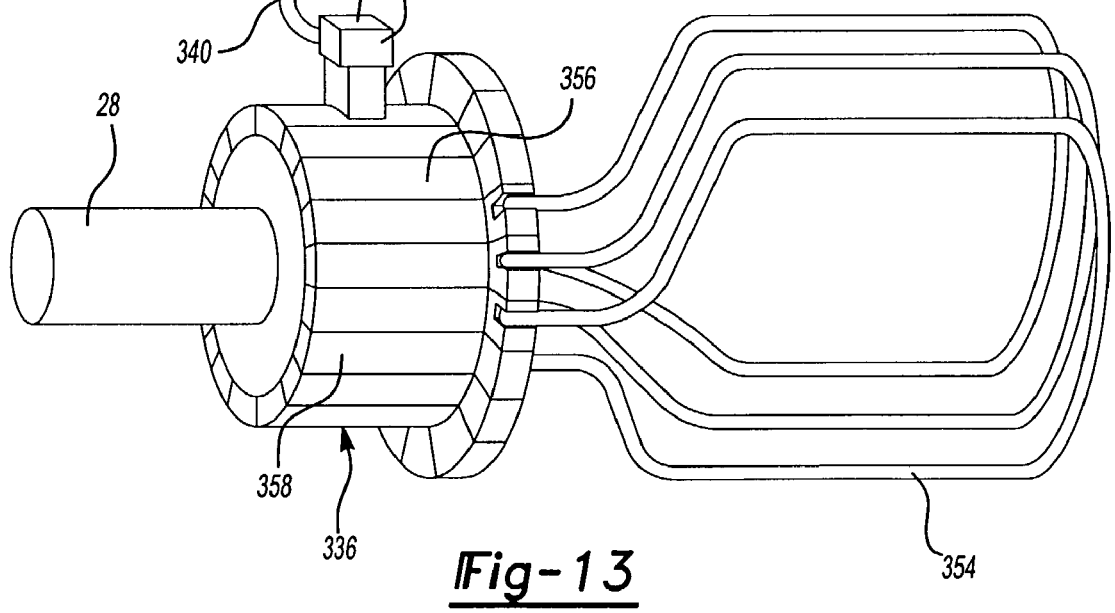
Fig-13

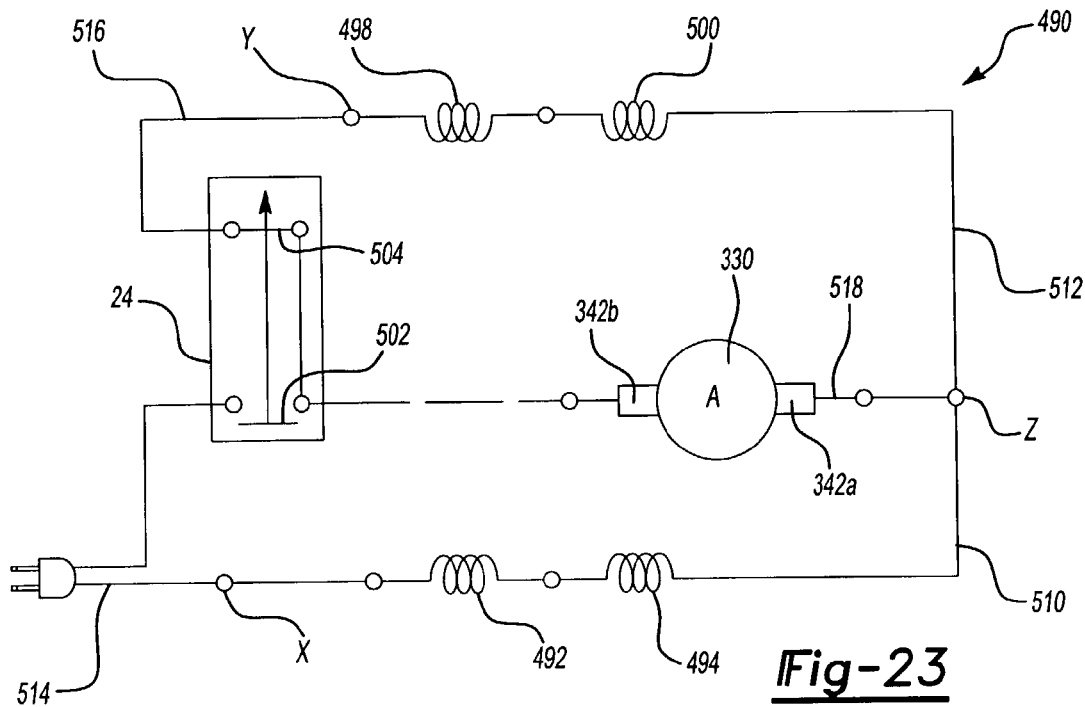
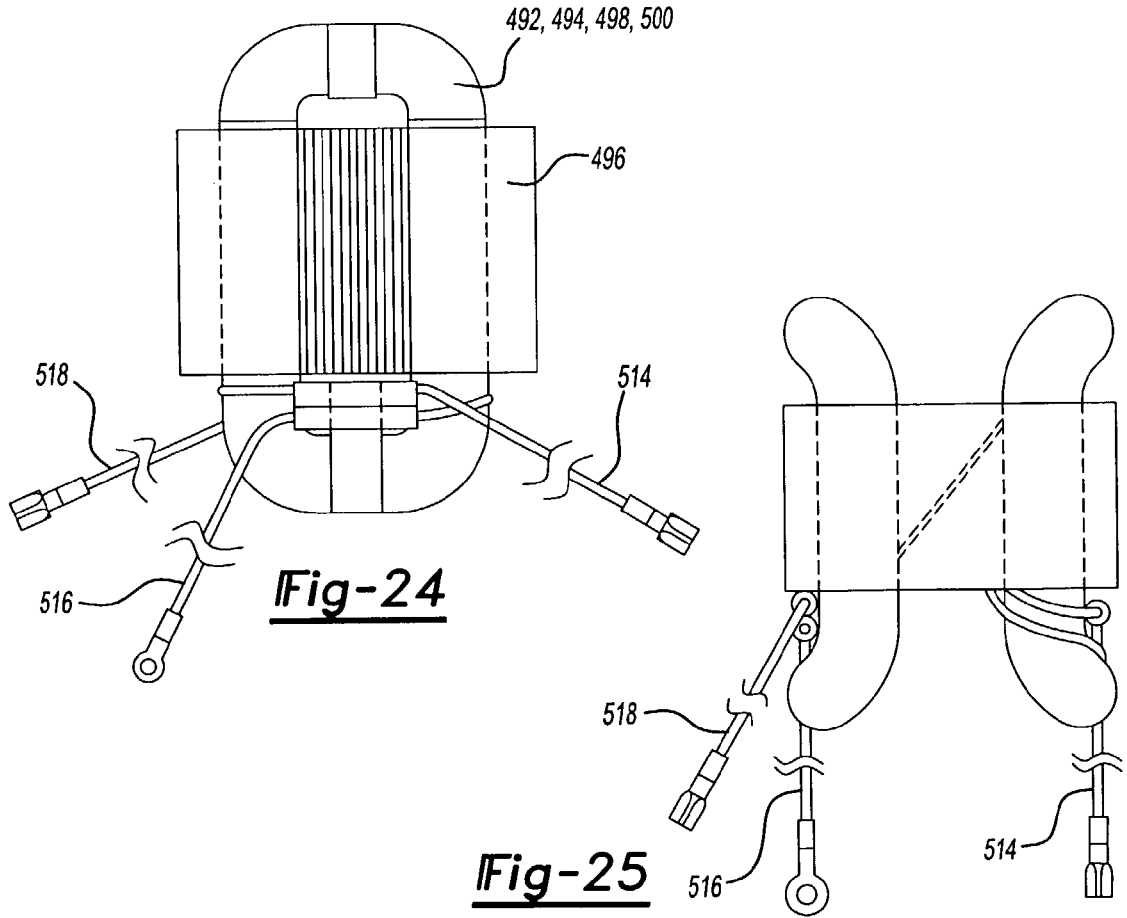

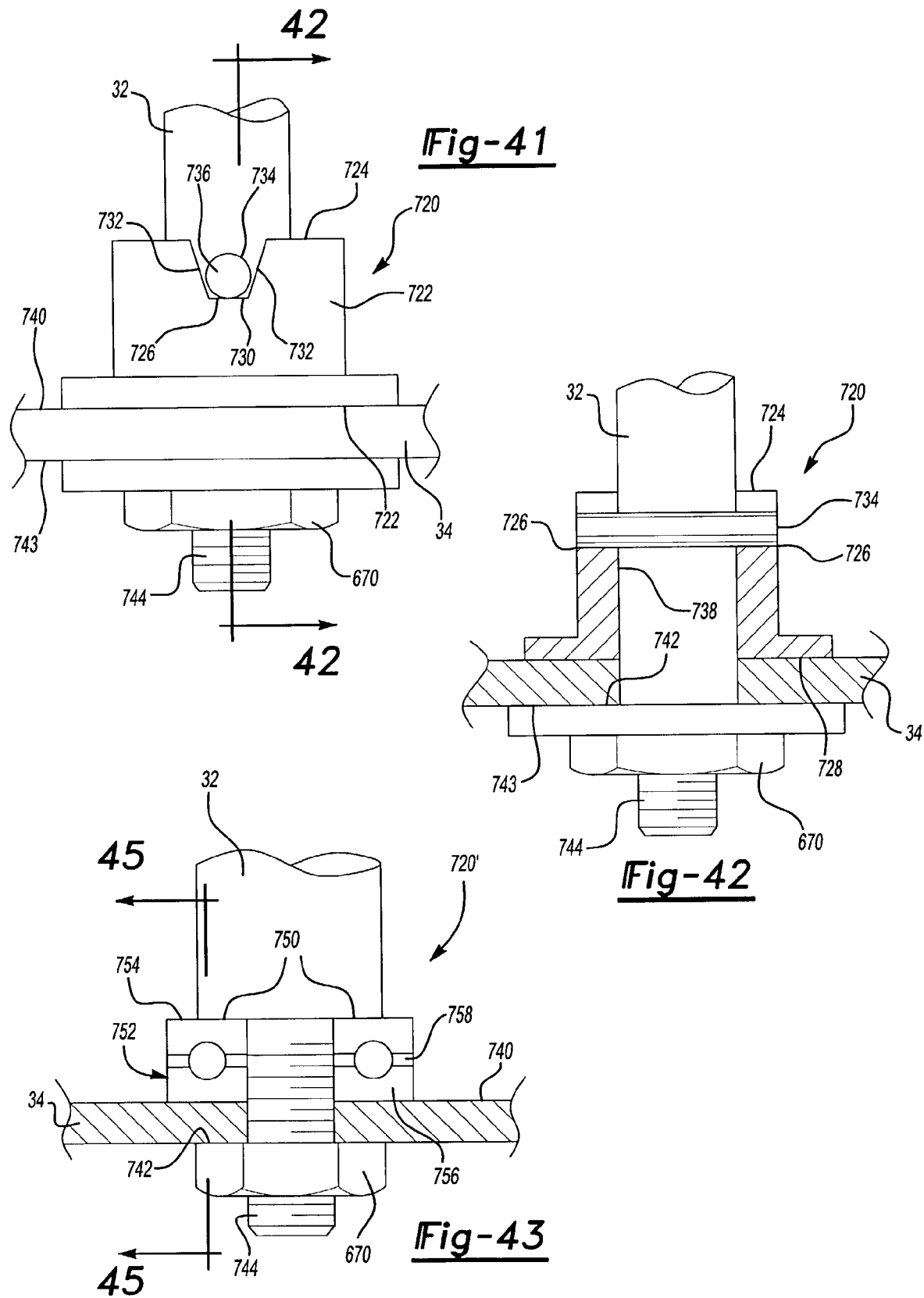

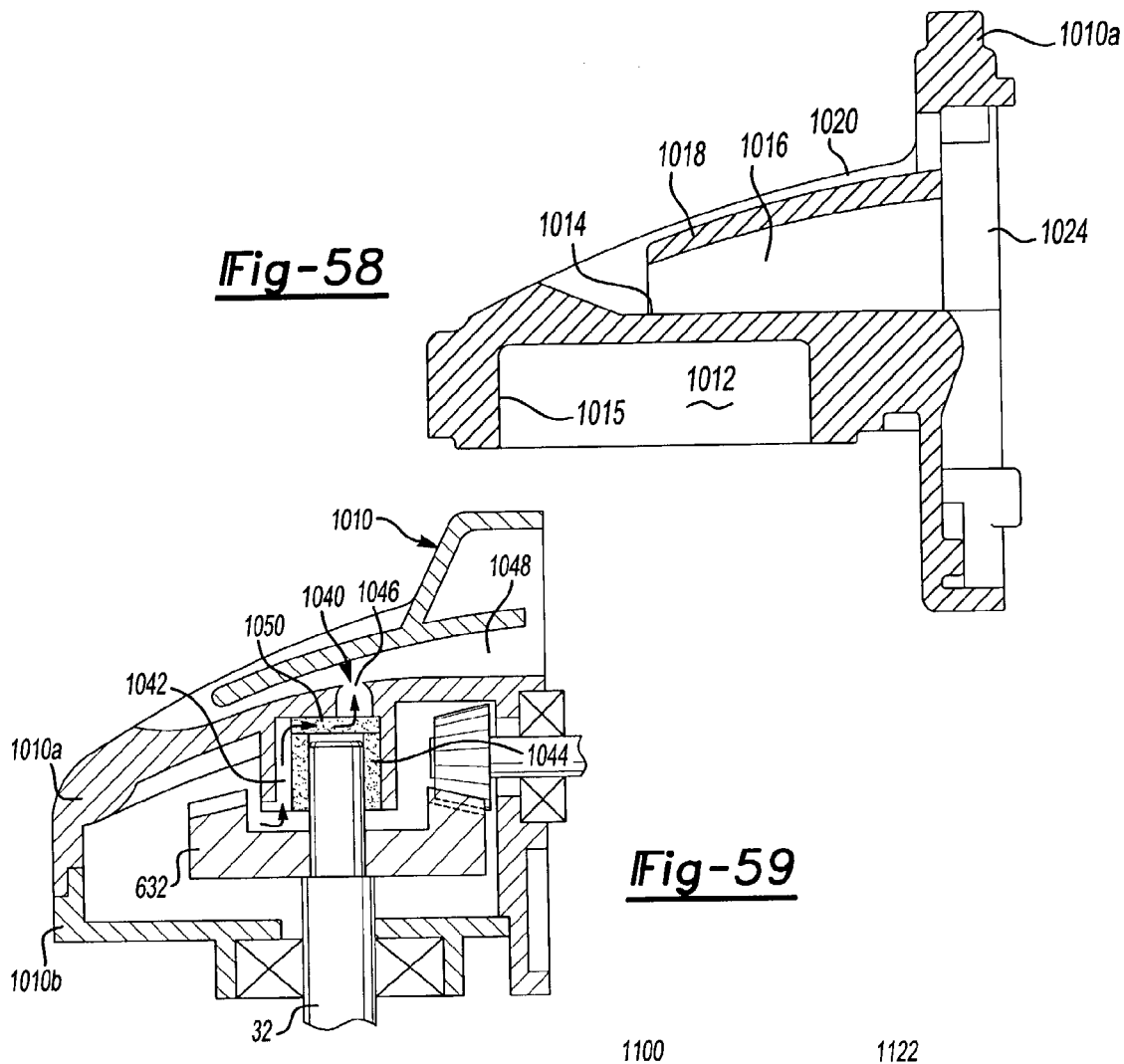
Fig-58
Fig-59
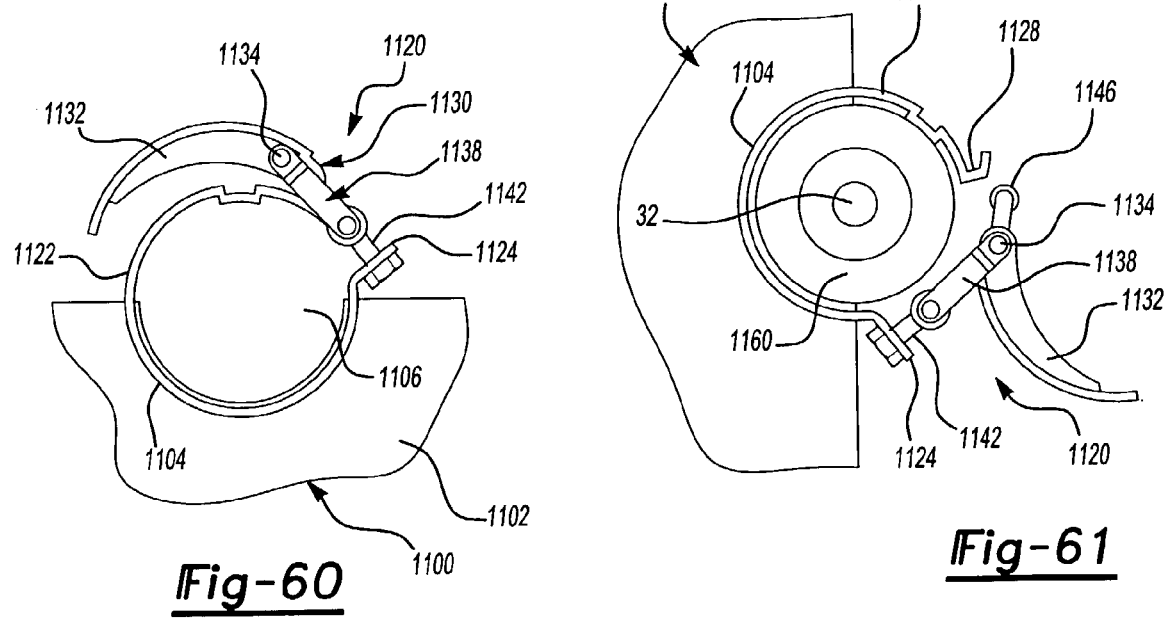
Fig-60
Fig-61

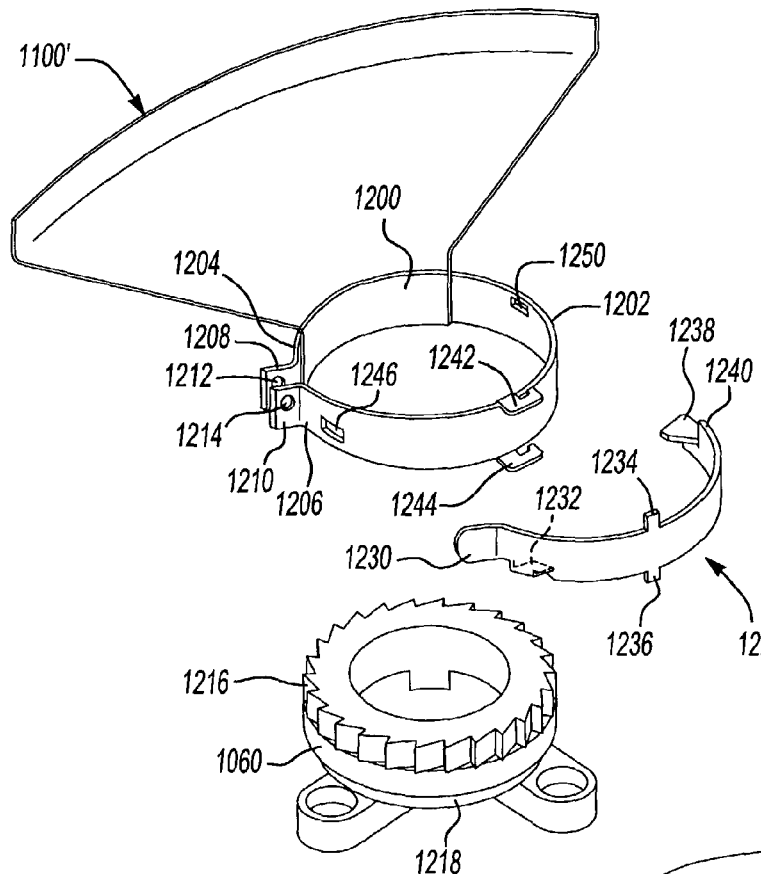
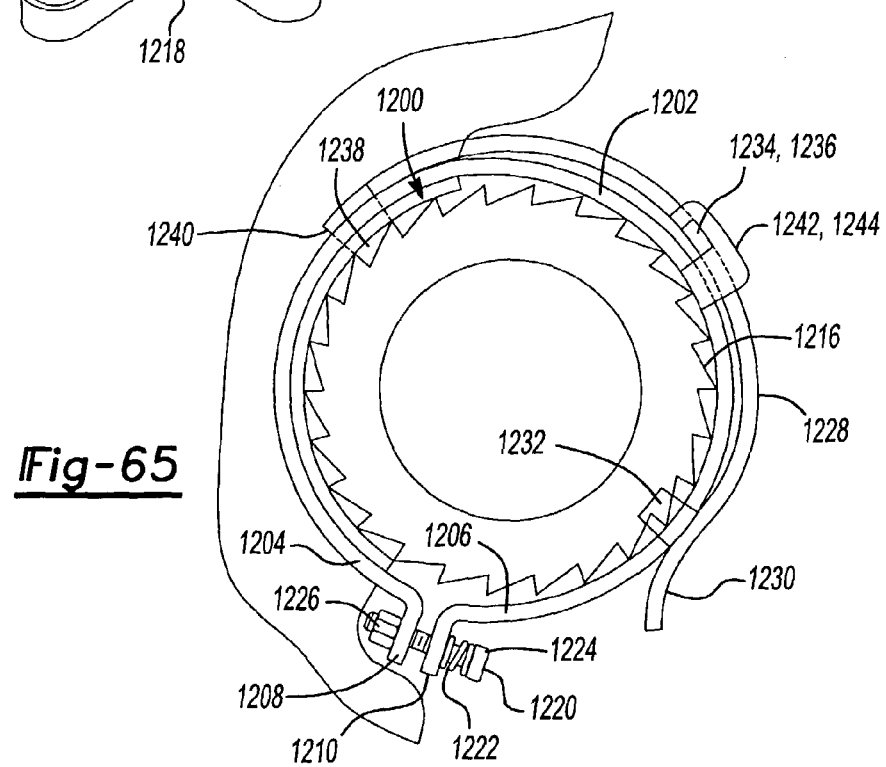
Fig-64
Fig-65

ANGLE GRINDER

CROSS-REFERENCE TO RELATED APPLICATIONS

This application claims the benefit of U.S. Provisional Application No. 60/347,426, filed on Jan. 10, 2002. The disclosure of the above application is incorporated herein by reference in its entirety.

FIELD OF THE INVENTION

The present invention generally relates to angle grinders, and generally describes various features of a large angle grinder (LAG). It will be appreciated, however, that other angle grinders are known in the art, including medium angle grinders (MAG) and small angle grinders (SAG). Therefore, it will be further appreciated that each of the herein described features may be readily adapted for use with a LAG, MAG, and/or SAG.

BACKGROUND AND SUMMARY OF THE INVENTION

Angle grinding tools are commonly used for grinding and sanding applications. Angle grinders include a rotary shaft for driving a grinding wheel mounted thereon. The present application describes several improvements for angle grinders.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a perspective view of an interconnection mechanism for the switch carrier mounting system;

FIG. 13 is a perspective schematic view of components of a motor according to an embodiment of the present invention;

FIG. 23 is a schematic illustration of a preferred field winding arrangement;

FIG. 24 is side view of the field winding arrangement;

FIG. 25 is a cross-sectional view of the field winding arrangement;

FIG. 41 is a side view of a keyless blade clamp;

FIG. 42 is a cross-sectional view of the keyless blade clamp of FIG. 41 taken along line 42-42;

FIG. 43 is a side cross-sectional view of an alternative embodiment of a keyless blade clamp;

FIG. 58 is a cross-sectional view of a portion of a double wall gear case;

FIG. 59 is a cross-sectional view of the complete double wall gear case, detailing internal components of the gear case;

FIG. 60 is a plan view of an adjustable wheel guard in a latched position;

FIG. 61 is a plan view of the adjustable wheel guard of FIG. 60 in an unlatched position;

FIG. 64 is an exploded perspective view of another alternative embodiment of an adjustable wheel guard;

FIG. 65 is a plan view of the adjustable wheel guard of FIG. 64;

DETAILED DESCRIPTION

Figure 1:
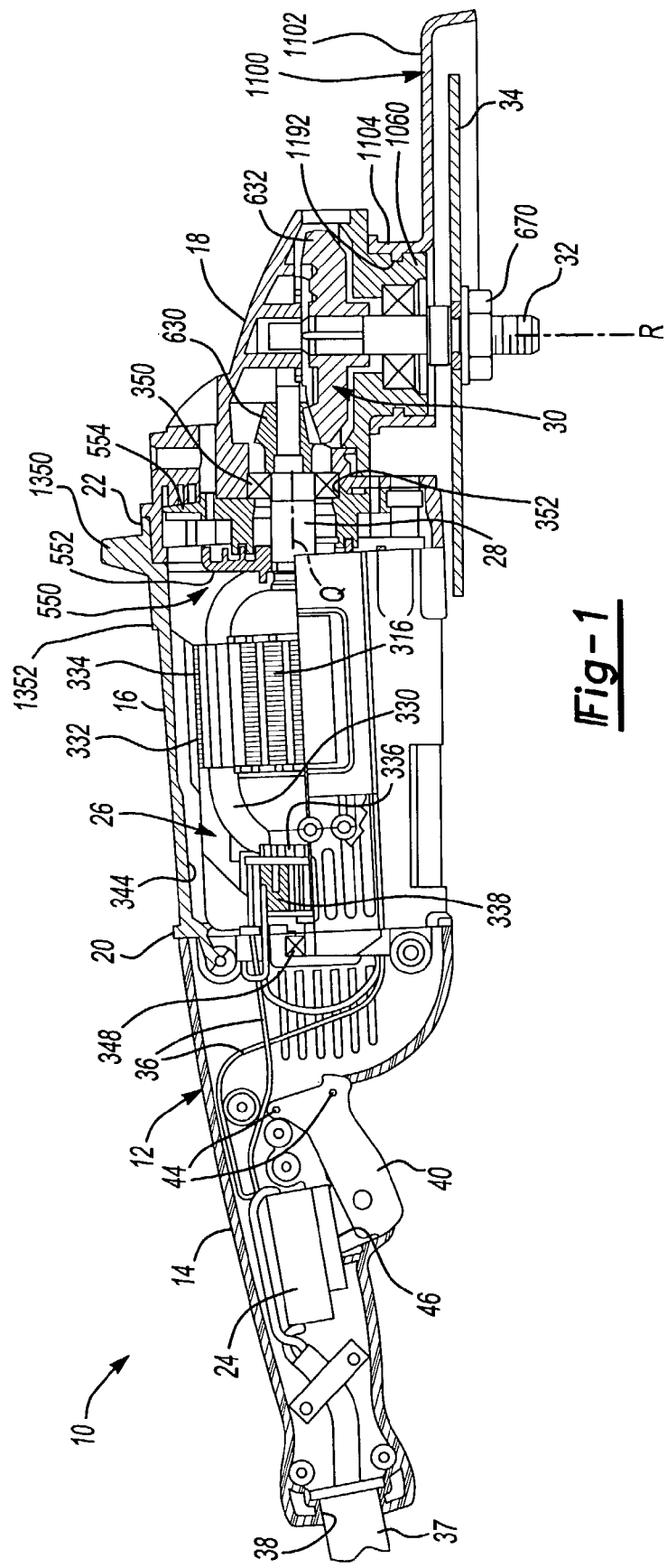
FIG. 1 is a side, partial cross-sectional view of a large angle grinder according to the principles of the present invention.

With reference to FIG. 1, a large angle grinder (LAG) 10 is shown. The LAG 10 includes a housing 12 having a handle portion 14, a field case 16 and a gear case 18. The handle portion 14 is preferably fixedly attached to a first end 20 of the field case 16 and the gear case 18 is preferably fixedly attached to a second end 22 of the field case 16. The handle portion 14 preferably supports a switch 24 and associated components. The field case 16 supports a motor 26 having a motor spindle 28 that extends into the gear case 18 for driving a gearset 30 supported therein. A wheel spindle 32 preferably extends from the gear case 18 and is driven by the motor spindle 28 through the gearset 30. The axis of rotation of the motor spindle 28 is generally perpendicular to the axis of rotation of the wheel spindle 32. A grinder wheel 34 is selectively attachable to the wheel spindle 32 and is rotatably driven thereby.

The motor 26 is in electrical communication with the switch 24 through wires 36. The switch 24 is further in electrical communication with a power source via a cord 37 including a plug (not shown). The handle portion 14 preferably includes an opening 38, opposite the connection end, through which the cord 37 runs. A trigger 40 is in mechanical communication with the switch 24 for selectively supplying power to the motor 26. The trigger 40 may be pivotably supported at a pivot point 44, within the handle portion 14. The trigger 40 preferably includes a bracket 46 that engages with the switch 24. In a first position, the trigger 40 operates the switch 24 to OFF. Depression of the trigger 40 toward the handle portion 14 operates the switch 24 to ON, thus initiating operation of the LAG 10.

Handle

Figure 2:
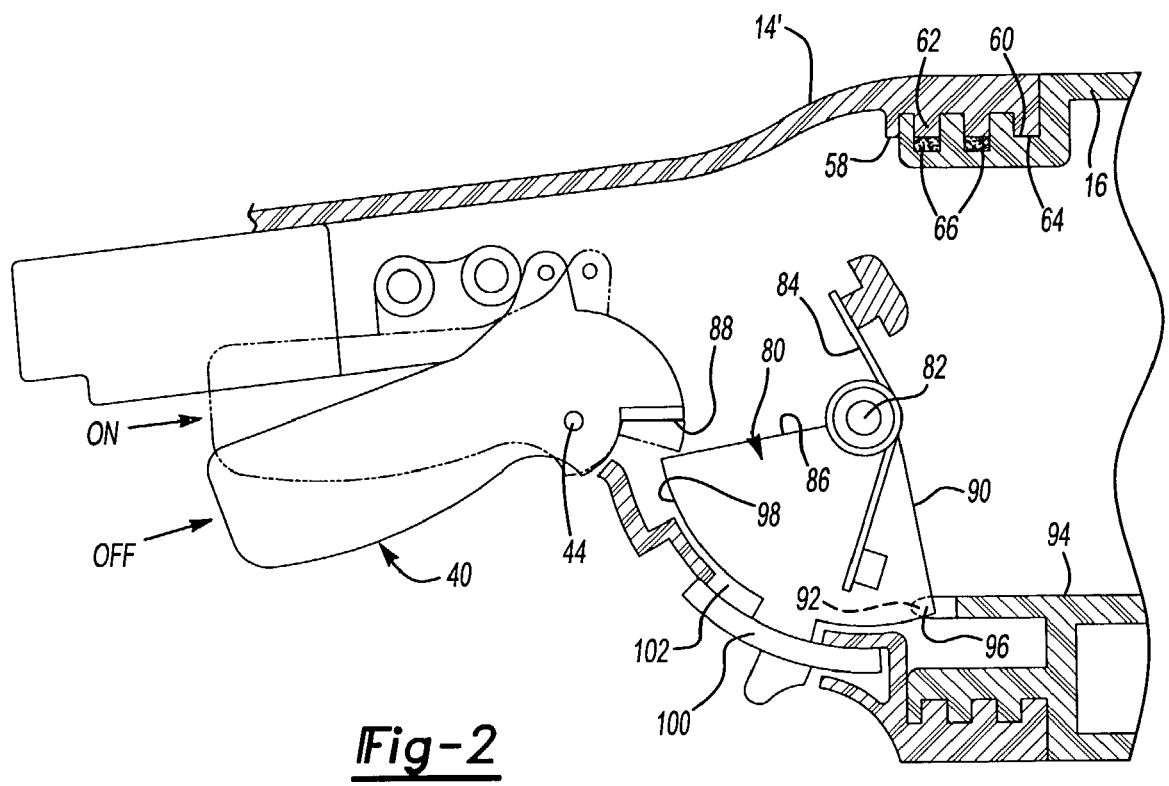
FIG. 2 is a cross-sectional view of a rotatable handle having a handle lock in an engaged position.
Figure 3:
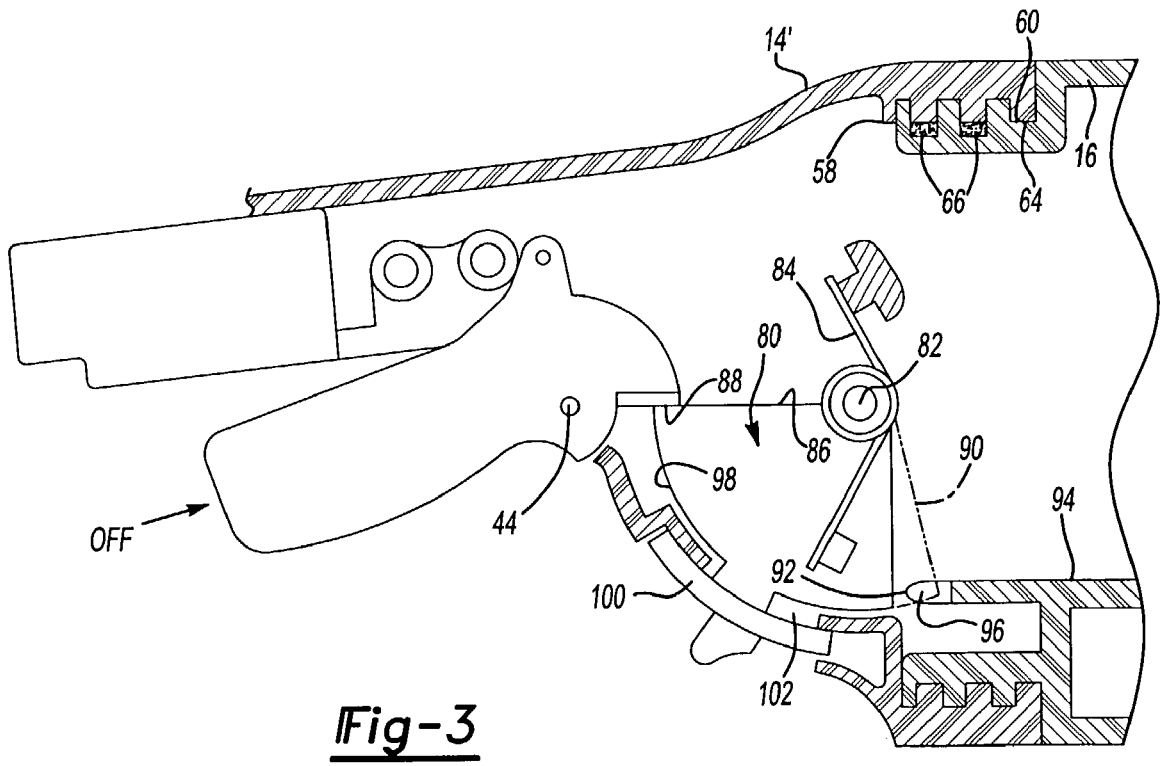
FIG. 3 is a cross-sectional view of the handle lock in a disengaged position.
Figure 4:
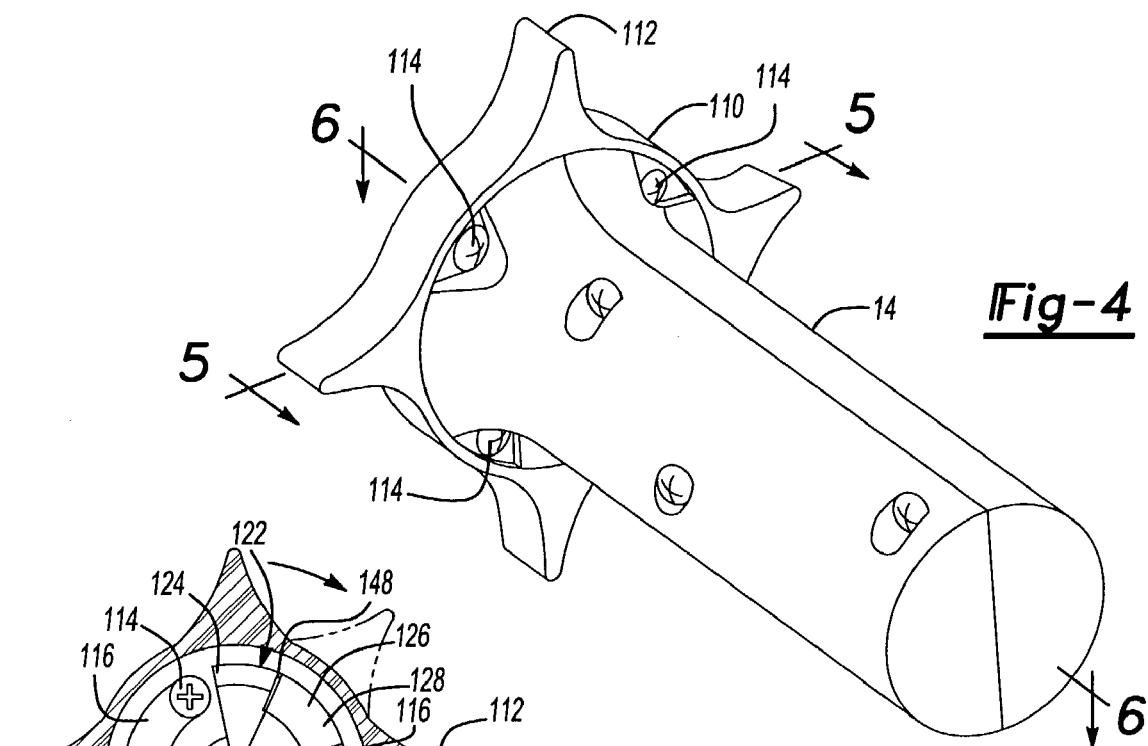
FIG. 4 is a perspective view of a rotating trigger switch for a large angle grinder.

In an exemplary embodiment, shown in FIGS. 2 and 3 the handle portion, designated as 14', is rotatably connected to the field case 16. The interconnection between the field case 16 and the handle portion 14' is a lip/groove-type connection. The connection end of the handle portion 14' includes an opening 58 that is generally of a larger diameter than the outside diameter of the connection end of the field case 16, which is partially received into the handle portion 14'. The field case 16 includes a plurality of grooves 60 that receive a plurality of tabs or lips 62 disposed around the internal circumference of the handle portion 14'. The lips 62 each include a circumferential bearing surface 64 that engage the grooves 60 for enabling smooth rotation of the handle portion 14' relative to the field case 16. The lip and groove engagement prevents the field case 16 from being pushed into the handle portion 14' or pulled out of engagement with the handle portion 14'. As the handle portion 14' rotates relative to field case 16, the lips 62 slide radially within the grooves 60. In a preferred embodiment, first and second felt strips 66 are included for sealing between the handle portion 14' and the field case 16. The first and second felt strips 66 are disposed within, and adhere to, the grooves 60, respectively.

Trigger

With continued reference to FIGS. 2 and 3, a handle lock 80 is preferably provided for locking the handle portion 14' in one of a plurality of rotational positions relative to the field case 16. The handle lock 80 is included to prevent rotation of the handle portion 14' relative to the field case 16 during operation of the LAG 10. The handle lock 80 is generally quadrant shaped and is pivotably supported at a pivot point 82 within the handle portion 14' and biased in a first (locking) direction by a coil spring 84. A first face 86 of the handle lock 80 contacts a forwardly extending surface 88 of the trigger 40 and a second face 90 contacts a face 92 of a wall 94 formed about the internal circumference of the handle portion 14'. The wall 94 includes a plurality of grooves 96 formed therearound. An arcural face 98 of the handle lock 80 may include a manually engageable lever portion 100 that extends outside of a groove 102 of the handle portion 14'. The lever portion 100 is preferably movable in a first direction within the groove 102 against the bias of the spring 84, causing the handle lock 80 to pivot about the pivot point 82.

In a first position, as illustrated in FIG. 3, the handle lock 80 prevents depression of the trigger 40 by obstructing rotational motion of the trigger 40 about the pivot point 44. The second face 90 of the handle lock 80 is prohibited from pivotal movement about the pivot point 82 by the face 92 of the wall 94. To engage the handle lock 80, the handle portion 14' must be sufficiently rotated until the second face 90 aligns with one of the plurality of grooves 96 in the wall 94. Upon alignment with a groove 96, the handle lock 80 is biased by the coil spring 84 and pivots, thus seating the second face 90 of the handle lock 80 into the groove 96. In this second position, the handle lock, prohibits the handle portion 14' from rotating relative to the field case 16. In addition, the first face 86 of the handle lock 80 no longer obstructs pivotal movement of the trigger 40, and the trigger 40 is free to initiate operation of the LAG 10.

If rotation of the handle portion 14' is desired, the lever portion 100 is pivoted back within the groove 102, against the biasing force of the coil spring 84, and the handle portion 14' is rotated slightly to disalign the handle lock 80 and the groove 96. The handle portion 14' is then rotatable, until the second face 90 of the handle lock 80 aligns with and subsequently engages another groove 96 when the lever portion 100 is released.

Figure 5:
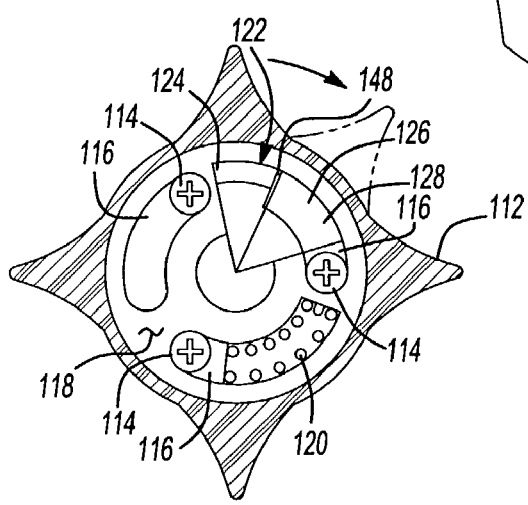
FIG. 5 is a cross-sectional view of the rotating trigger switch of FIG. 4 taken along line 5-5.

With particular reference to FIGS. 4 through 7, an alternative embodiment of a trigger is shown. A trigger ring 110 is preferably supported by and rotatable about the handle portion 14. The handle portion 14 is cylindrical in form and fixed with respect to the field case 16. The trigger ring 110 is selectively rotatable between the field case 16 and the handle portion 14, and includes a formed outer diameter having a plurality of peaks 112 for facilitating easy grip. As best seen in FIG. 5, the trigger ring 110 may be supported by a plurality of screws 114 that run Within arcural grooves 116 formed through an internal face 118 of the trigger ring 110. The trigger ring 110 is preferably biased in a first rotational direction by a spring 120 and further includes a contact track 122 formed on the internal face 118. The contact track 122 includes a lower portion 124 immediately prior to a ramp portion 126 after which is formed a dwell portion 128. The contact track 122 is preferably arcural in shape, similar to the grooves 116, and is in contact with a link 130'.

Figure 6:
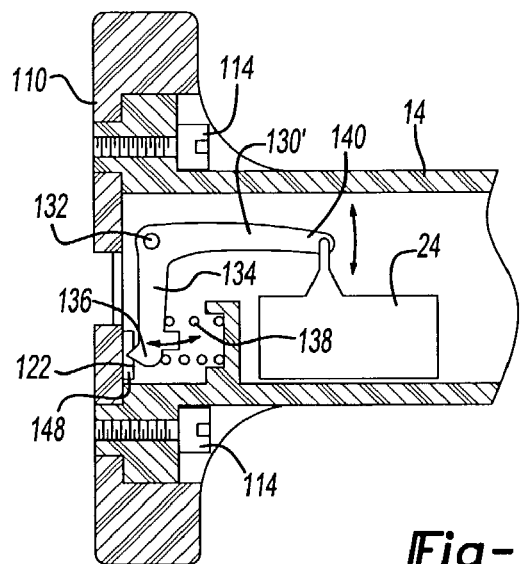
FIG. 6 is an cross-sectional view of the rotating trigger switch of FIG. 4 taken along line 6-6.

In a first exemplary embodiment, as shown in FIG. 6, the link is a lever arm 130' which is pivotal about a pivot point 132. A first end 134 of the lever arm 130' includes a contact point 136 that is biased, by a spring 138 acting against the first end 134 of the lever arm 130' and into contact with the contact track 122. A second end 140 of the lever arm 130' is in mechanical communication with the switch 24.

Figure 7:
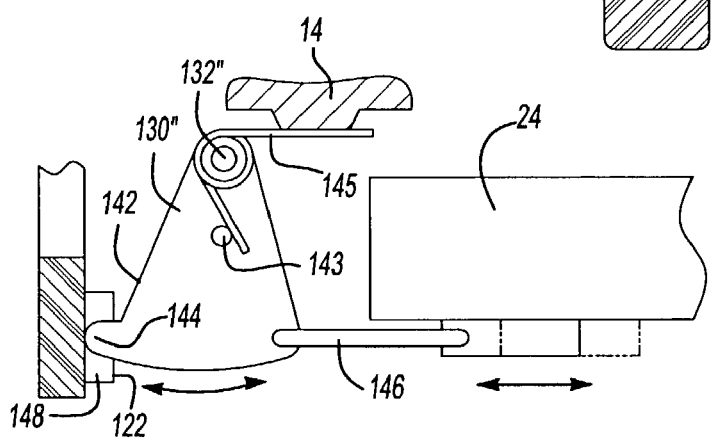
FIG. 7 is a schematic view of an alternative switch of the rotating trigger switch arrangement for a large angle grinder.

In a second exemplary embodiment, as shown in FIG. 7, the link is a quadrant 130", which is pivotal about a pivot point 132". A first face 142 of the quadrant 130" includes a contact point 144 that is biased by a coil spring 145 acting against a spring tab 143 on the quadrant 130", into contact with the contact track 122. A link 146 connected to the quadrant 130" is in communication with the switch 24.

For either embodiment, the LAG 10 is OFF when the contact point 136, 144, respectively, is resting within lower portion 124. As the trigger ring 110 rotates, the contact track 122 rotates relative to the stationary contact point 136, 144, respectively. As the contact point 136, 144 encounters the ramp portion 126, the contact point 136, 144 rides upward along the ramp portion 126 and pivots the link thereby switching the LAG 10 ON. With the trigger ring 110 rotated just enough for the contact point 136, 144 to be on the ramp portion 126, any release of the trigger ring 110 will cause the spring 120 to bias the trigger ring 122 back, whereby the contact point 136, 144 is again in contact with the lower portion 124 and the LAG 10 is OFF. However, upon sufficient rotation of the trigger ring 110 the contact point 136, 144 travels past the ramp portion 126 and into contact with the dwell portion 128. The dwell portion 128 is generally raised relative to the lower portion 124 and includes a lip 148 for preventing the spring 120 from biasing the trigger ring 122 back. With the contact point 136', 144 in contact with the dwell portion 128, the LAG 10 is continuously operable without holding the trigger ring 110 in position. To discontinue operation, the trigger ring is turned in an opposite rotational direction with sufficient force for the contact point 136, 144 to ride over the lip 148 and back down to the lower portion 124.

(Switch Carrier Mounting System)

Figure 8:
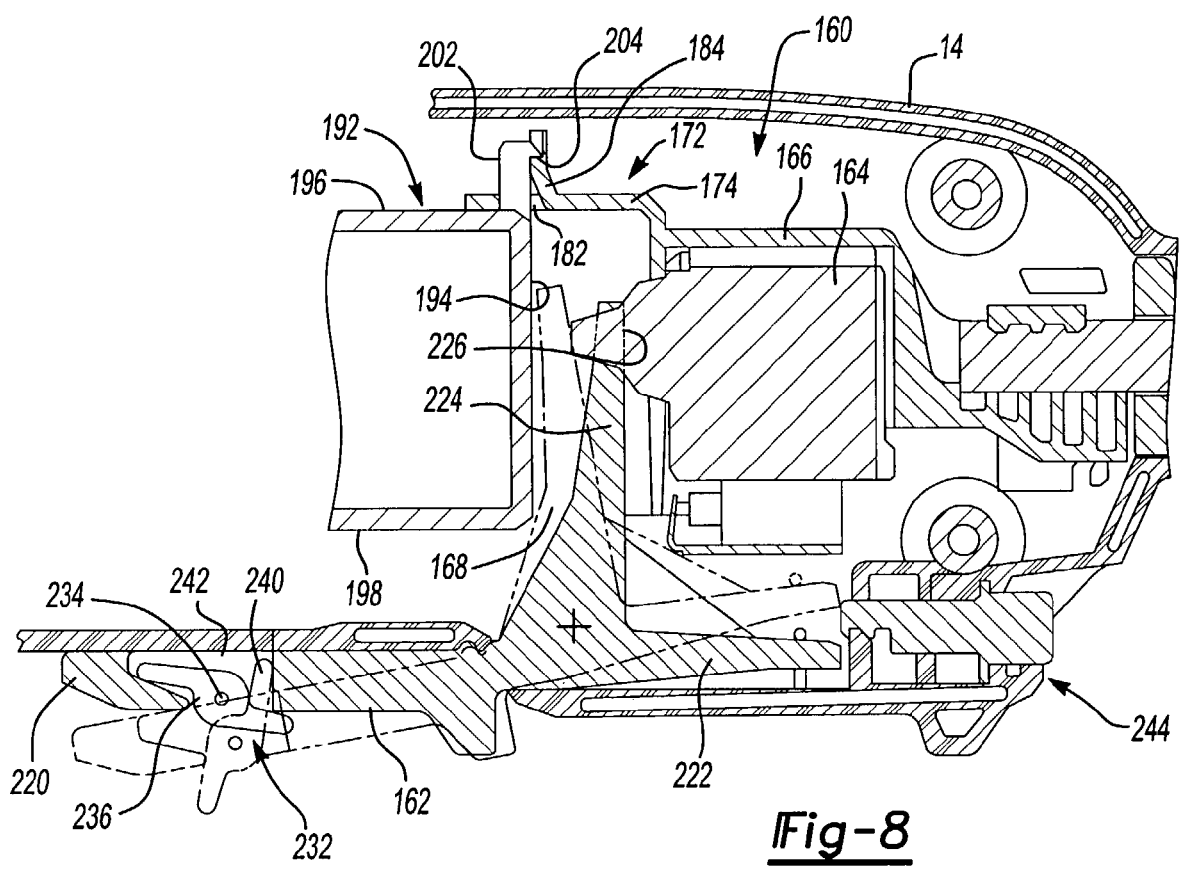
FIG. 8 is cross-sectional view of a handle portion including a switch carrier mounting system and a paddle switch.
Figure 9:
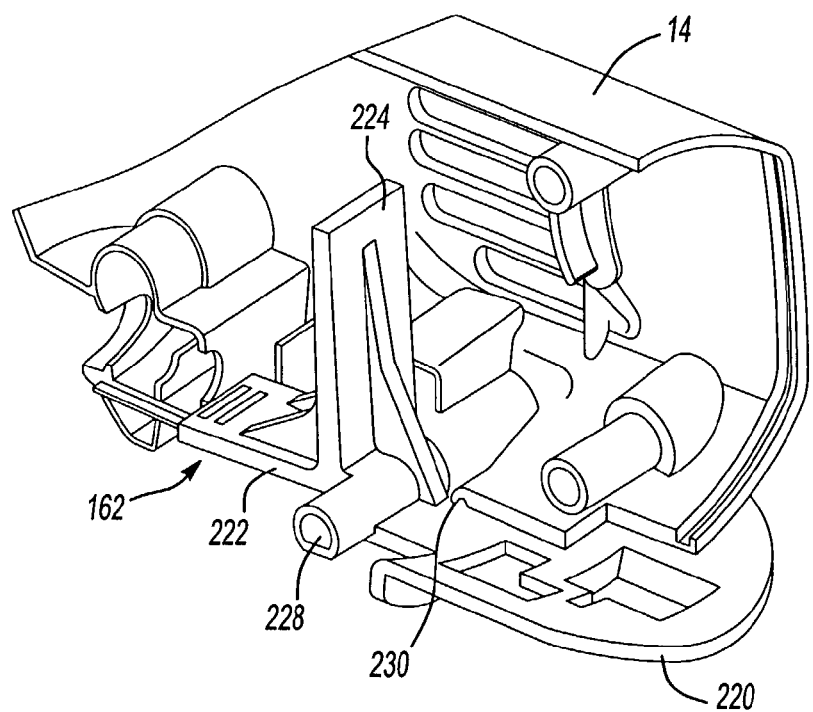
FIG. 9 is a perspective cross-sectional view of the handle portion of FIG. 8 detailing the paddle switch.

With reference to FIGS. 8 through 10, an alternative trigger system is detailed. The trigger system includes a switch carrier 160 disposed within the handle portion 14 and a paddle trigger 162 for selectively activating a switch 164 supported within the switch carrier 160. The switch carrier 160 preferably includes a housing 166 for mounting the switch 164 therein and an opening 168 for receiving an arm of the paddle trigger 162 for activating the switch 164, as will be described in further detail below. The housing 166 preferably includes an end 172 having a shell portion 174 extending therefrom, as best seen in FIG. 10. The shell portion 174 includes an upper wall 176 and a pair of sidewalls 178. The sidewalls 178 each include a formed recess 180 running along their respective lengths. The upper wall 176 includes a generally rectangular opening 182 with a first tab 184 extending upward from an edge 186 of the opening 182, and also including a recess 188 formed in a front face 190.

The switch carrier 160 is preferably attached to a square hub 192 that extends from the field case 16. As best seen in FIG. 10, the square hub 192 includes a front face 194, a top face 196, a bottom face 198 and side faces 200. In SAG or MAG applications, the square hub 192 preferably houses a bearing (not shown) for rotatably supporting the motor spindle 28 and motor commutator (not shown), and further supports motor brush housings (not shown). Extending upward from the square hub 192 is a second tab 202 having a lip 204 formed on the end. The square hub 192 further includes rails 206 disposed along each side face 200, running vertically generally parallel to the front face 194. Each rail 206 includes a sloping front face 208 that terminates into a sloping top face 210 which terminates with a squared back face 212.

The shell portion 174 of the switch carrier 160 may slidably receive a portion of the square hub 192 therein. Specifically, the recesses 180 of the sidewalls 178 of the switch carrier 160 are aligned with the rails 206 of the square hub 192 for slidably receiving the rails 206 therein. As the switch carrier 160 is slid into connection with the square hub 192, the second tab 202 extends upwards through the opening 182 of the switch carrier 160. Once the switch carrier 160 is fully received on the square hub 192, the first and second tabs 184, 202 interface, whereby the lip 204 of the second tab 202 is received into the recess 188 of the first tab 184 for releasably engaging the square hub 192 and the switch carrier 160. The first and second tabs 184, 202 are generally formed to produce an interference fit therebetween, thereby biasing the first and second tabs 184, 202 into engagement.

To disengage the square hub 192 and switch carrier 160, the second tab 202 is manually biased from engagement with the first tab 184 and the switch carrier 160 is slid from engagement with the square hub 192. In this manner, the switch carrier 160 of the present invention enables easy assembly and disassembly of the switch 164 into the LAG 10, thereby simplifying manufacture and easing maintenance.

(Paddle Switch)

With reference to FIGS. 8 and 9, the paddle trigger 162 includes a paddle portion 220 with a first arm 222 extending therefrom. A second arm 224 preferably extends upward from and generally perpendicular to the first arm 222. A face 226 of the second arm 224 is in contact with the switch 164 for selectively activating the switch 164. Pivot posts 228 perpendicularly extend from either side of the first arm 222. The pivot posts 228 are received into apertures 230 of the handle portion 14 for facilitating pivotal support of the paddle trigger 162.

The paddle trigger 162 further includes a paddle lock 232 for selectively preventing depression of the paddle trigger 162. The paddle lock 232 is pivotally supported by the paddle portion 220 about a pivot 234 and includes a lock switch 236. The lock switch 236 is biased toward a first position by a coil spring (not shown), whereby the lock switch 236 lays flat against the paddle portion 220, contouring to the paddle portion 220. The lock switch 236 is rotatable to a second position, against the bias of the coil spring. In the second position, an end 240 of the lock switch 236 seats within a groove 242 of the handle portion 14, creating a column between the paddle portion 220 and the handle portion 14. In this manner, depression of the paddle trigger 162 is prohibited. To enable depression of the paddle trigger 162, the lock switch 236 is flipped out of engagement with the groove 242, back to the first position.

A locking member 244 is further included and is slidably supported within the handle portion 14. The locking member 244 locks the paddle trigger 162 in a depressed position, whereby the LAG 10 is continuously activated.

(Mechanical Brake for Motor Armature)

Once the LAG 10 is in operation, a motor armature spins at a relatively high rate within the field case 16, as will be discussed in further detail hereinbelow. As a result, the motor armature builds up a significant amount of rotational inertia. Immediately after the LAG 10 is switched off, the motor armature continues to spin within the field case 16, gradually slowing to a stop. During the gradual slowing of the free-spinning motor armature, the grinder wheel 34 also continues to spin, gradually slowing with the motor armature. As a result, an operator must wait until the armature and grinder wheel 34 slow to a stop before setting the LAG 10 down, changing the grinder wheel 34, or performing other operations.

Figure 11:
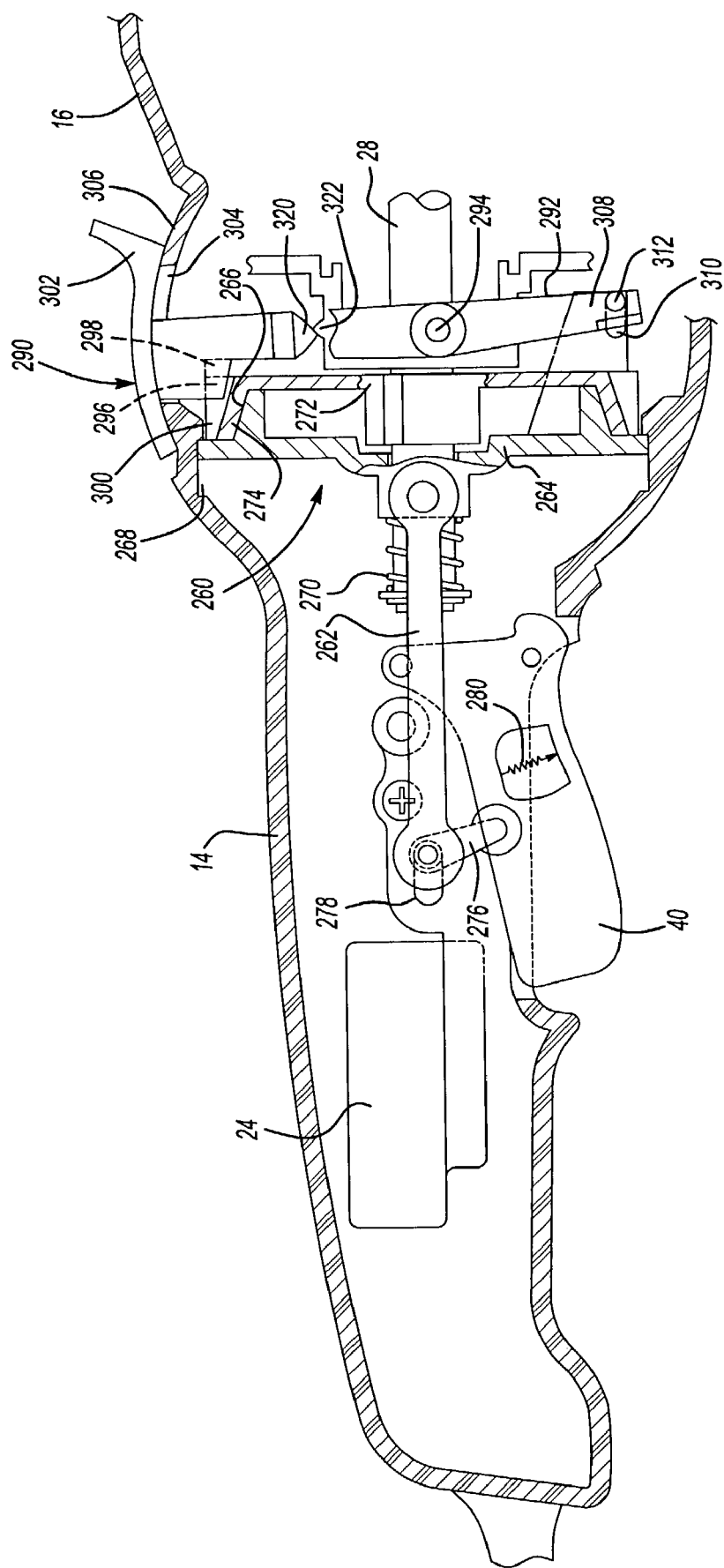
FIG. 11 is a cross-sectional view of the handle portion including a mechanical motor brake illustrated in a braking mode.
Figure 12:
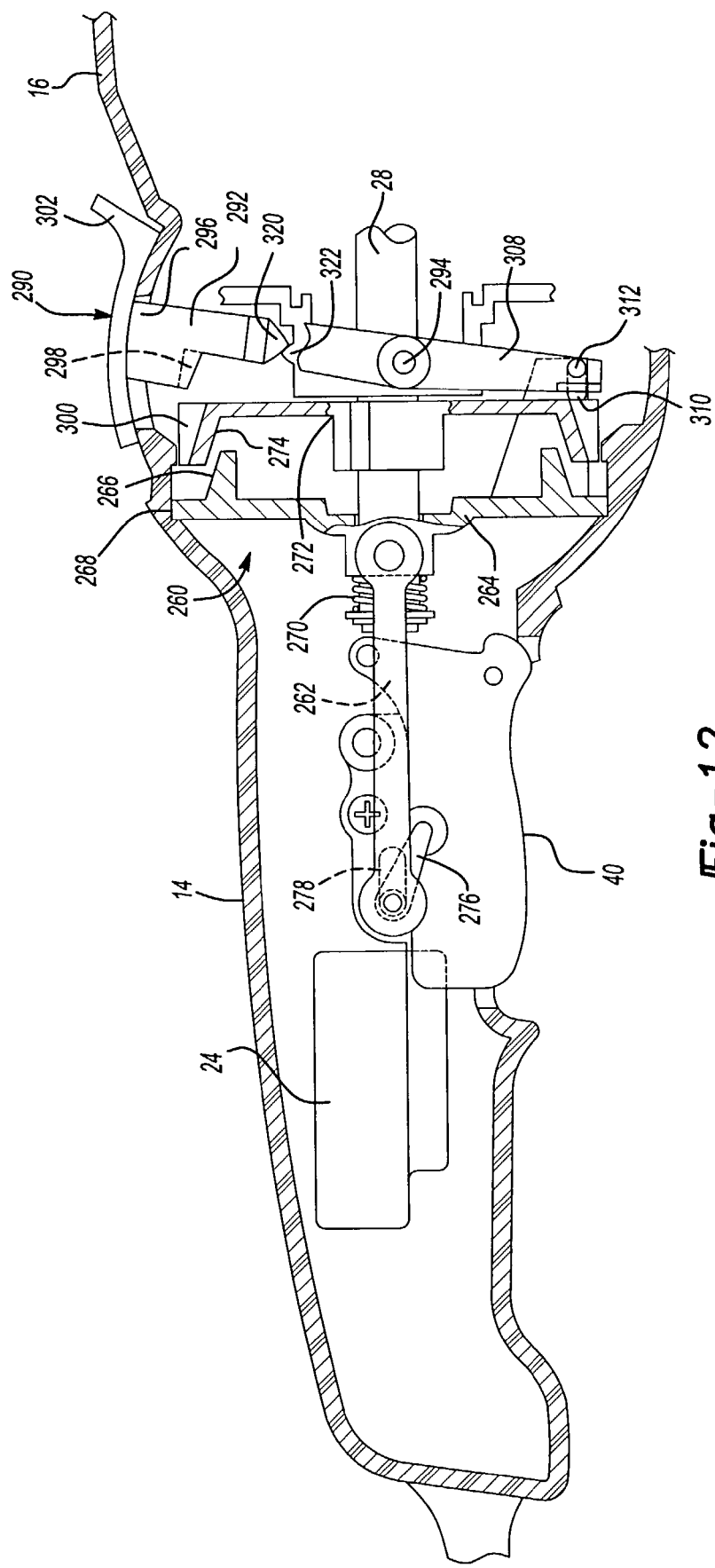
FIG. 12 is a cross-sectional view of the handle portion including the mechanical motor brake illustrated in a non-braking mode.

An exemplary embodiment of the present invention provides a mechanical motor brake 260, as detailed in FIGS. 11 and 12. The mechanical motor brake 260 is preferably in mechanical communication with the trigger 40 of the switch 24 for selective implementation. The trigger 40 is preferably in mechanical communication with a link arm 262, an end of which is connected to a generally frusto-conically shaped first brake wheel 264 that includes an external brake surface 266. The first brake wheel 264 is rotatably supported about an extended end of the motor spindle 28 and is fixed from rotation by the handle portion 14 through a spline engagement 268. The first brake wheel 264, however, is axially slidable relative to the handle portion 14 along the splines 268. A spring 270 is also included and is disposed about the motor spindle 28, immediately behind and in contact with the first brake wheel 264. The motor spindle 28 extends from the motor 26 and is fixed for rotation with a second brake wheel 272 that includes an internal brake surface 274. The spring 270 biases the first brake wheel 264 into engagement with the second brake wheel 272, further biasing the link arm 262 in a forward direction.

The first brake wheel 264 is selectively engageable with the second brake wheel 272 for retarding rotational motion of the motor spindle 28. The trigger 40 includes an elbow arm 276 that slidably interfaces a slot 278 of the handle portion 14 and is pivotally connected to the link arm 262. The trigger 40 may further include a spring 280 for biasing the trigger 40 to an OFF position (see FIG. 11). Depression of the trigger 40, to an ON position (see FIG. 12) against the bias of the spring 280, causes the pivot of the elbow arm 276 and link arm 262 to slide within the slot 278 until contacting an end of the slot 278, thereby pulling the link arm 262 and first brake wheel 264 out of engagement with the second brake wheel 272, against the bias of the spring 270. Once disengaged, the second brake wheel 272 is free to rotate, thus enabling unrestricted rotation of the motor spindle 28.

Upon release of the trigger 40, the spring 280 biases the trigger 40 to the OFF position, releasing the elbow arm 276 from forced engagement with the end of the slot 278. In the OFF position, power to the motor 26 is cut and the motor spindle 28 spins freely, as described above. The link arm 262 moves in the forward direction and the first brake wheel 264 again engages the second brake wheel 272. The engagement of the first and second brake wheels 264, 272 retards the inertial rotation of the motor spindle 28, thereby braking the grinder wheel 34 from free-spin.

The mechanical motor brake 260 may optionally include a lock 290 for locking the motor spindle 28 from rotation. The lock 290 is selectively engageable with the second brake wheel 272 and includes a lever arm 292 that is pivotally supported within the handle portion 14 about a generally central pivot point 294. A first end 296 of the lever arm 292 includes a tooth 298 for selective engagement with a tooth surface 300 disposed about the external circumference of the second brake wheel 272. The first end 296 of the lever arm 292 further includes a switch 302 that extends through a slot 304 in the handle portion 14 and is slidable on an external surface 306 within the slot 304. A second end 308 of the lever arm 292 is pivotally attached in a slot 310 by a post 312 that extends from the first brake wheel 264. Backward and forward movement of the first brake wheel 264, resulting from depression and release of the trigger 40, respectively, pivots the lever arm 292 about the generally central pivot point 294.

As shown in FIG. 11, the first and second brake wheels 264, 272 may be engaged to retard rotational motion of the motor spindle 28. Additionally, the lever arm 292 is in an engaged position with the second brake wheel 272 thereby, locking the brake wheel 272, thus prohibiting rotation of the motor spindle 28. Forward movement of the switch 302 causes the lever arm 292 to pivot about the generally central pivot point 294. As a result, the tooth 298 of the lever arm 292 is disengaged from the tooth surface 300 of the second brake wheel 272. Furthermore, the second end 308 of the lever arm 292 slides to an opposing end of the slot 310.

As shown in FIG. 12, the lock 290 is prohibited from engagement with the second brake wheel 272 upon depression of the trigger 40. As the first brake wheel 264 is pulled back from the second brake wheel 272 by depression of the trigger 40, as described above, the post 312 is also pulled back. As the post 312 is pulled back, the second end 308 of the lever arm 292 contacts an end of the slot 310 and is thus pulled by the post 312, causing clockwise pivoting of the lever arm 292 about the generally central pivot point 294. Clockwise pivoting of the lever arm 292 disengages the tooth from the tooth surface 300 of the second brake wheel 272. In this manner, the lock 290 is prohibited from locking the motor spindle 28 during powered drive of the motor 26.

The lever arm 292 may optionally include a first detent 320 that interfaces a corresponding second detent 322 formed on an internal structure of the handle portion 14. In an exemplary embodiment, the first and second detents 320, 322 are formed from plastic and are therefore, slightly elastic. Alternatively, the first and second detents 320, 322 may include first and second springs (not shown). The interface between the first and second detents 320, 322 requires an amount of force to be applied to either the first or second ends 296, 308 of the lever arm 292 to enable the lever arm 292 to pivot about the generally central pivot point 294. In this manner, the lock 290 is prohibited from accidental engagement or disengagement.

The mechanical motor brake 260 and the lock 290 improve the overall usefulness of the LAG 10. By immediately braking the rotation of the grinder wheel 34, the mechanical motor brake 260 enables an operator to quickly access the grinder wheel 34 or perform other duties, without requiring a waiting period for the grinder wheel 34 to slow from the inertial rotation of the motor 26. Additionally, the lock 290 enables the changing of grinder wheels 34 without requiring an extra tool for preventing the grinder wheel 34 from free spin.

Motor

The motor 26 is preferably a universal series motor of a type commonly known in the art. With particular reference to FIGS. 1 and 13, the motor 26 generally includes the motor spindle 28, a motor armature 330, a field pole 332, field windings 334, a commutator assembly 336, brush holders 338 and electrical leads 340. The electrical leads 340 link brushes 342 to the switch 24 for selective connection with a power source.

The field case 16 is preferably of open cylindrical shape supporting the field pole 332 about an inside circumference 344. The field pole 332 may be formed from sheet-steel laminations fastened to the inside of the field case 16. The field windings 334 are formed from repetitive windings of wire disposed on either side of the field pole 332. The field windings 334 generally include "run" windings and "brake" windings. Power from the power source runs through the run windings creating an electric field for causing rotation of the motor armature 330. After cutting power to the run windings, the motor armature 330 continues to spin, slowly decelerating to a stop, as described in detail above. To reduce the deceleration time, the brake windings generate an electric field, generally opposite that of the run windings, from residual current induced by the spinning motor armature 330. This feature is described in further detail hereinbelow.

The motor armature 330 is preferably fixed for rotation with the motor spindle 28 and comprises a cylindrical core of sheet-steel disks 346 punched with peripheral slots, air ducts and a spindle hole. The disks 346 are aligned on the motor spindle 28, a first end of which is supported by a bearing 348 at a first end of the field case 16, through the commutator 336. A bearing 350 seats within an aperture 352 of the gear case 18 for supporting a second end of the motor spindle 28. A series of copper conducting wires are wound in various patterns about the peripheral slits of the armature disks 346, the ends of which are soldered to the commutator 336. The series of wires are referred to as "windings" 354 (see FIG. 13).

The commutator 336 includes hard-drawn copper segments or commutator segments 356, insulated from each other and the motor spindle by mica. The commutator 336 is fixed for rotation with the motor spindle 28 and provides an electrical connection between the rotating armature 330 and the stationary brushes 342. The brush holders 338 each slidably support a carbon brush 342 that is in periodic contact with the commutator segments 356. Generally, the stationary brushes 342 are held in contact with a top surface 358 of the commutator 336 by spring tension (as will be discussed in detail hereinbelow). The brushes 342 complete the electrical link between the rotating commutator 336, armature 330, and the switch 24.

(Soft Start Arrangement)

The switch 24 acts as an electrical bridge between the motor 26 and a power source. As described previously, the switch 24 is in mechanical communication with the trigger 40. Depression of the trigger 40 causes the switch 24 to complete the electrical bridge, thus providing power to the motor 26 from the power source.

Figure 14:
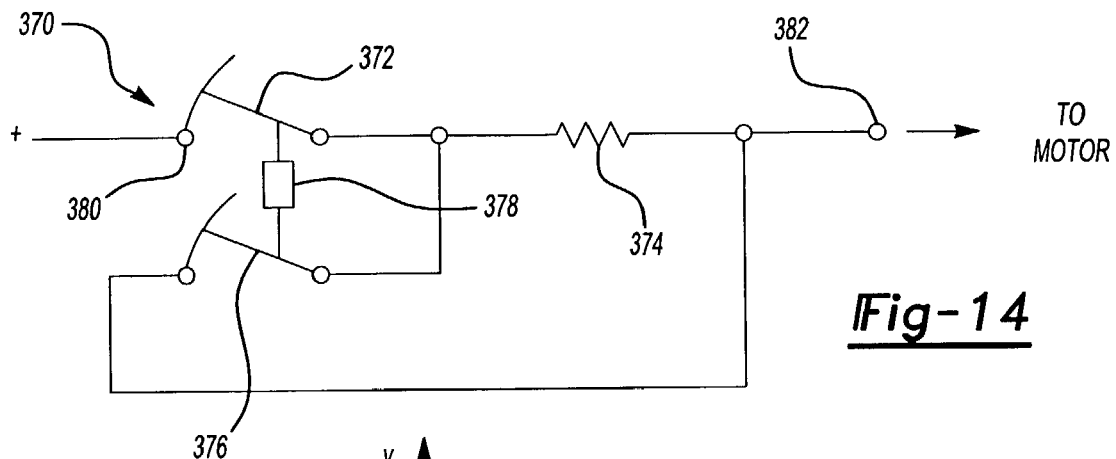
FIG. 14 is a schematic view of a first preferred embodiment of a soft start circuit.

With particular reference to FIG. 14, a preferred embodiment of the switch 24 includes a soft start circuit 370. The soft start circuit 370 may include a first switch 372 in series connection with a resistor 374 and a second switch 376 in parallel connection with the resistor 374. The first and second switches 372, 376 are interconnected wherein the second switch 376 has delayed movement compared to the first switch 372. The delay period between the first and second switches 372, 376 is predefined by a delay mechanism 378. The delay mechanism 378 may be one of many known in the art, including a spring dampened delay mechanism or the like. The spring dampened delay mechanism transmits movement to the first switch 372 via a spring which operates through a damper that effectively delays operation of the second switch 376 as is known in the art. A first terminal 380 of the soft start circuit 370 is in electrical communication with the power source and a second terminal 382 is in electrical communication with the motor 26.

Figure 15:
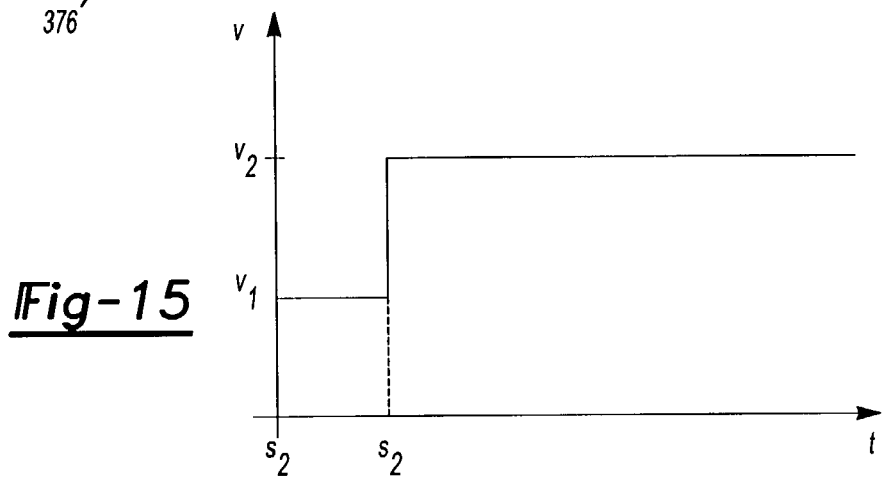
FIG. 15 is a graphical representation of a voltage jump using the soft start circuit of FIG. 14.

Depression of the trigger 40 causes the first switch 372 to close, thus providing power to the second terminal 382 through the resistor 374. During the predefined delay period, the motor 26 is powered at a first voltage $V_1$ which results from the voltage division created by the resistor 374. After the delay period, the second switch 376 is closed, thereby powering the motor 26 through the parallel path. This is due to the current seeking the path of least resistance through the soft start circuit 370. The motor 26 is thereby powered at a second voltage $V_2$, directly from the power source, whereby $V_2$ is greater than $V_1$. This is best shown graphically in FIG. 15, wherein the time 52 is the time where the second switch 376 is closed.

Figure 16:
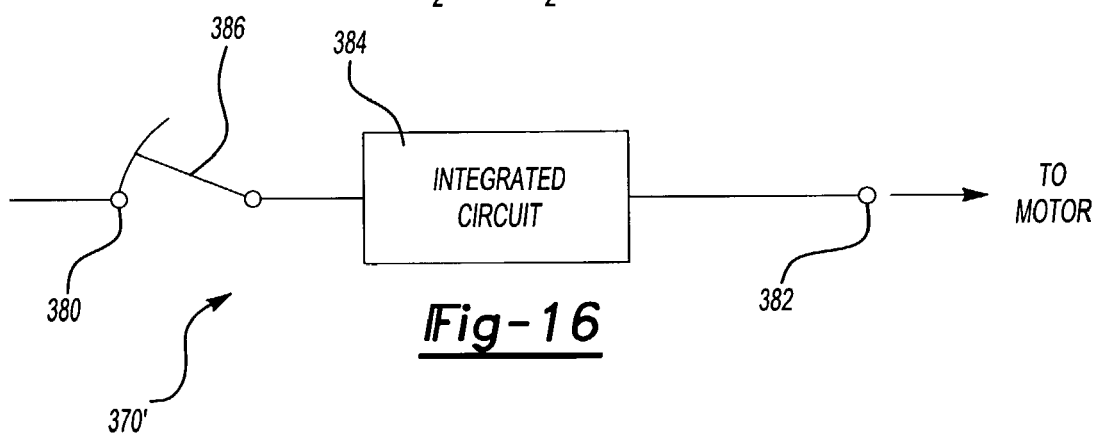
FIG. 16 is a schematic view of an alternative embodiment of a soft start circuit.
Figure 17:
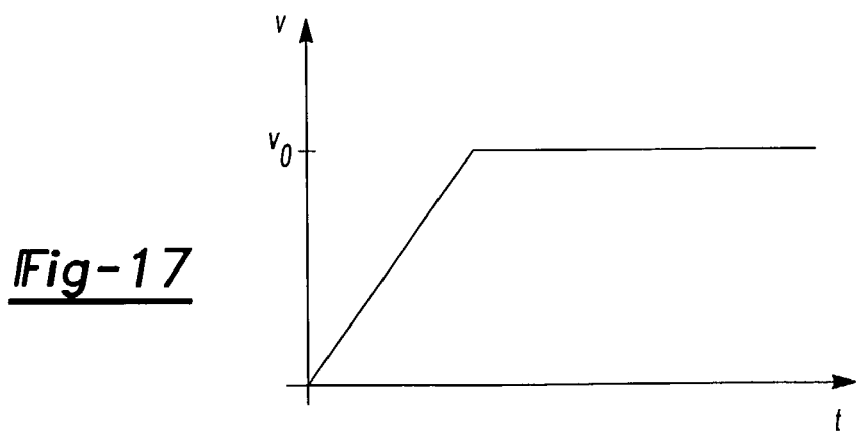
FIG. 17 is a graphical representation of a voltage ramp using the soft start circuit of FIG. 16.

With particular reference to FIG. 16, an alternative embodiment of the soft start circuit 370' may include an integrated circuit 384. A switch 386 and the integrated circuit 384 are disposed between the first and second terminals 380, 382. Depression of the trigger 40 results in closure of the switch 386, thus powering the motor 26 through the integrated circuit 384. The integrated circuit 384 functions to ramp the voltage to an operating level, designated as $V_0$. This is best shown graphically in FIG. 17.

The exemplary soft start circuits 370, 370' described above, provide a slower start voltage for the motor 26. A slower motor start enables gradual acceleration of the various LAG 10 components, including the motor spindle 28, gearbox components, wheel spindle 32 and grinder wheel 34. The initial inertia of these components could cause an uncomfortable jolt if the motor 26 immediately jumped to an operational voltage level. The gradual acceleration provided by the soft start circuit 370 enables smooth start of the LAG 10, reducing any related jolting.

(Motor Abrasion Protection)

Figure 18A:
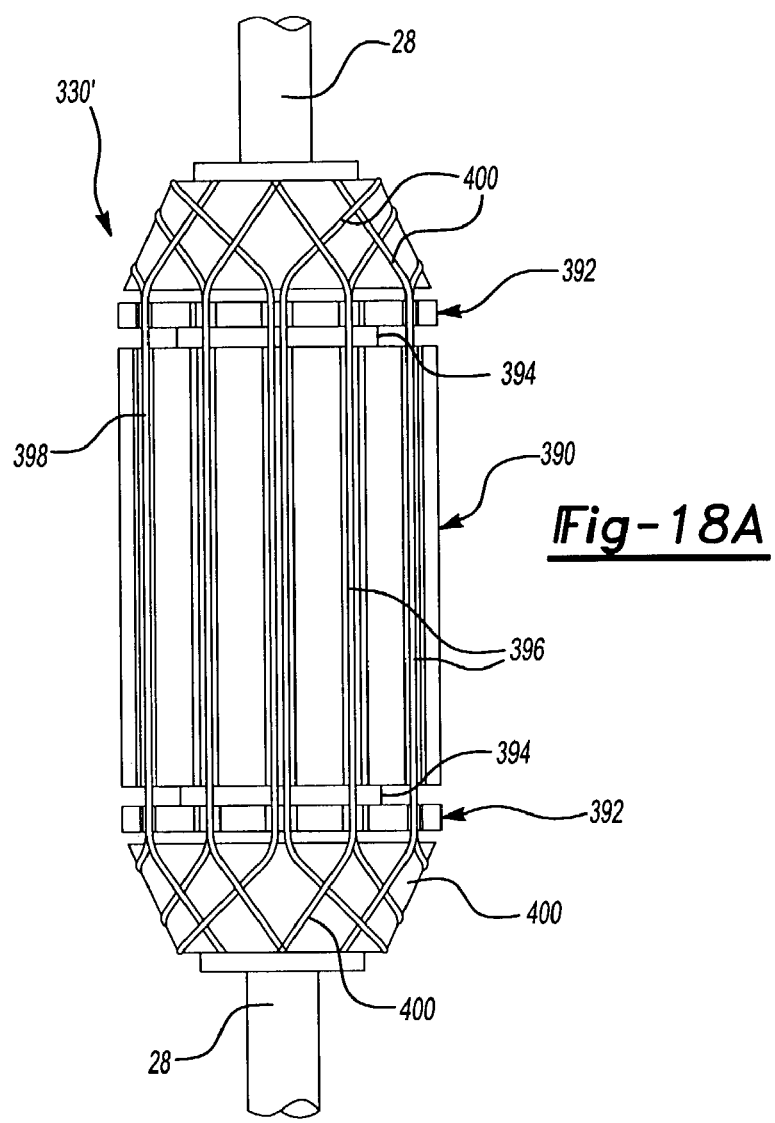
FIG. 18A is a plan view of a first exemplary embodiment of a motor armature.

With particular reference to FIG. 18A, an alternative embodiment of the armature 330 is designated as 330'. The armature 330' preferably includes the motor spindle 28, a primary laminate stack 390 and a pair of secondary laminate stacks 392. The secondary laminate stacks 392 are axially aligned with and are disposed on opposing ends of the primary laminate stack 390. A spacer 394 is included between each of the secondary laminate stacks 392 and the primary laminate stack 390. Both the primary and secondary laminate stacks 390, 392 include a plurality of slots 396 running generally parallel to the axis of the motor spindle 28. A series of windings 398 are included that are disposed in various patterns through the slots 396 of the primary and secondary laminate stacks 390, 392 and wind about ends of the secondary laminate stacks 392. An abrasion thread 400 is preferably wrapped in a pattern over the windings 398 at the end of the secondary laminate stack 392, and travels down a single slot 396 in the primary and secondary laminate stacks 390, 392 to wrap around the other end of the secondary laminate stack 392 in a similar pattern. As the armature 330' is caused to spin, the abrasion thread 400 protects the windings 398 from abrasion against other motor components.

(Motor Winding Scheme)

Figure 18B:
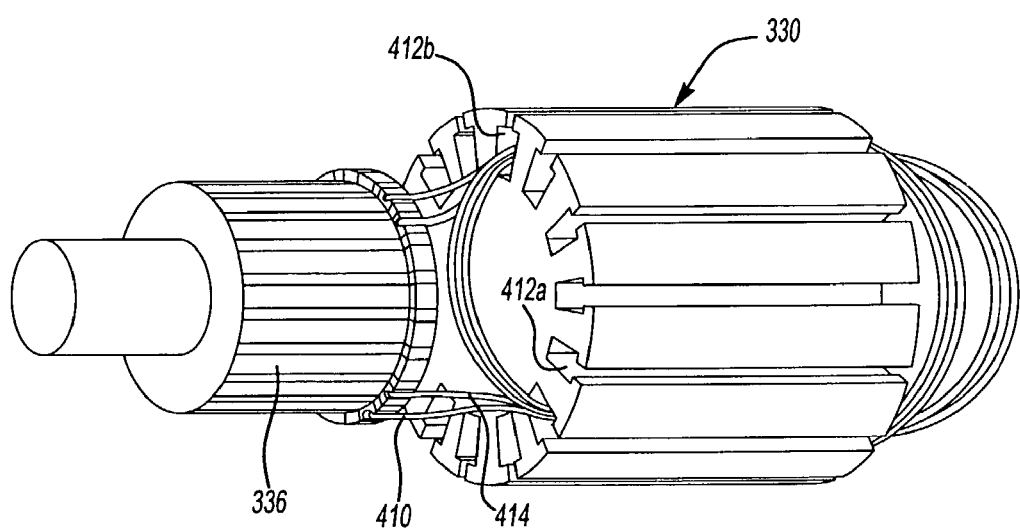
FIG. 18B is a perspective view of a motor armature detailing an exemplary embodiment of a winding scheme.

With particular reference to FIG. 18B, a first exemplary embodiment of a winding scheme is detailed hereinbelow. The winding scheme includes a first wire 410 wound between two slots 412a, 412b of the armature 330 and a second wire 414 concurrently wound between the same slots 412a, 412b as the first wire 410. The ends of the first and second wires 410, 414 are soldered to the commutator 336. It is important to note that the number of times a particular wire is wound around the armature 330 is defined as its number of windings. The winding scheme provides for a different number of windings for the first and second wires 410, 414. In other words, the number of windings about the slots 412a, 412b for the first wire 410 is unequal to the number of windings for the second wire 414.

(Constant Load Motor Brush)

As described previously, the brushes 342 (shown in FIG. 13) provide electrical connection between the rotating commutator 336 and the stationary switch 24 for providing power to the motor 26. In order for the motor 26 to function properly and perform efficiently, the brushes 342 should constantly and evenly contact the commutator 336. Additionally, during the life of the motor 26, the brushes 342 gradually wear. Therefore, traditional motors include compensation devices, such as springs, to press the brushes 342 into contact with the commutator 336.

(Brush Duct)

Figure 19:
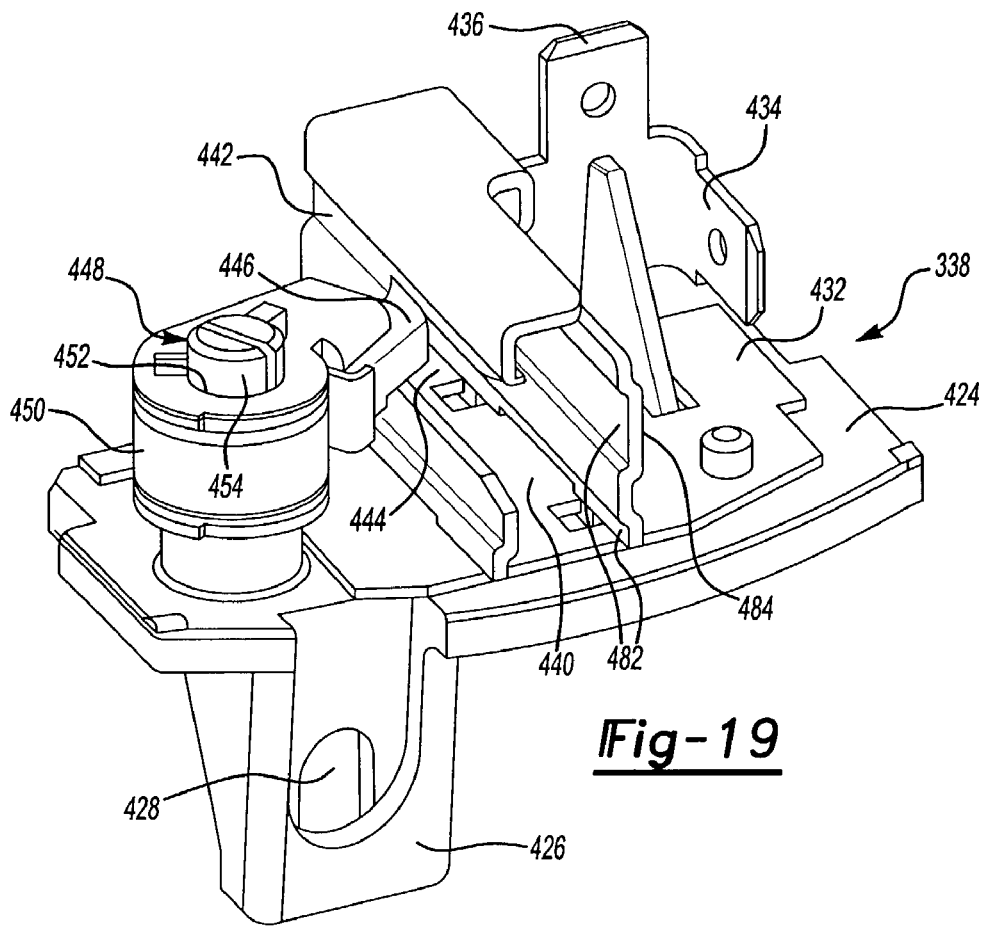
FIG. 19 is a perspective view of a brush housing of the motor.
Figure 20:
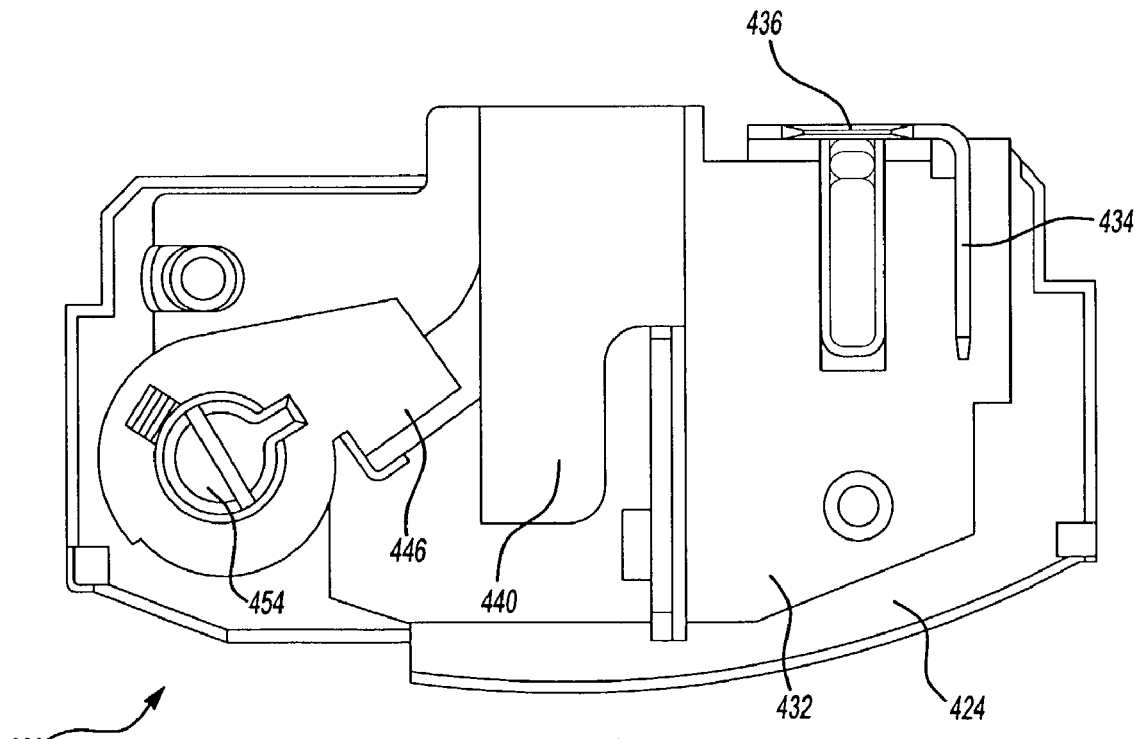
FIG. 20 is a plan view of the brush housing of FIG. 19.

Referencing FIG. 1, the LAG 10 also may include the brush housings 338 mounted to respective support structures 422 of the field case 16. With particular reference to FIGS. 19 and 20, the brush housings 338 each include a support plate 424 having a perpendicularly extending bracket 426. The bracket 426 may include an aperture 428 therethrough for receiving a bolt (not shown) for attaching the brush housing 338 to the field case 16. A terminal plate 432 is preferably attached to the support plate 424 and includes first and second terminals 434, 436. The first terminal 434 is in electrical communication with the switch 24 and a brush 342 may be connected to the second terminal 436 by a wire (not shown). A brush duct 440 is also provided, through which the brush 342 is slidably disposed. A wall 442 of the brush duct 440 includes a slot 444, through which an arm 446 of a biasing member 448 passes. In a first exemplary embodiment, the biasing member 448 includes a cylindrical housing 450 having the arm 446 extending tangentially therefrom. The cylindrical housing 450 includes an aperture 452 therethrough whereby the biasing member 448 receives a pivot post 454 of the brush housing 338 for pivotally supporting the biasing member 448. A coil spring (not shown) is disposed within the cylindrical housing 450 and is anchored to the pivot post 454 for biasing the biasing member 448 about the pivot post 454, thereby biasing the arm 446 downward through the slot 444. The arm 446 engages a top face 456 of the brush 342, thereby biasing the brush 342 downward within the brush duct 440 for slidably engaging the commutator 336.

Figure 21:
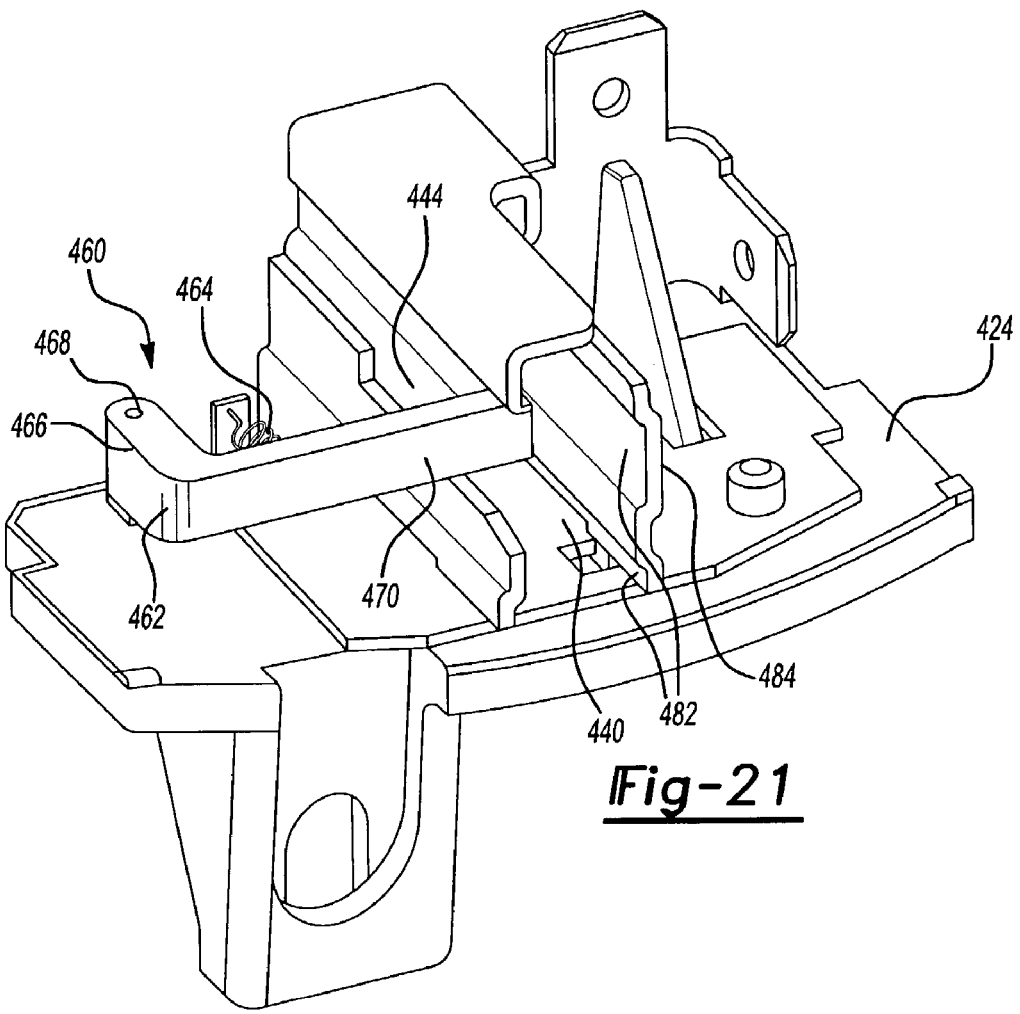
FIG. 21 is a perspective view of an alternative brush housing of the motor.
Figure 22:
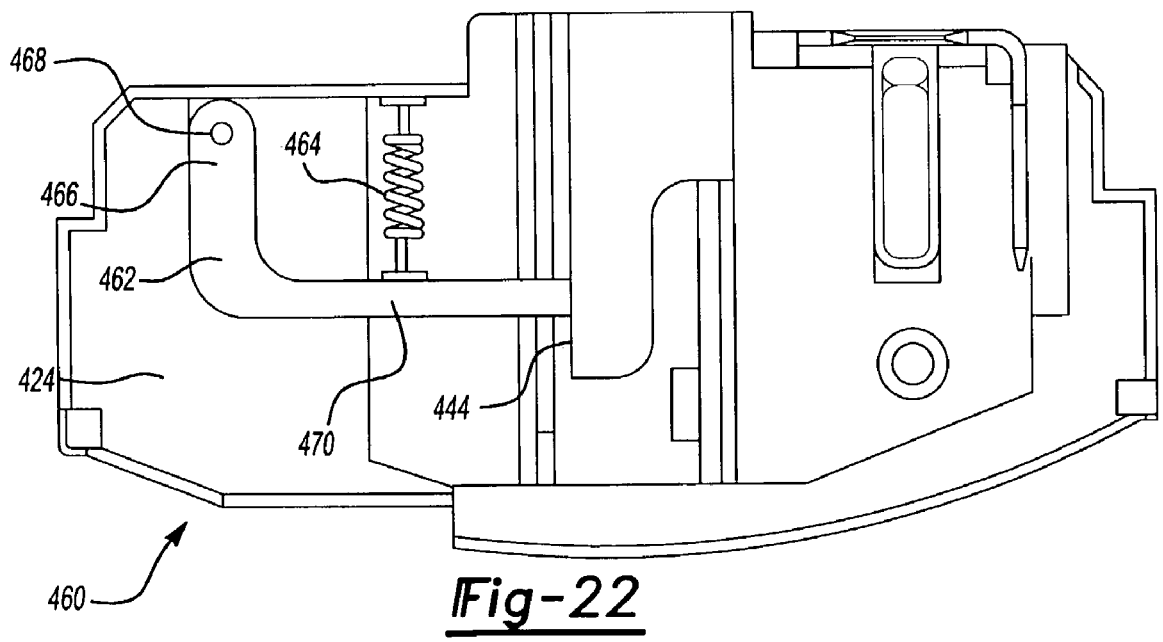
FIG. 22 is a plan view of the brush housing of FIG. 21.

With reference to FIGS. 21 and 22, an alternative biasing member 460 is shown for biasing the brush 342 against the commutator 336 and to compensate for wear of the brush 342 during the lifetime of the motor 26. The biasing member 460 preferably includes an arm 462 and a biasing spring 464. A first end 466 of the arm 462 is pivotally attached to a pivot post 468 and a second end 470 of the arm 462 is in contact with the top face 456 not shown of a brush 342. The spring 464 is connected at a first end to an intermediate length of the arm 462 and is anchored to the support plate 424. The spring 464 biases the arm 462 downward through the slot 444, further biasing the brush 342 into contact with the commutator 336. As the brush 342 wears, the arm 462 continuously biases the brush 342 downward, providing a constant electrical connection between the commutator 336 and the brush 342.

FIGS. 19 and 21 include a preferred embodiment of the brush duct 440 as shown. The brush duct 440 may include a series of recesses 482 that run along a length of an inside wall 484 of the brush duct 440. The recesses 482 create a gap through which dirt and other debris may escape. As noted previously, during the life of the motor 26 the brushes 342 wear, thus creating debris within the brush duct 440. The brush duct 440 enables unrestricted slidable movement of the brush 342 within the brush duct 440 by reducing the amount of dirt and debris that would otherwise inhibit brush 342 movement.

(Stator Winding)

In the simplest terms, current is selectively provided to the motor via the switch 24. As shown in FIG. 13, the current travels through the switch 24 through one of the two brushes 342 to the commutator 336, or more specifically, to the commutator segment 356 that is presently engaged with the brush 342. From the commutator bar 356 the current travels through the particular winding 354 soldered to the commutator bar 356, thereby generating a first flux field about the winding 354. The current ultimately travels to the end of the winding 354 into an opposing commutator bar that is presently engaged with the second of the two brushes 342. The second brush 342 is preferably in electrical communication with a first end of the field windings 334 (FIG. 1) thereby enabling the current to travel through the field windings 334. The field windings 334 run generally parallel to the windings 354 of the armature 330. As the current travels through the field windings 334, a second flux field is generated, which is generally opposite to the first flux field. The opposing fields induce a resultant force causing the armature 330 to rotate within the field case 16. The current ultimately travels through the field windings 334 to ground.

With particular reference to FIG. 23, a schematic view of a preferred field winding arrangement 490 is detailed. The field winding arrangement 490 includes first and second run windings 492, 494 in series, wrapped clockwise about either side of a field pole 496 (FIG. 24). The field winding arrangement 490 further includes first and second brake windings 498, 500 in series, wrapped counter-clockwise about either side of the field pole 496, concurrently with the first and second run windings 492, 494 as is shown in FIGS. 24 and 25.

The first and second run windings 492, 494 and the first and second brake windings 498, 500 are each in electrical communication with the switch 24. The switch 24 preferably includes a first sub-switch 502 for completing a powered electrical circuit between the first and second run windings 492, 494 and the armature 330. The switch 24 also preferably includes a second sub-switch 504 for completing a closed electrical circuit between the first and second brake windings 498, 500 and the armature 330. The switch 24 is configured whereby if either sub-switch 502, 504 is open, the other is closed.

To provide power to the motor 26 the first sub-switch 502 is closed. With the first sub-switch 502 closed, current runs counter-clockwise through the schematic circuit of FIG. 23. The current path is as follows: through the first run winding 492, through the second run winding 494, through a first brush 342a, through the armature 330, through a second brush 342b and back around through to ground. The current running through the first and second run windings 492, 494 generates an electric field that interacts with an electric field generated through the armature 330, thereby causing the armature 330 to rotate in a first rotational direction.

To cut power to the motor 26 the first sub-switch 502 is opened, thereby closing the second sub-switch 504. Immediately after closing the second sub-switch 504, the armature 330 is freely spinning within the motor 26, thus generating a current that runs clockwise through the circuit. The current path is as follows: through the second brush 342b, through the second sub-switch 504, through the first brake winding 498, through the second brake winding 500 and through the first brush 342a back to the armature 330. As the current passes through the first and second brake windings 498, 500, a flux field is generated that is generally opposite to the flux field previously generated by the first and second run windings 492, 494, described above. The flux field urges the armature 330 to spin in an opposite rotational direction, thereby causing the armature 330 to quickly decelerate. As the armature 330 decelerates, the current through the circuit gradually decreases to zero, where the armature 330 is at rest. The braking scheme thus provides an efficient means for slowing the residual inertial motion of the rotating armature 330.

With reference to FIGS. 23-25, the first and second run windings 492, 494 are preferably created using a common wire 510. Initially, the first run winding 492 is wrapped in a clockwise direction around a first side of the field pole 496 then diagonally traverses the field pole 496 to a second side of the field pole 496, where the second run winding 494 is wrapped in an opposite direction to the first run winding 492. The first and second brake windings 498, 500 are also preferably created using a common wire 512. Initially, the first brake winding 498 is wrapped in a counter-clockwise direction around the first side of the field pole 496 then diagonally traverses the field pole 496 to the second side where the second brake winding 500 is wrapped in an opposite direction to the first brake winding 498. In this manner, only three lead wires extend from the field pole 496, reducing cost and complexity. A first lead wire 514 connects directly to the power source, a second lead wire 516 connects to the switch 24 and a third lead wire 518 connects to the first brush 342a. The first lead wire 514 is spliced to the first and second run winding 510 at point X in FIG. 23. The second lead wire 516 is spliced to the first and second brake winding wire 512 at a point Y. The third lead wire 518 is spliced to both the first and second run winding wire 510 and the first and second brake winding wire 512 at a point Z. The second brush 342b is connected to the second sub-switch 504. In this manner, the number of lead wires are reduced, thereby simplifying manufacture and reducing material costs.

(Winding Arrangements)

Figure 26:
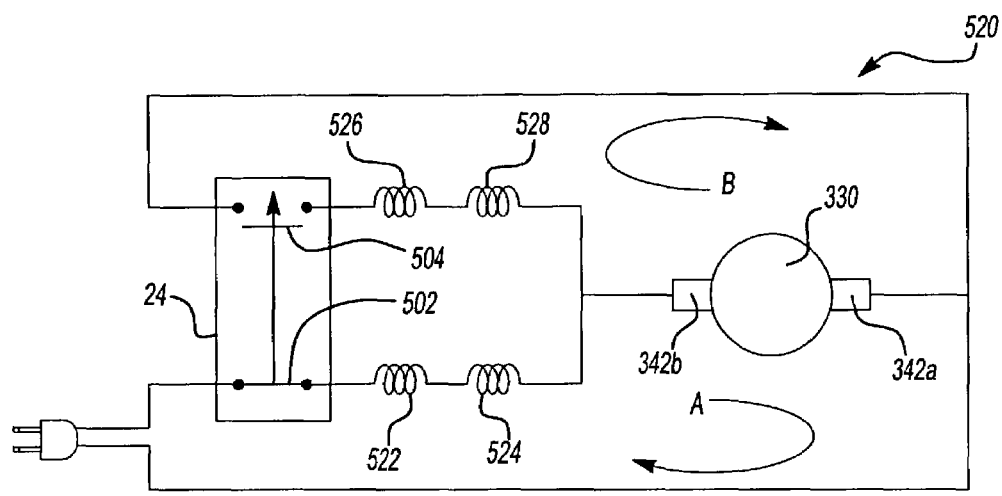
FIGS. 26 through 28 are schematic illustrations of alternative field winding arrangements.

An alternative field winding arrangement 520 is detailed in FIG. 26. The field winding arrangement 520 includes first and second run windings 522, 524 and first and second brake windings 526, 528 parallel to one another, immediately following the second brush 342b. Closure of the first sub-switch 502 completes an electrical circuit between the run windings 522 and the armature 330 enabling a current from the power source to travel around the circuit. The current path is counter-clockwise and is as follows: from the power source, through the first brush 342a, through the armature 330, through the second brush 342b, through the first and second run windings 522, 524, through the first sub-switch 502 and back to ground. Closure of the second sub-switch 504 completes an electrical circuit between the brake windings 526, 528 and the armature 330. The residual current flow, induced by the free-spinning armature 330, of the electrical circuit is generally clockwise and is as follows: from the armature 330, through the second brush 342b, through the first and second brake windings 526, 528, through the second sub-switch 504 and around through the first brush 342a back through the armature 330.

Figure 27:
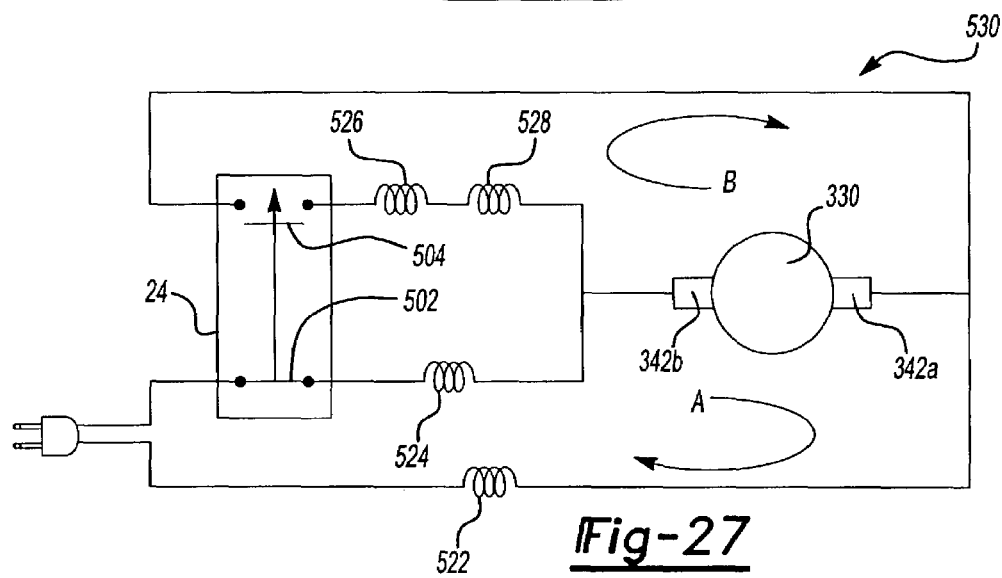

Another field winding arrangement 530 is detailed in FIG. 27. The field winding arrangement 530 is similar to the field winding arrangement 520 described immediately above, however, the first run winding 522 is positioned immediately prior to the first brush 342a. In this manner, the first and second run windings 522, 524 are balanced on either side of the armature 330. This field winding arrangement 530 is generally used for European applications that require specific limitations on the amount of radio and TV interference a motorized tool is allowed to emit. By balancing the first and second run windings 522, 524 across the armature 330, these limitations are achievable.

Closure of the first sub-switch 502 completes an electric circuit between the first and second run windings 522, 524 the power source and the armature 330. The current flow is generally counter clockwise and is as follows: from the power source, through the first run winding 522, through the first brush 342a, through the armature 330, through the second brush 342b, through the second run winding 524, through the first sub-switch 502 back through to the power source. Closure of the second sub-switch 504 completes an electrical circuit between the brake windings 526, 528 and the armature 330. The residual current flow, induced by the free-spinning armature 330, of the electrical circuit is generally clockwise and is as follows: from the armature 330, through the second brush 342b, through the first and second brake windings 526, 528, through the second sub-switch 504 and around through the first brush 342a back through the armature 330.

(Angle Grinder Brake)

Figure 28:
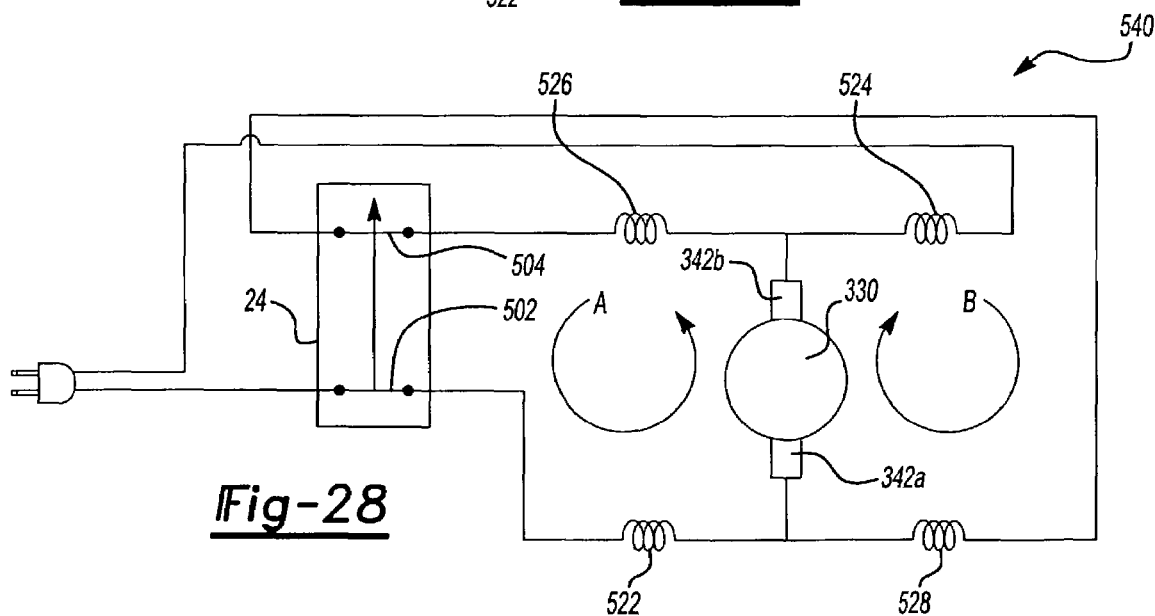

Yet another field winding arrangement 540 is detailed in FIG. 28. The field winding arrangement 540 balances both the first and second run windings 522, 524, as well as the first and second brake windings 526, 528, about the armature 330. Closure of the first sub-switch 502 completes an electrical circuit, whereby current is provided by the power source and runs counter-clockwise through the circuit, as follows: from the power source, through the first run winding 522, through the first brush 342a, armature 330 and second brush 342b, through the second run winding 524 back through to ground. Closure of the second sub-switch 504 completes another electrical circuit, whereby residual current flow, induced by the free-spinning armature 330, is generally clockwise and is as follows: from the armature 330, through the second brush 342b, through the first brake winding 526, through the second sub-switch 504 around through the second brake winding 528, through the first brush 342a back into the armature 330.

(Labyrinth Path for Protecting Open Ball Bearings) (Airflow Baffles)

Figure 29:
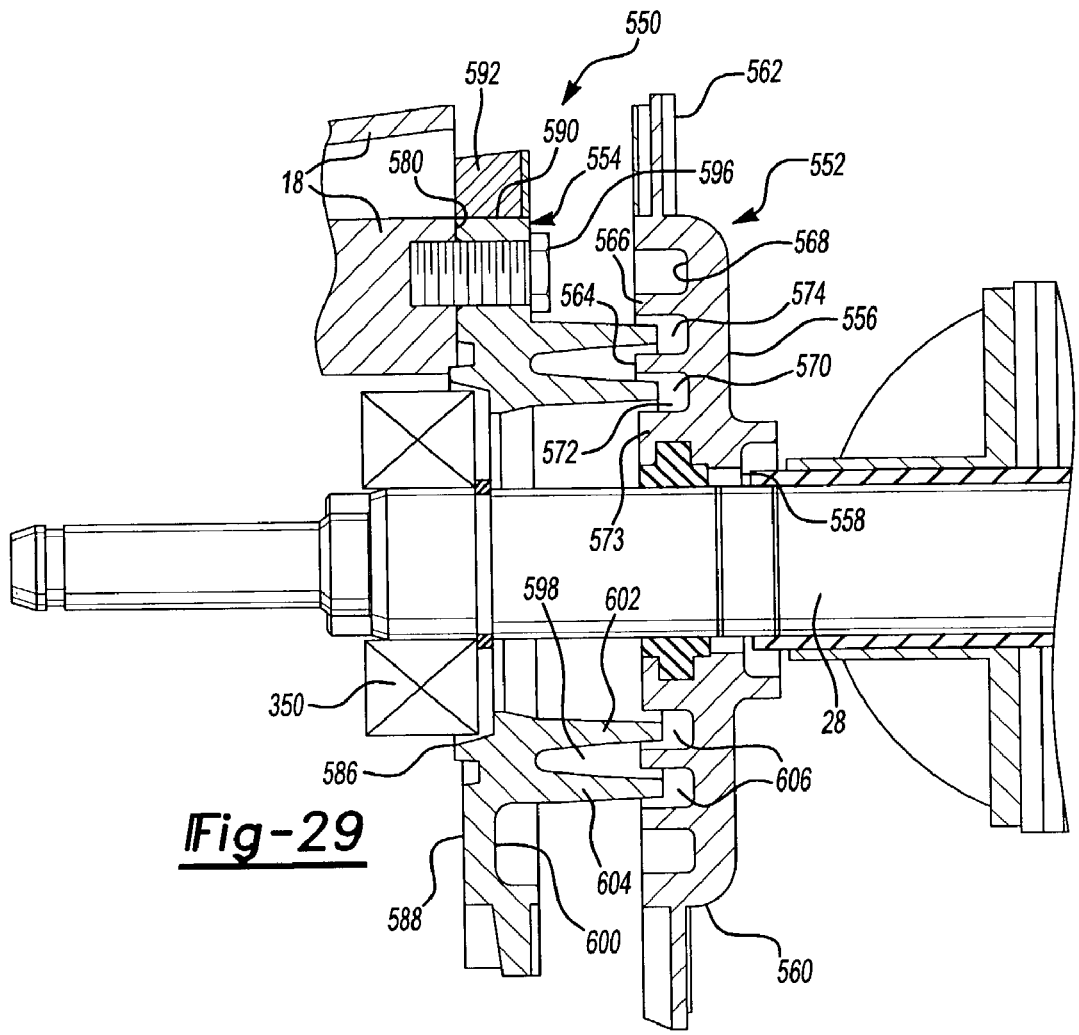
FIG. 29 is a cross-sectional view of an air flow and labyrinth path system of the large angle grinder.
Figure 30:
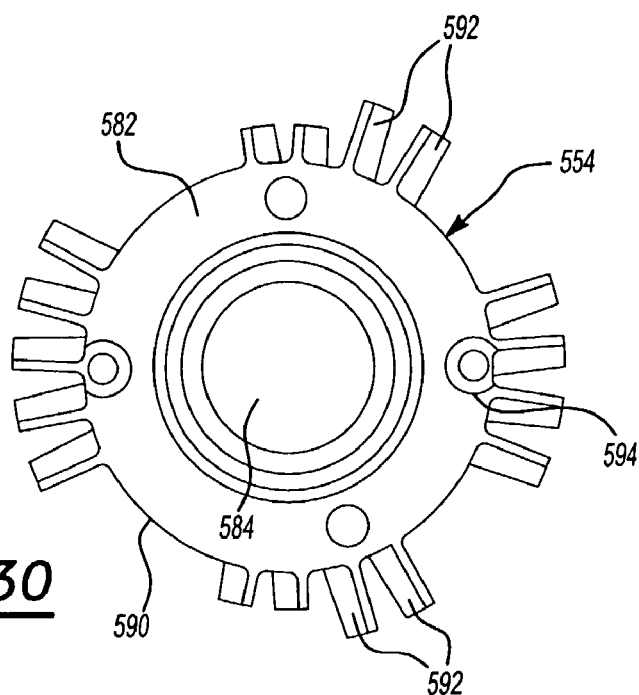
FIG. 30 is a front view of a stator assembly of the air flow system of FIG. 29.

With further reference to FIGS. 1, 29 and 30 the LAG 10 includes an airflow assembly 550 for circulating air through the field case 16. The airflow assembly 550 preferably includes a fan 552 and a stator 554. The fan 552 is fixed for rotation with the motor spindle 28 and is disposed about the motor spindle 28 immediately following the end of the armature 330. With particular reference to FIG. 29, the fan 552 may include a generally disc shaped main body 556 having a centrally disposed aperture 558 for receiving the motor spindle 28 and a circumferential surface 560 having a plurality of fan blades 562 radially extending therefrom. The fan blades 562 are preferably positioned at an angle (i.e. pitch angle) relative to the axis of rotation of the motor spindle 28, for inducing airflow through the field case 16 as the fan 552 is caused to rotate. First and second guide walls 564, 566 may axially extend from a front face 568 of the main body 556. A first gap 570 is formed between the first guide wall 564 and an inside circumferential surface 572 defined by a hub portion 573 of the main body 556. A second gap 574 is formed between the first and second guide walls 564, 566.

As detailed in FIGS. 29 and 30, the stator 554 is fixedly attached to a back wall 580 of the gear case 18 and extends into the field case 16. The stator 554 includes a main body 582 having a centrally disposed aperture 584. The bearing 350 is partially received within the aperture 584 and the motor spindle 28 is received through each, extending into the gear case 18. The main body 582 may include a radial recess 586 formed into a front face 588 for partially retaining the bearing 350 therein. The stator 554 may include an outer surface 590 having a plurality of stator fins 592 extending therefrom. The plurality of stator fins 592 are preferably positioned at varying pitch angles and lengths for directing airflow out of various openings of the housing 12. The stator 554 further includes a plurality of holes 594 for receiving screws or bolts 596 therethrough. The bolts 596 fix the stator 554 to the back wall 580 of the gear case 18.

A radial groove 598 is preferably formed into a back face 600 of the main body 582 and forms first and second guide walls 602, 604. The first guide wall 602 of the stator 554 is received into the first gap 570 of the fan 552 and the first guide wall 564 of the fan 552 is received into the radial groove 598 of the stator 554. Further, the second guide wall 604 of the stator 554 is received into the second gap 574 between the first and second guide walls 564, 566 of the fan 552, whereby the second guide wall 566 of the fan 552 extends over the second guide wall 604 of the stator 554.

A clearance fit may be provided between the engaging features of the fan 552 and stator 554, whereby the fan 552 freely rotates relative to the stator 554 as it is driven by the motor 26. Further, the engaging features of the fan 552 and stator 554 provide a labyrinth path 606 therebetween. The labyrinth path 606 inhibits dust, dirt or other debris from traveling too deeply into the various integral components of the LAG 10. Specifically, the labyrinth path 606 inhibits debris from seeping between clearances in the motor spindle 28, bushing and stator 554 interfaces, thereby protecting the bearing 350 from such debris.

As noted previously, the motor spindle 28 is preferably supported between a pair of bearings 348, 350, including the bearing 350 partially received by the stator 554. Although the bearings 348, 350 may be any type commonly known in the art, in an exemplary embodiment, the bearings 348, 350 are preferably open ball bearings. Open ball bearings are less expensive than sealed ball bearings and therefore reduce cost, however, they are prone to attracting dirt, thus inhibiting proper function of the bearings. To prevent this, the bearings 348, 350 of the exemplary embodiment each include a cap to prevent dirt or debris from entering the interior of the respective bearings. The above-described labyrinth path 606 between the fan 552 and stator 554 further protects the open bearing from debris.

(Felt Cover for Open Ball Bearings)

Figure 31:
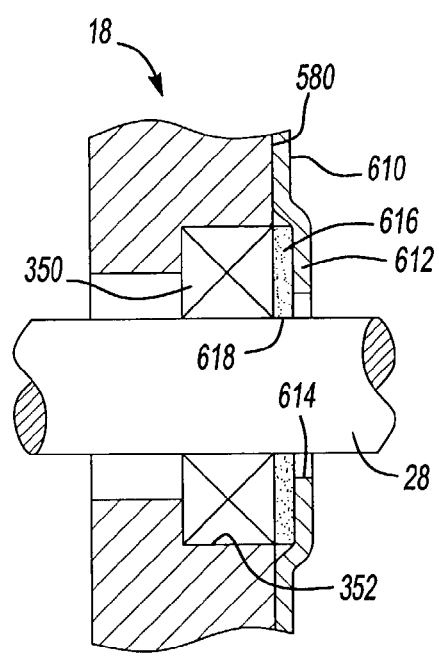
FIG. 31 is a cross-sectional view of a bearing support section of the large angle grinder including a felt ring.

In an alternative embodiment, as shown in FIG. 31 the bearing 350 is pressed into the aperture 352 by a retention plate 610 fixedly attached to the back wall 580 of the gear case 18. The retention plate 610 may include a centrally disposed stepped portion 612 having an aperture 614 therethrough. The aperture 614 enables the motor spindle 28 to pass therethrough. A felt ring 616 is provided and seats within the stepped portion 612 of the retention plate 610 between the retention plate 610 and the bearing. The felt ring 616 protects the bearing from dirt or other debris that could pass through a gap 618 between the retention plate 610 and the motor spindle 28. Such a feature is especially significant if the bearing is an open ball bearing, as described above.

(Felt Ring in Gearbox)

Figure 32:
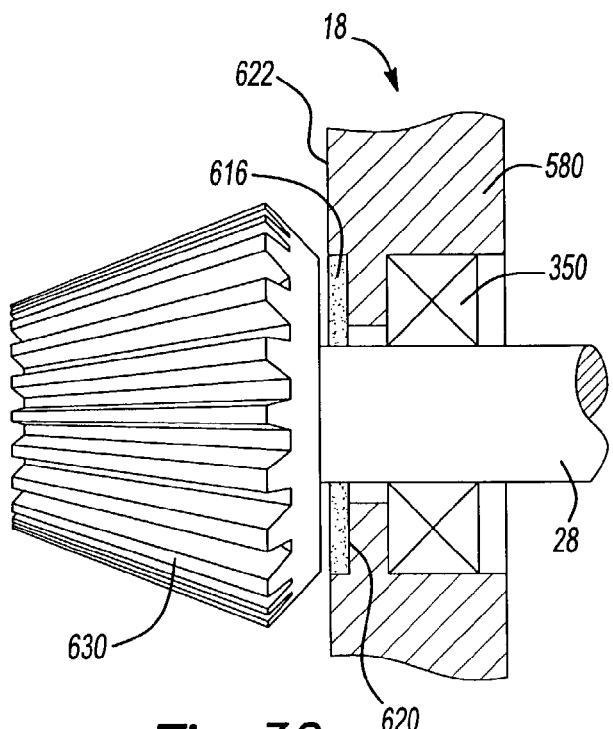
FIG. 32 is a cross-sectional view of the bearing support structure of the large angle grinder including an alternative placement for the felt ring of FIG. 31.

It is also anticipated that a felt ring 616 may be disposed on the gear case side of the bearing 350, as shown in FIG. 32. The felt ring 616 is retained within a recess 620 formed in a face 622 of the back wall 580 of the gear case 18 between a pinion gear 630 and the back wall 580. The motor spindle 28 passes through the felt ring 616 and into the gear case 18. The felt ring 616 prevents grease from the gear case 18 to migrate through clearances between the various internal components and into the field case 16.

Gearbox

The gearset 30 of the LAG 10 is disposed within the gear case 18 for translating rotational motion of the motor spindle 28 from a first axis of rotation Q to the second axis of rotation R of the wheel spindle 32. The second axis of rotation R is generally perpendicular to the first axis of rotation Q. The gearset 30 generally includes a pinion gear 630 and a ring gear or main gear 632. The pinion gear 630 is fixed for rotation with the motor spindle 28, which is rotatably driven by the motor 26. The main gear 632 is fixed for rotation with the wheel spindle 32 and is driven by the pinion gear 630. The main gear 632 is typically in the form of a bevel gear for meshed engagement with the generally frusto-conical pinion gear 630.

Both the pinion gear 630 and main gear 632 should be sized accordingly to account for the amount of torque transmitted and the gear ratio desired. The higher the torque transmission that is required, the larger the gearset 30 must be, specifically, the pinion gear 630. To reduce overall manufacturing costs, tool weight and tool efficiency, it is desirable to provide a gearset 30 that is minimal in size and weight while maximizing the amount of torque transmittable therethrough.

(Pinion Reinforcing Ring)

Figure 33:
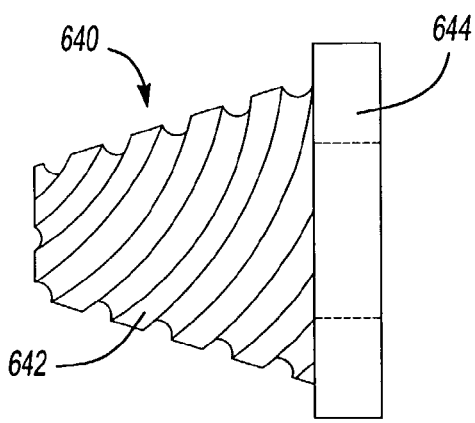
FIG. 33 is a side view of a pinion gear having a reinforcing ring.
Figure 34:
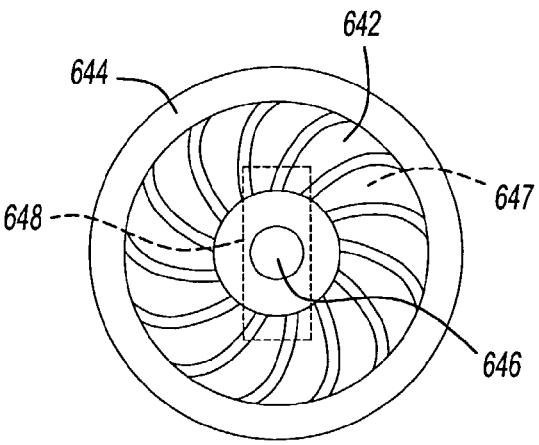
FIG. 34 is a bottom view of the pinion gear of FIG. 33.
Figure 35:
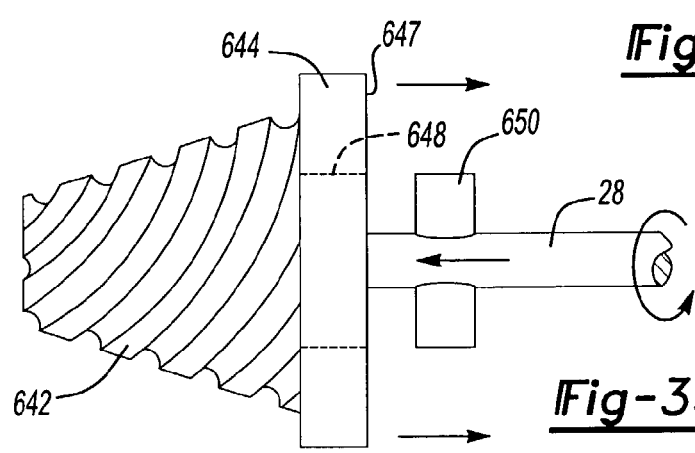
FIG. 35 is a side view of the pinion gear of FIG. 33 detailing interconnection with a motor spindle.

A pinion assembly 640 is provided, that maximizes the transmittable torque capacity of the gearset 30. With reference to FIGS. 33 through 35, the pinion assembly 640 preferably includes a pinion gear 642 and a reinforcing ring 644. The pinion gear 642 is generally frusto-conical in shape having spiral gear teeth disposed therearound. The pinion gear 642 includes a centrally disposed cylindrical passage 646 through its length. A bottom face 647 of the pinion gear 642 includes a rectangular notch 648 for keyed interface with a mating component 650 of the motor spindle 28 (illustrated in FIG. 35). In this manner, the pinion gear 642 is fixed for rotation with the motor spindle 28.

The reinforcing ring 644 is press-fit about a first end of the pinion gear 642, thereby strengthening and enabling the pinion gear 642 to transmit a torque load that is significantly higher than torque loads transmittable through equivalently sized pinion gears. Therefore, the pinion assembly 640 maximizes the torque transmission capacity of the pinion gear 642 without increasing the size of the pinion gear 642.

(Air-cooled Gear Case)

Figure 36:
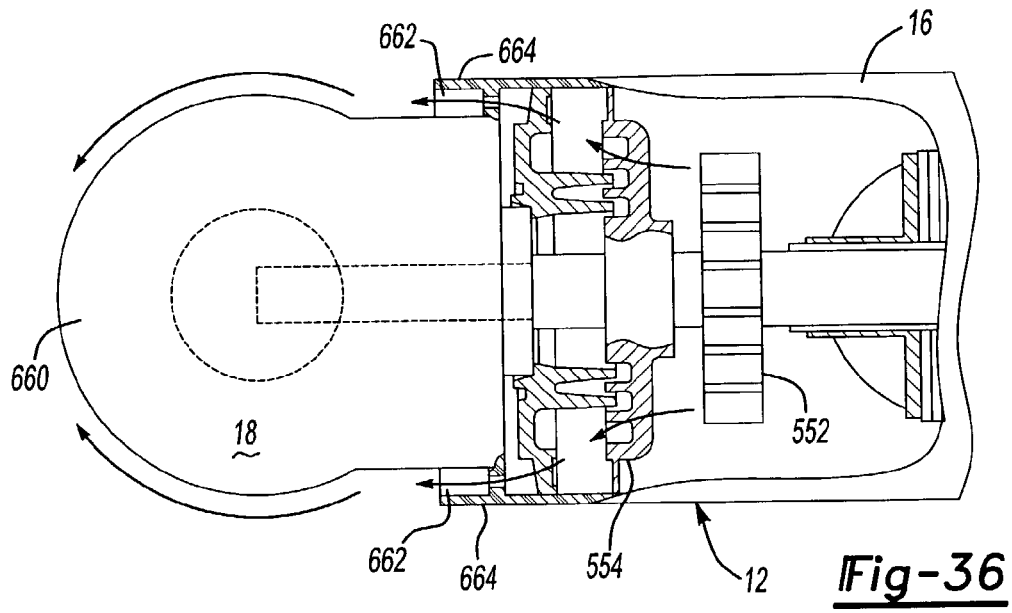
FIG. 36 is a top view of a housing having an air cooled gear case.
Figure 37:
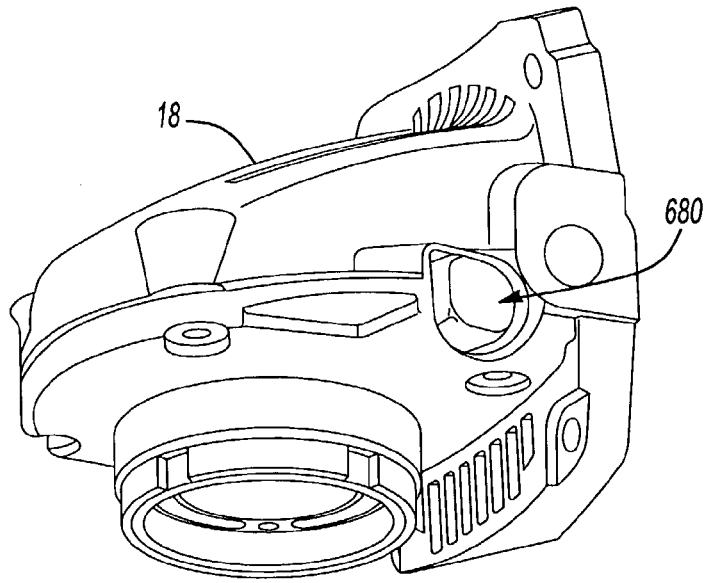
FIG. 37 is a perspective view of a gear case including a radial spindle lock.
Figure 38:
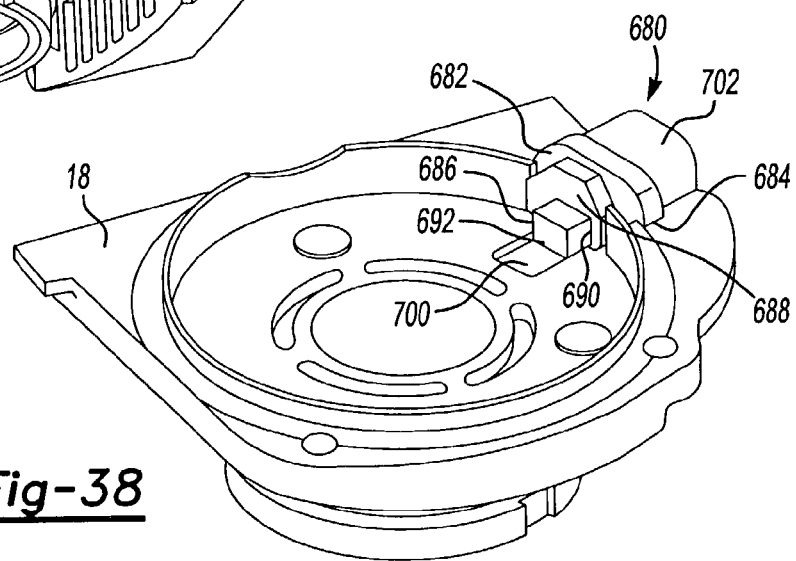
FIG. 38 is a perspective internal view of the gear case of FIG. 37.
Figure 39:
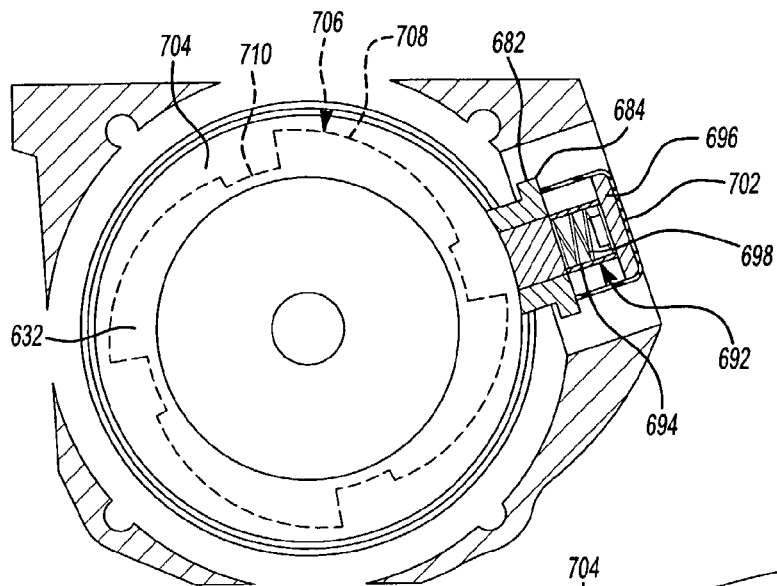
FIG. 39 is a top internal view of the gear case of FIG. 37, detailing components of the radial spindle lock.
Figure 39A:
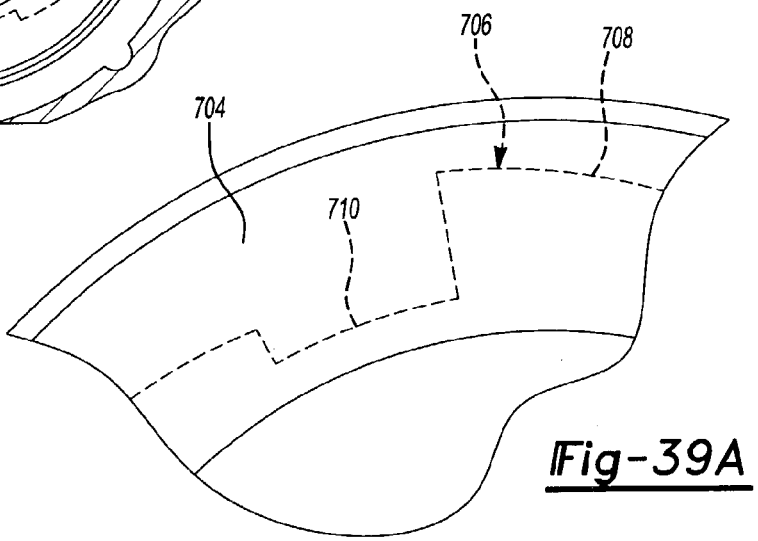

As the LAG 10 operates, the interaction between the pinion gear 630 and the main gear 632 results in heat build-up within the gear case 18. Extreme heat build-up is undesirable in that it affects the performance of the LAG, the operational life of the internal components and discomfort if touched by an operator. As shown in FIG. 36, a preferred embodiment of the gear case 18 of the present invention includes a round head portion 660. The field case 16 includes openings 662 on either side of the gear case 18 whereby each opening 662 includes a forwardly extending wing 664. Airflow (designated by arrows) induced by the fan 552 is directed out through the openings 662 by the stator 554 and is further directed by the wings 664 to travel about the circumference of the gear case 18. The air is effectively "pinched" between the wings 664 and the outside of the gear case 18 forcing the air to travel at increased speed across the surface of the gear case 18. The airflow carries away heat generated within the gear case 18, thereby cooling the gear case 18. In this manner, the performance of the LAG 10 is maintained and the operational lives of the internal components are extended.

Grinder Wheel

As previously discussed, the grinder wheel 34 is selectively fixed for rotation with the wheel spindle 32. As shown in FIG. 1, the grinder wheel 34 is received onto the wheel spindle 32 and may be secured thereto by a nut 670. The grinder wheel 34 may be removed for several reasons, including LAG 10 maintenance, replacement of a broken or worn grinder wheel 34, or exchanging the type of grinder wheel 34 used (e.g. fine, coarse).

Traditional LAG's 10 require the use of two tools to remove the grinder wheel 34 from the wheel spindle 32. One tool is used to prevent the wheel spindle 32 from rotating while the second tool is used to unscrew the nut 670 from the wheel spindle 32. This method is inefficient in that it requires the use of both hands to operate the tools and therefore, the LAG 10 must lie on the ground or a table or the like.

(Radial Spindle Lock with Safety Ramp)

With particular reference to FIGS. 37 through 40, a first embodiment of a wheel spindle lock mechanism 680 is detailed. The wheel spindle lock mechanism 680 is preferably retained by the gear case 18 and positioned radially relative to the main gear 632. The wheel spindle lock mechanism 680 enables locking of the wheel spindle 32 by holding the main gear 632 from rotation.

The wheel spindle lock mechanism 680 may include a shaft guide 682 retained in an opening 684 of the gear case 18. The shaft guide 682 may include an arcuate bottom face 686 and a top face 688 comprising three surfaces that intersect to form a generally triangular shape. The triangular top face 688 acts as a key to ensure that the wheel spindle lock mechanism 680 is properly assembled into the opening 684. The shaft guide 682 further includes a centrally disposed aperture 690, through which a lock pin 692 is disposed. The lock pin 692 includes a shaft portion 694 (FIGS. 38, 40) extending from a cap 696 and is preferably biased radially outward by a spring 698. The lock pin 692 is slidable within a groove 700 (FIG. 38) of the gear case 18 for engaging the main gear 632. The spring 698 is positioned between the shaft guide 682 and the cap 696 of the lock pin 692. A rubber boot 702 preferably covers the lock pin 692 and spring 698, seating around the shaft guide 682. The rubber boot 702 seals the wheel spindle lock mechanism 680 and gearset 30 from external dirt and debris and prevents grease leakage.

A bottom face 704 of the main gear 632 may include a plurality of ramp and groove features 706 (shown in phantom) for selective engagement with the lock pin 692. Depending upon the rotational position of the main gear 632 relative to the lock pin 692, depression of the lock pin 692 causes the end of the lock pin 692 to engage either a ramp 708 or a groove 710 of the main gear 632. If the lock pin 692 engages a ramp 708, the grinder wheel 34, and thus the wheel spindle 32 and main gear 632, are rotatable until the lock pin 692 engages a groove 710. As the grinder wheel 34 rotates, the lock pin 692 slides along a ramp 708 until engaging the groove 710. Once in engagement with the groove 710, the lock pin 692 prohibits further rotation of the main gear 632, as long as the lock pin 692 remains depressed. Releasing the lock pin 692 releases the main gear 632 and thus, the main gear 632 is again freely rotatable.

(Keyless Blade Clamp)

Referencing FIGS. 41 and 42, a keyless blade clamp 720 will be described in detail. The keyless blade clamp 720 may include an inner clamp 722 that is rotatable about the wheel spindle 32. The inner clamp 722 preferably includes a top surface 724 having a pair of grooves 726 formed therein and a bearing surface 728 generally formed as an integral washer. Each groove 726 includes a bottom face 730 and upwardly extending side faces 732. A cross-pin 734 is also included and is disposed through and fixedly attached to the wheel spindle 32 whereby ends 736 of the cross-pin 734 are received into the grooves 726. The inner clamp 722 is capable of slight clockwise and counter-clockwise rotation about the wheel spindle 32, whereby the range of rotation is obstructed by the cross-pin ends 736 contacting the side faces 732 of the grooves 726.

To assemble the grinder wheel 34 onto the wheel spindle 32, the wheel spindle 32 is initially received through a central aperture 738 of the inner clamp 722 whereby the pin ends 736 seat within the grooves 726. The grinder wheel 34 is then assembled onto the wheel spindle 32 whereby a top face 740 of the grinder wheel 34 lies adjacent to the bearing surface 728 of the inner clamp 722. The nut 670, having a bearing surface 742, is screwed onto a threaded end 744 of the wheel spindle 32 whereby the bearing surface 742 of the nut 670 lies adjacent to a bottom face 743 of the grinder wheel 34. Although the nut 670 may be sufficiently tightened, thus providing little to no play of the grinder wheel 34 between the bearing surfaces 728, 742 of the inner clamp 722 and nut 670, repetitive use of the LAG 10 tends to loosen the nut 670, thereby creating play between the bearing surfaces 728, 742.

Activation of the LAG 10 causes the wheel spindle 32 to rotate in a first direction of rotation. In the rotational direction, the cross-pin ends 736 contact one of either side faces 732 of the grooves 726 in the inner clamp 722. Because the side faces 732 extend upward at an angle, the interface between the cross-pin ends 736 and the side faces 732 cause the inner clamp 722 to travel downward, along the wheel spindle 32 toward the grinder wheel 34. This is achieved by the side faces 732 "riding along", or sliding against the cross-pin ends 736. The downward traveling inner clamp 722 pinches the grinder wheel 34 between the bearing surfaces 728, 742. In this manner, grinder wheel play is eliminated and the nut 670 is subjected to axial pressure thereby prohibiting the nut 670 from becoming loose during repetitive use of the LAG 10.

With respect to FIGS. 43 through 46, an alternative embodiment of a keyless blade clamp 720' is provided. The alternative embodiment functions similarly to the first embodiment, described above, for reducing grinder wheel play and prohibiting the nut 670 from loosening during repetitive use of the LAG.

The keyless blade clamp 720' preferably includes the wheel spindle 32 having a step 750 formed along its length. A bearing assembly 752 is also included and has an upper housing 754 that abuts the step 750 of the wheel spindle 32 and is fixed for rotation with the wheel spindle 32. A lower housing 756 of the bearing assembly 752 abuts the top surface 740 of the grinder wheel 34, frictionally interfacing the top surface 740. The nut 670 is assembled onto the threaded end 744 of the wheel spindle 32, thereby securing the grinder wheel 34 between the washer face 742 of the nut 670 and the bearing assembly 752.

Figure 45:
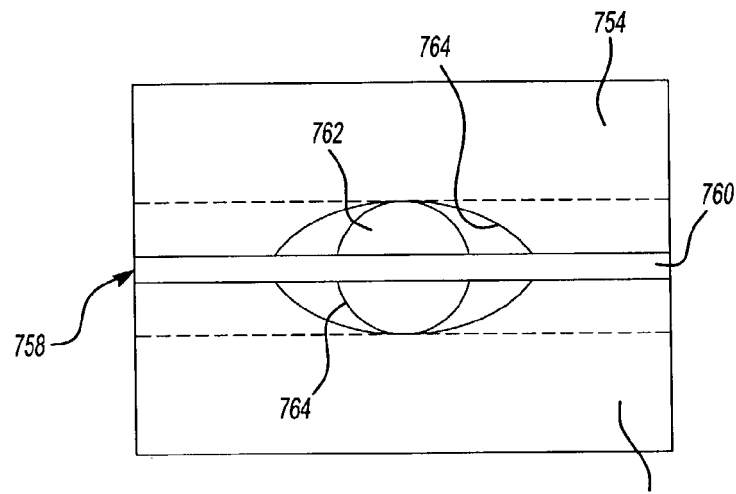
FIG. 45 is a detailed view of a ball bearing in a first position within the bearing assembly.
Figure 46:
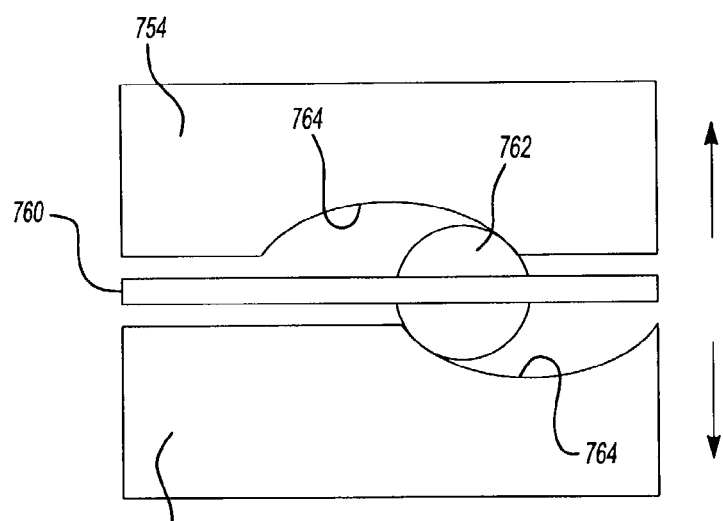
FIG. 46 is a detailed view of a ball bearing in a second position within the bearing assembly.

The bearing assembly 752 preferably includes the upper housing 754, a bearing disc 758 and the lower housing 756. The bearing disc 758 may include a washer shaped disc 760 holding a plurality of ball bearings 762 therearound, whereby the ball bearings 762 are free to rotate. The bearing disc 758 is positioned between the upper and lower housings 754, 756, whereby the plurality of ball bearings 762 ride within grooves 764 of the upper and lower housings 754, 756. As best seen in FIGS. 45 and 46 each groove 764 of the upper and lower housings 754, 756 maintains a generally arcuate shape.

As the wheel spindle 32 is caused to rotate via activation of the motor 26, the upper housing 754 rotates with the wheel spindle 32 whereby the plurality of ball bearings 762 roll along the arcuate grooves 764 of the upper housing 754. Thus, the plurality of ball bearings 762 travel downward into the arcuate grooves 764 of the lower housing 756, rolling along the arcuate grooves 764 of the lower housing 756 and forcing the lower housing 756 to rotate with the grinder wheel 34 vis-à-vis the frictional interface. In this manner, the upper and lower housings 754, 756 separate from one another (see FIG. 46) reducing grinder wheel play and prohibiting the nut 670 from becoming loose from the wheel spindle 32.

(Spindle Lock)

Figure 47:
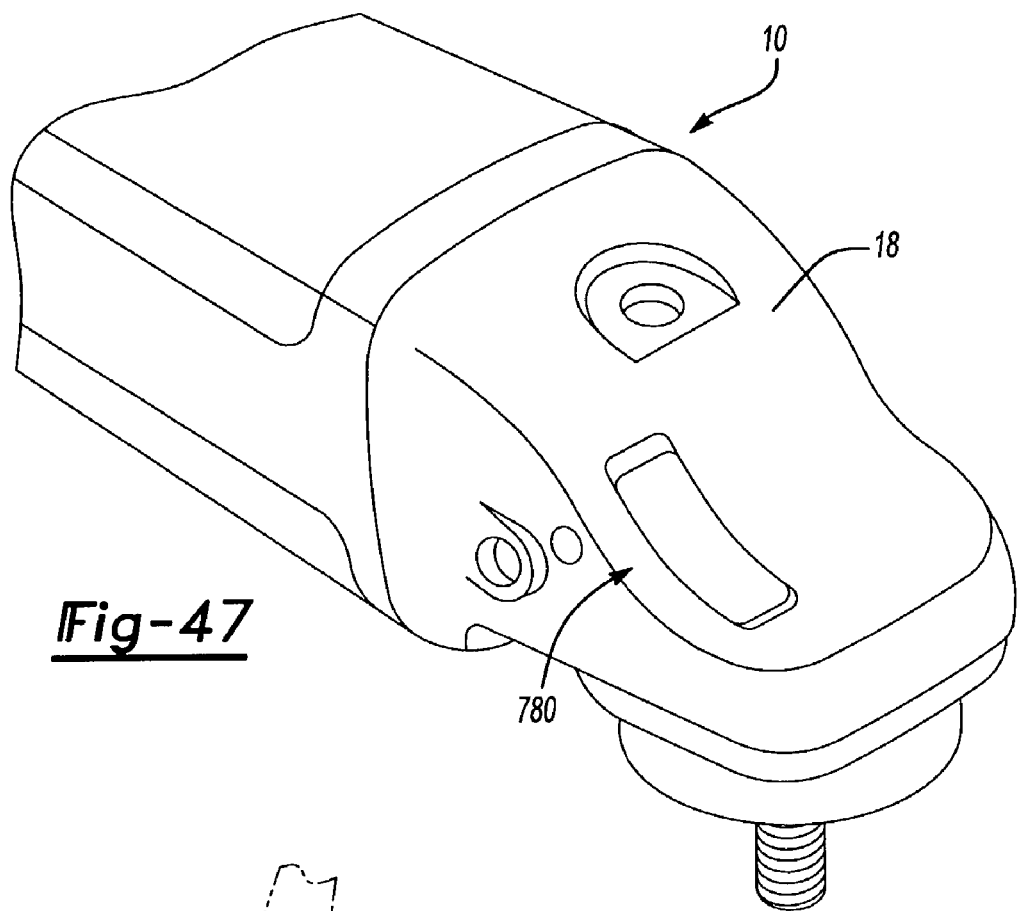
FIG. 47 is a perspective view of a large angle grinder having a spindle lock.
Figure 48:
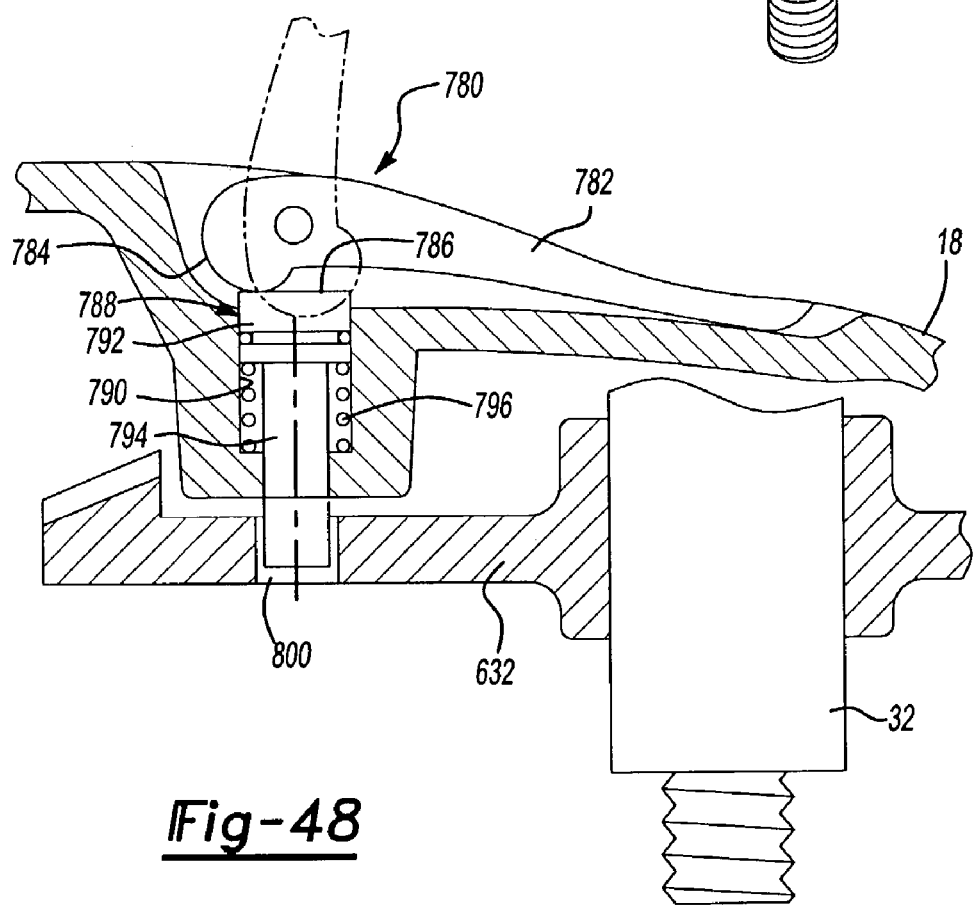
FIG. 48 is a cross-sectional view detailing components of the spindle lock of FIG. 47.

FIGS. 47 through 50 detail first and second preferred embodiments of a spindle lock mechanism 780 that enables easy removal of the grinder wheel 34 from the wheel spindle 32. Specifically, FIGS. 47 and 48 show a lever 782 that is pivotally supported by the gear case 18. The lever 782 preferably includes a cammed surface 784 that slidably interfaces a top surface 786 of a lock-piston 788. The lock-piston 788 may be slidably disposed through an opening 790 in the gear case 18 and comprises a head 792 and a stem 794. A spring 796 is disposed about the stem 794 of the lock-piston 788, immediately below the head 792, and biases the lock-piston 788 upward, into contact with the cammed surface 784.

The wheel spindle 32 is shown disposed through and fixed for rotation with the main gear 632. The main gear 632 preferably includes at least one lock-hole 800 disposed therethrough, and radially aligned with the lock-piston 788.

To lock the wheel spindle 32, thereby prohibiting rotational movement of the wheel spindle 32, the lever 782 is pivoted from an initial horizontal position, relative to the gear case 18, to a generally vertical position. As the lever 782 pivots, the cammed surface 784 acts on the lock-piston 788, pushing the lock-piston 788 downward against the biasing force of the spring 796. After sufficient displacement of the lock-piston 788, the stem 794 is received into the lock-hole 800. The stem 794 prevents the main gear 632 from rotation, further preventing the wheel spindle 32 from rotating. Pivoting the lever 782 to its initial horizontal position enables upward displacement of the lock-piston 788 provided by the biasing force of the spring 796. With the stem 794 disengaged from the lock-hole 800, the main gear 632, and thus the wheel spindle 32 are again free to rotate.

Figure 49:
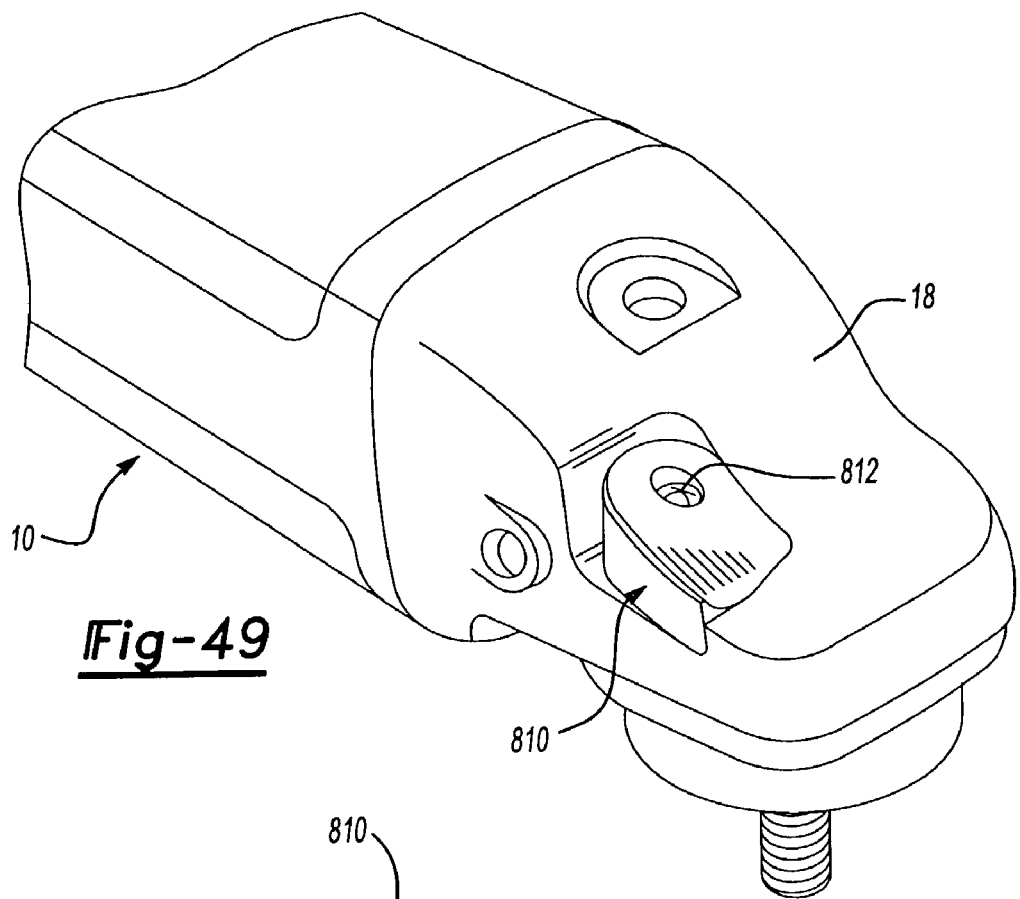
FIG. 49 is a perspective view of a large angle grinder including an alternative spindle lock.
Figure 50A:
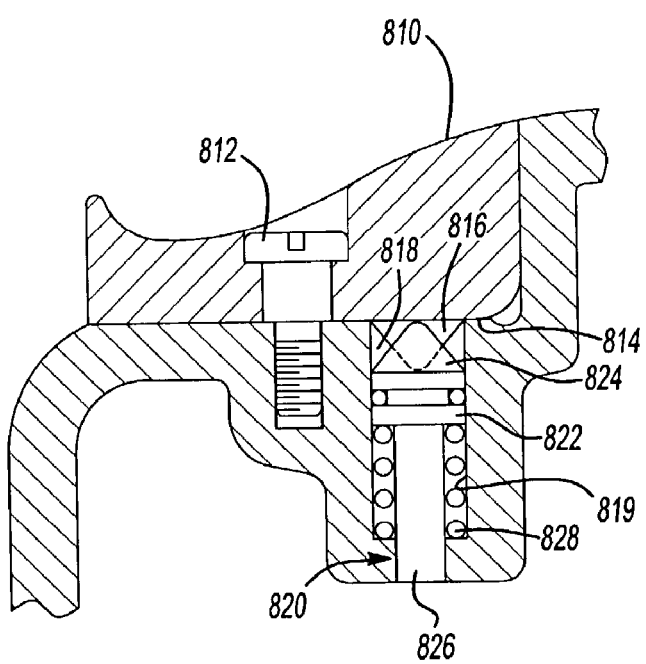
FIG. 50A is a cross-sectional view detailing components of the spindle lock of FIG. 49.
Figure 50B:
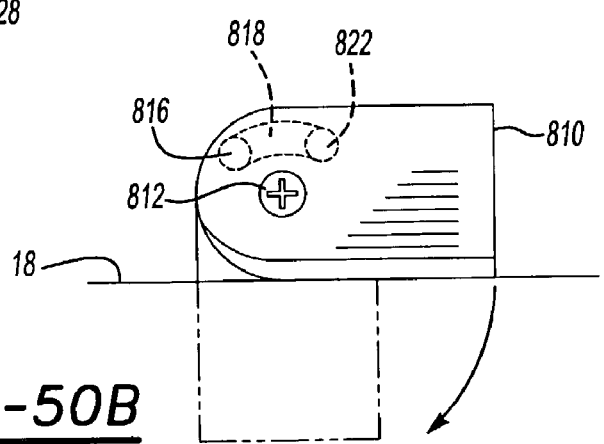
FIG. 50B is a plan view of the lever illustrating a disengagement position for the spindle lock of FIG. 49.

FIGS. 49 and 50 detail a lever 810 that may be rotatably attached to the gear case 18 by a screw 812. A bottom face 814 of the lever 810 preferably includes a protruding detent 816 that is slidably disposed through an arcuate groove 818 within the gear case 18. The gear case 18 also includes an opening 819, through which a lock-piston 820 is slidably disposed. The lock-piston 820 includes a head 822 having an upwardly extending detent 824 and a stem 826. A spring 828 is disposed about the stem 826 of the lock-piston 820, immediately below the head 822, and biases the lock-piston 820 upward, into contact with the bottom face 814 of the lever 810.

In a first position, the detent 824 of the lock-piston 820 is in contact with only the bottom face 814 of the lever 810. However, as the lever 810 rotates to a second position, the detent 816 of the lever 810 slides within the arcuate groove 818, into contact with the detent 824 of the lock piston 820, thus pushing the lock piston 820 downward against the biasing force of the spring 828. Similarly as described above, with reference to FIG. 48, the stem 826 of the lock-piston 820 is received into the lock-hole 800 for prohibiting rotational motion of both the main gear 632 and the wheel spindle 32. Rotation of the lever 810 to its initial position brings the detent 816 of the lever 810 out of contact with the detent 824 of the lock-piston 820, thus enabling upward displacement of the lock-piston 820 by the spring 828. In this manner, the lock-piston 820 is disengaged from the main gear 632, whereby, the main gear 632 and wheel spindle 32 are free to rotate.

(Tool-less Wheel Removal)

Figure 51:
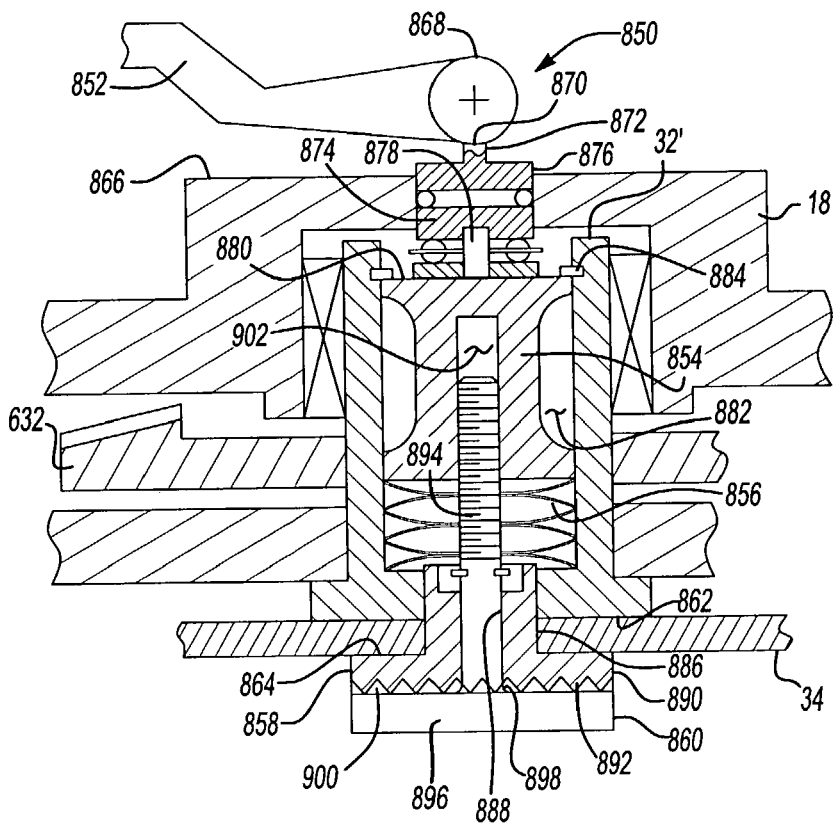
FIG. 51 is a cross-sectional view of a tool-less grinder wheel removal mechanism illustrated in a clamped position.
Figure 52:
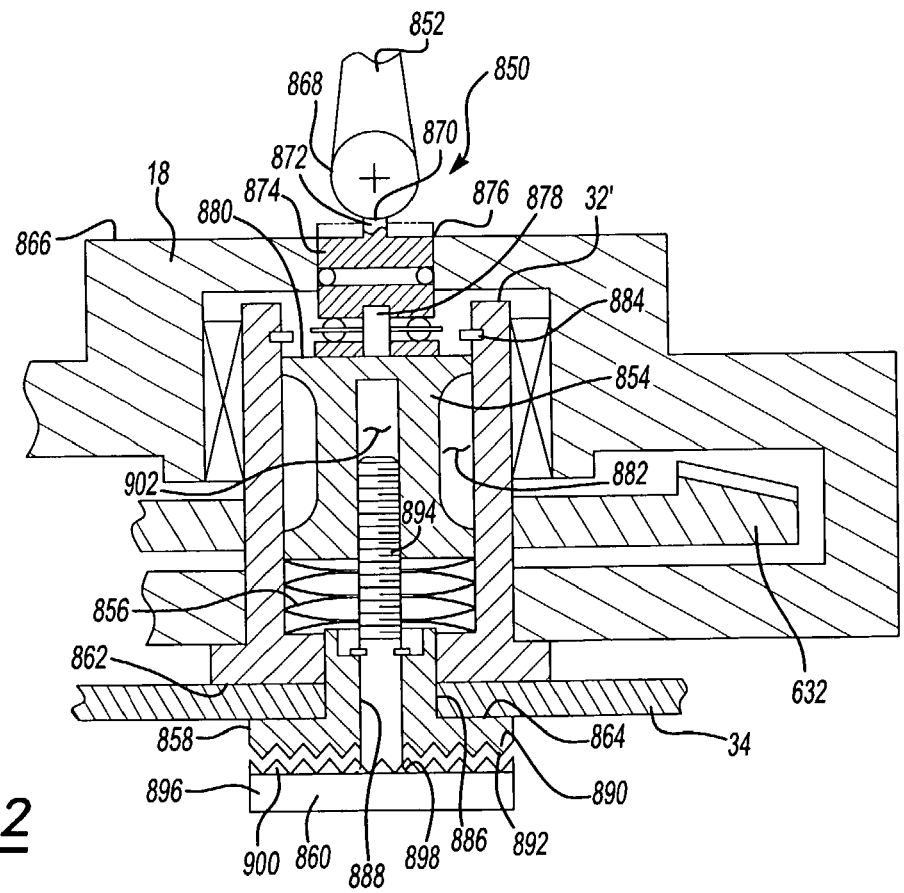
FIG. 52 is a cross-sectional view of the tool-less grinder wheel removal mechanism of FIG. 51 illustrated in an unclamped position.

An exemplary embodiment of a tool-less grinder wheel removal mechanism 850 is shown in FIGS. 51 and 52. The tool-less grinder wheel removal mechanism 850 preferably includes a lever 852, a piston 854, a series of spring washers 856, a first retainer 858 and a second retainer 860. The tool-less grinder wheel removal mechanism 850 may be generally disposed within a tubular wheel spindle 32'. The wheel spindle 32' may be disposed through and fixedly attached to the main gear 632. The grinder wheel 34 may be clamped between a clamping surface 862 of the wheel spindle 32' and a corresponding clamping surface 864 of the first retainer 858. In this manner, the grinder wheel 34 is engaged for rotation with the wheel spindle 32' as the main gear 632 drives the wheel spindle 32'.

The lever 852 may be rotatably mounted to a top surface 866 of the gear case 18 and includes a cammed surface 868. The cammed surface 868 slidably interfaces a top face 870 of a pin 872 that upwardly extends from an intermediate piston 874 slidably disposed within an opening 876 of the gear case 18. The intermediate piston 874 includes a downwardly extending pin 878 that contacts a top surface 880 of the piston 854. The piston 854 is slidably disposed within a cavity 882 of the wheel spindle 32' and is located between an upper stop ring 884 and the spring washers 856. The spring washers 856 bias the piston 854 upward within the cavity 882.

The first retainer 858 is disposed through a central opening 886 in the grinder wheel 34 and includes a generally cylindrical opening 888 therethrough. A bottom surface 890 of the first retainer 858 includes a plurality of teeth 892. The second retainer 860 includes a threaded stem 894 extending from a disc 896. The disc 896 includes an upper surface 898 having a plurality of teeth 900 that selectively mesh with the teeth 892 of the first retainer 858. The threaded stem 894 of the second retainer 860 is received through the cylindrical opening 888 of the first retainer 858 and upwards through the spring washers 856, for threaded engagement with a threaded cavity 902 of the piston 854.

To remove the grinder wheel 34, the lever 852 is pivoted from a horizontal position to a vertical position relative to the gear case 18. As the lever 852 pivots, the cammed surface 868 interfaces with the pin 872 to slide the intermediate piston 874 downward within the opening 876, which further slides the piston 854 downward, against the biasing force of the spring washers 856. Downward displacement of the piston 854 translates to equivalent downward displacement of the second retainer 860 relative to the first retainer 858, wherein the teeth 892 of the first retainer 858 and the teeth 900 of the second retainer 860 are removed from meshed engagement with one another. The second retainer 860 may thus be unscrewed from threaded engagement with the piston 854, thereby enabling removal of the grinder wheel 34.

To assemble the grinder wheel 34 to the LAG 10, the threaded stem 894 of the second retainer 860 is inserted through the cylindrical opening 888 of the first retainer 858 and upwards through the wheel spindle 32', into threaded engagement with the piston 854. The second retainer 860 is threaded to a sufficient depth into the piston 854 by gripping and rotating the disc 896 of the second retainer 860. Once sufficiently threaded, the lever 852 is pivoted from the vertical position back to the horizontal position. As the lever 852 pivots, the cammed surface 868 relieves downward force on the intermediate piston 874, thus enabling upward travel of both the intermediate piston 874 and the piston 854 by the upward biasing force of the spring washers 856. As a result, the piston 854 pulls upward on the second retainer 860, through the first retainer 858, thereby meshing the teeth 892, 900 of the first and second retainers 858, 860.

(Tool-less Wheel Removal)

Figure 53:
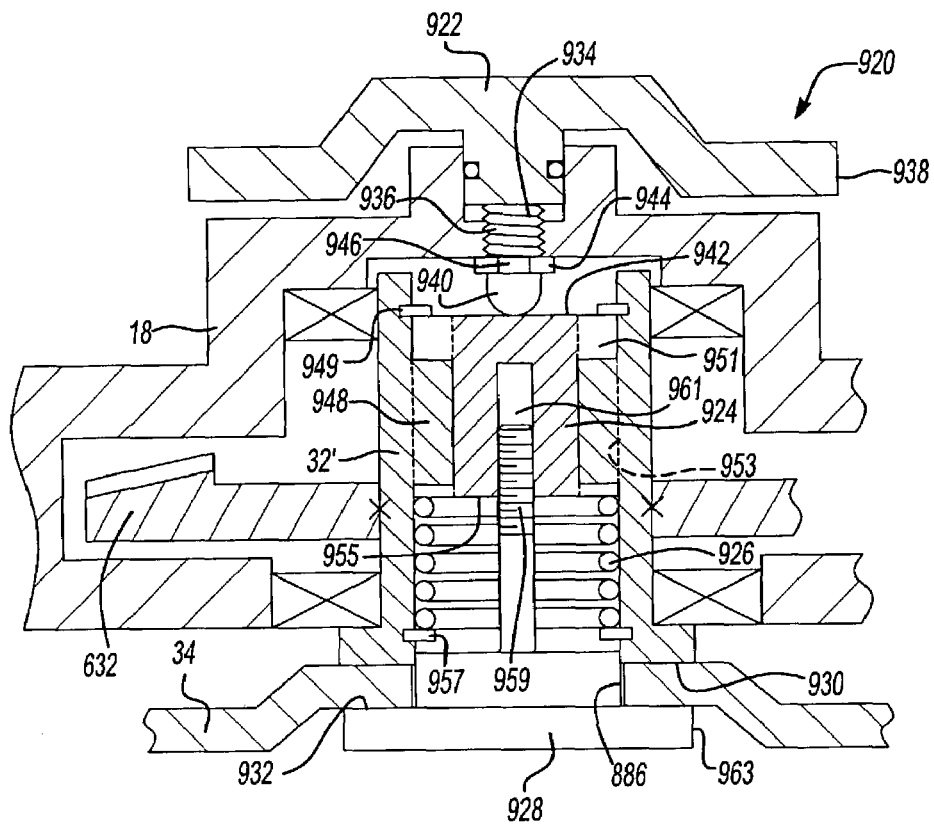
FIG. 53 is a cross-sectional view of an alternative tool-less grinder wheel removal mechanism illustrated in a clamped position.
Figure 54:
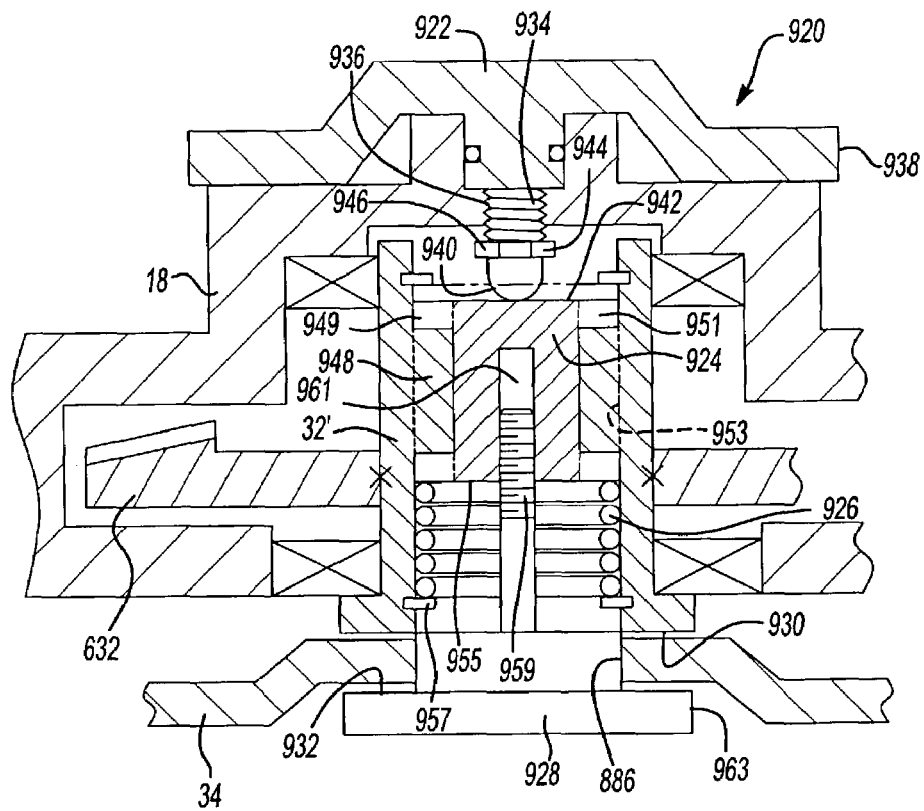
FIG. 54 is a cross-sectional view of the alternative tool-less grinder wheel removal mechanism of FIG. 53 illustrated in an unclamped position.

With reference to FIGS. 53 and 54, an alternative embodiment of a tool-less grinder wheel removal mechanism 920 will be described in detail. The tool-less grinder wheel removal mechanism 920 preferably includes a thumbwheel 922, a piston 924, a tension spring 926 and a pulling retainer 928 and is disposed within a generally tubular wheel spindle 32'. The wheel spindle 32' is disposed through and fixedly attached to the main gear 632. The grinder wheel 34 is clamped between a clamping surface 930 of the wheel spindle 32' and a corresponding clamping surface 932 of the pulling retainer 928. In this manner, the grinder wheel 34 is engaged for rotation with the wheel spindle 32' as the main gear 632 drives the wheel spindle 32'.

The thumbwheel 922 includes a threaded extension 934 for threaded engagement with a threaded opening 936 in the gear case 18 and a formed circumferential surface 938 for easy grip. An end 940 of the threaded extension 934 is rounded and contacts a top surface 942 of the piston 924. A stop ring 944 seats within a groove 946 of the threaded extension 934 for prohibiting disengagement of the thumbwheel 922 with the gear case 18. The piston 924 is slidably disposed within a cavity 948 of the wheel spindle 32' and is positioned between an upper stop ring 949 and the tension spring 926. However, the piston 924 is prohibited from rotating relative to the wheel spindle 32' by a spline interface 951 with an internal surface 953 of the wheel spindle 32'. The tension spring 926 is disposed between a bottom surface 955 of the piston 924 and a lower stop ring 957, whereby the tension spring 926 biases the piston 924 upward within the wheel spindle 32'. The pulling retainer 928 includes a threaded extension 959 that is threadably engaged with a cavity 961 of the piston 924 and further includes a formed circumferential surface 963 for easy grip.

To remove the grinder wheel 34, the thumbwheel 922 is rotated generally clockwise wherein the threaded extension 934 travels downward within the threaded opening 936. As the threaded extension 934 travels downward, the rounded end 940 pushes the piston 924 downward against the biasing force of the tension spring 926. Subsequently, the pulling retainer 928 travels downward relative to the wheel spindle 32' thus relieving clamping pressure between the clamping surfaces 930, 932 of the wheel spindle 32' and the pulling retainer 928. With the clamping pressure relieved, the pulling retainer 928 is rotatable for disengagement from the piston 924, and thus, the grinder wheel 34 may be removed from the LAG 10.

To assemble the grinder wheel 34 to the LAG 10, the pulling retainer 928 is inserted through the central opening 886 of the grinder wheel 34 and is threaded into the cavity 961 of the piston 924. Once the pulling retainer 928 is sufficiently threaded within the cavity 961, the thumbwheel 922 is rotated in a generally counter-clockwise direction. As the thumbwheel 922 rotates, the threaded extension 934 travels upward within the opening 936, thus relieving downward force on the piston 924. The tension spring 926 biases the piston 924 upward further carrying the pulling retainer 928 upward, again providing a clamping force between the wheel spindle 32' and the pulling retainer 928. The upward bias of the tension spring 926 provides tensile engagement between the pulling retainer 928 and the piston 924, thus prohibiting the pulling retainer 928 from inadvertent disengagement with the piston 924.

(Tool-less Wheel Removal)

Figure 55:
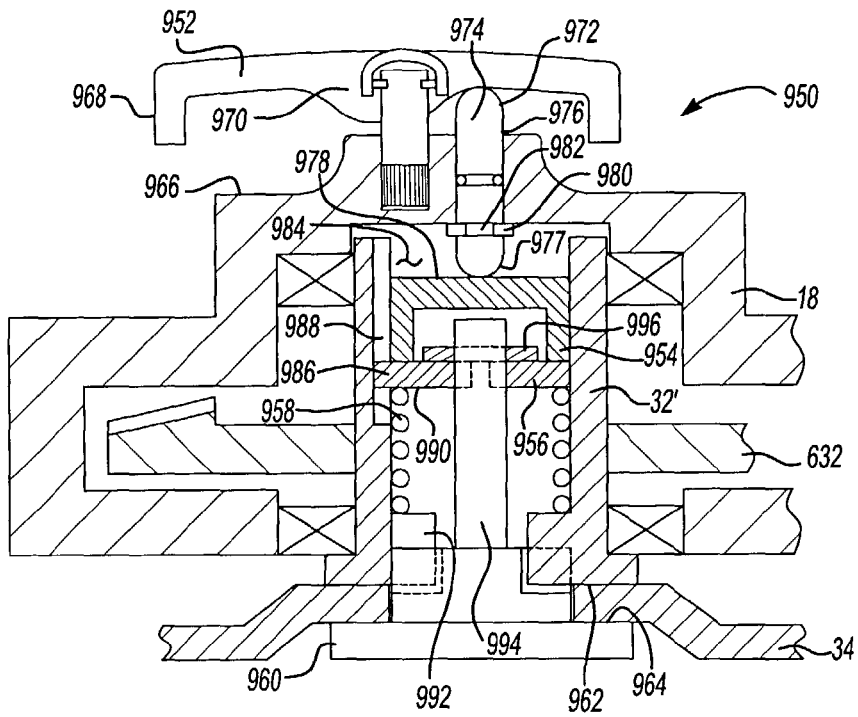
FIG. 55 is a cross-sectional view of a second alternative tool-less grinder wheel removal mechanism illustrated in a clamped position.
Figure 56:
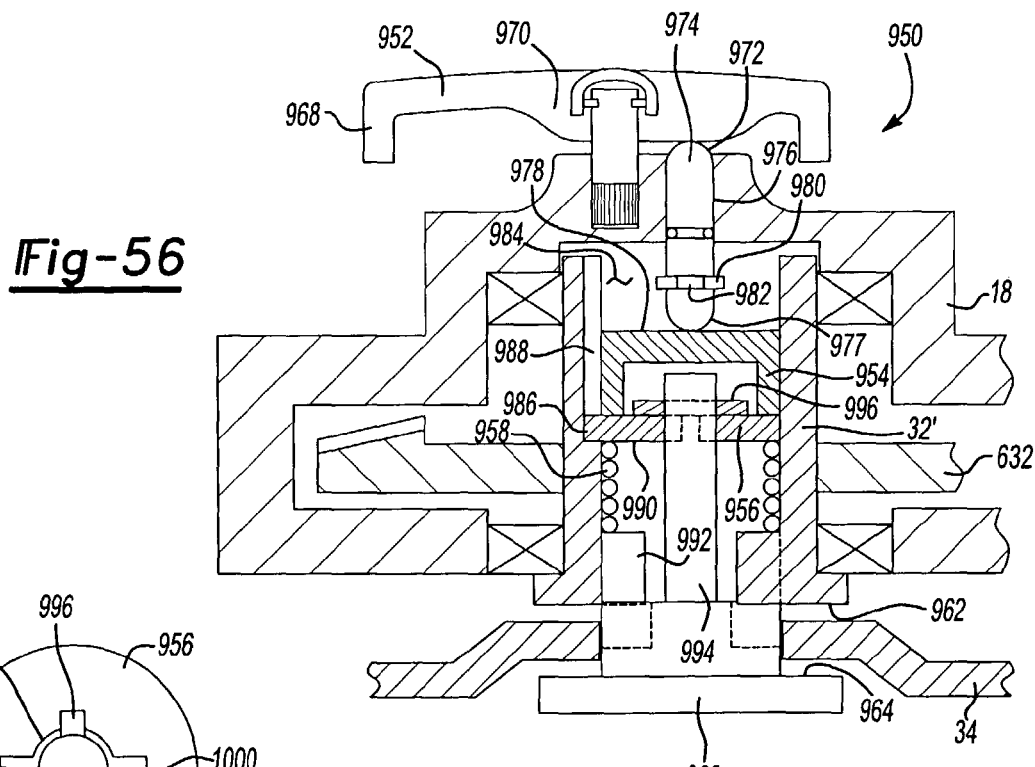
FIG. 56 is a cross-sectional view of the second alternative tool-less grinder wheel removal mechanism of FIG. 55 illustrated in an unclamped position.
Figure 57:
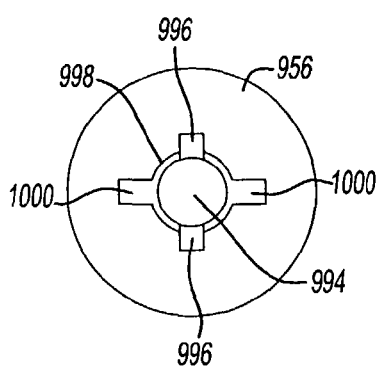
FIG. 57 is a top view of a pin interlock of the second alternative tool-less grinder wheel removal mechanism of FIGS. 55 and 56.

With reference to FIGS. 55-57, a second alternative embodiment of a tool-less grinder wheel removal mechanism 950 will be described in detail. The tool-less grinder wheel removal mechanism 950 preferably includes a thumbwheel 952, a piston 954, a retainer plate 956, a tension spring 958 and a pulling retainer 960. The piston 954 retains the plate 956 and the tension spring 958 are disposed within the generally tubular wheel spindle 32'. The wheel spindle 32' is disposed through and fixedly attached to the main gear 632. The grinder wheel 34 is clamped between a clamping surface 962 of the wheel spindle 32' and a corresponding clamping surface 964 of the pulling retainer 960. In this manner, the grinder wheel 34 is engaged for rotation with the wheel spindle 32' as the main gear 632 drives the wheel spindle 32'.

The thumbwheel 952 may be rotatably mounted to a top surface 966 of the gear case 18 and includes a formed circumferential surface 968, for easy grip, and a cammed bottom surface 970. The thumbwheel 952 is rotatable about an axis that is generally offset from and parallel to the axis of rotation of the wheel spindle 32'. The cammed bottom surface 970 of the thumbwheel 952 slidably interfaces a rounded end 972 of a pin 974 that is slidable within an opening 976 of the gear case 18. An opposing end 977 of the pin 974 is rounded and contacts a top surface 978 of the piston 954. A stop ring 980 seats within a groove 982 of the pin 974 for prohibiting removal of the pin 974 from the gear case 18.

The piston 954 is slidably disposed within a cavity 984 of the wheel spindle 32' and is positioned immediately above the retainer plate 956. The retainer plate 956 is prohibited from rotating relative to the wheel spindle 32' by a spline interface 986 with an internal surface 988 of the wheel spindle 32'. The tension spring 958 may be disposed between a bottom surface 990 of the retainer plate 956 and a lower stop ring 992, thereby biasing both the piston 954 and the retainer plate 956 upward.

The pulling retainer 960 is selectively engageable with the retainer plate 956 and includes an extension 994 having lock pins 996. As best seen in FIG. 57, the extension 994 is receivable through a centrally disposed opening 998 of the retainer plate 956 that includes slots 1000. The lock pins 996 align with the slots 1000 enabling the extension 994 to pass through the opening 998. Once through, the pulling retainer 960 is rotatable relative to the retainer plate 956 wherein the lock pins 996 are out of alignment with the slots 1000 and the extension 994 is prohibited from disengagement with the retainer plate 956.

To remove the grinder wheel 34 from the LAG 10, the thumbwheel 952 is rotated wherein the cammed bottom surface 970 acts on the pin 974, pushing the pin 974 downward within the opening 976. As the pin 974 travels downward, the rounded end 972 pushes the piston 954 downward against the biasing force of the tension spring 958. Subsequently, the pulling retainer 960 travels downward relative to the wheel spindle 32' thus relieving clamping pressure between the clamping surfaces 962, 964 of the wheel spindle 32' and the pulling retainer 960. With the clamping pressure relieved, the pulling retainer 960 is rotatable for aligning the lock pins 996 of the extension 994 with the slots 1000 of the retainer plate 956. Thus, the pulling retainer 960 is disengagable from the retainer plate 956 and the grinder wheel 34 is removable from the LAG 10.

To assemble the grinder wheel 34 to the LAG 10, the pulling retainer 960 is inserted through the central opening 886 of the grinder wheel 34 and is positioned such that the lock pins 996 align with the slots 1000. Once the extension 994 of pulling retainer 960 is sufficiently through the opening 998, the pulling retainer 960 is rotatable wherein the lock pins 996 and slots 1000 are out of alignment. The thumbwheel 952 is again rotated and the biasing force of the tension spring 958 ultimately pushes the pin 974 upward against the cammed surface 970. As the thumbwheel 952 rotates, the cammed surface 970 enables upward travel of the pin 974 within the opening 976. The upward biasing of the tension spring 958 pushes the retainer plate 956 upward, thus pulling the pulling retainer 960 upward, again providing a clamping force between the wheel spindle 32' and the pulling retainer 960. The upward bias of the tension spring 958 provides tensile engagement between the pulling retainer 960 and the retainer plate 956, thus prohibiting the pulling retainer 960 from inadvertent disengagement with the retainer plate 956.

(Double Wall Gear Case/Air Bleed System)

Figure 40:
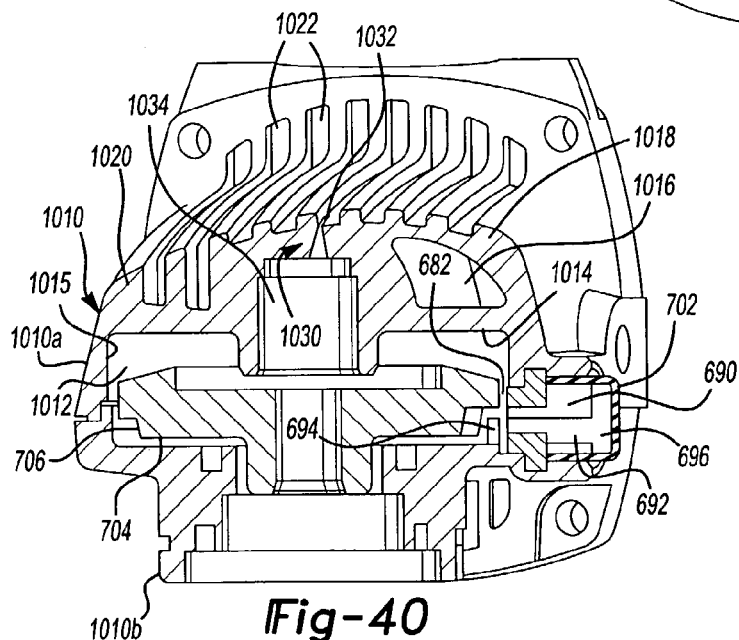
FIG. 40 is a cross-sectional view of the gear case of FIG. 37.
Figure 44:
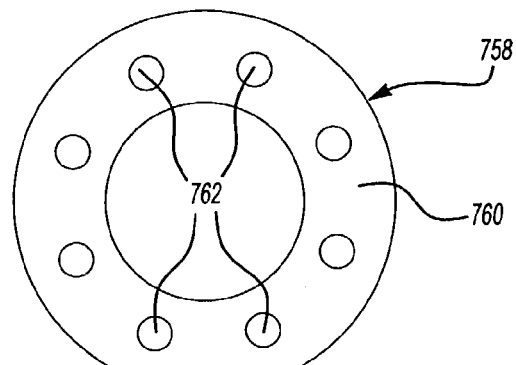
FIG. 44 is a top view of a bearing assembly implemented with the alternate embodiment of the keyless blade clamp of FIG. 43.

With reference to FIGS. 40 and 58, a double-wall gear case 1010 will be described in detail. The double-wall gear case 1010 preferably includes first and second gear case portions 1010a, 1010b. First gear case portion 1010a includes a gear well 1012 defined by an inner wall 1014 and a circumferential wall 1015 formed within the first gear case portion 1010a. An airflow cavity 1016 may also be included within the first gear case 1010a and is defined by an upper wall 1018 and an outer wall 1020 of the gear case portion 1010a. The outer wall 1020 of the first gear case portion 1010a includes a plurality of baffled openings 1022. The airflow cavity 1016 is in fluid communication via an opening 1024 with the fan 552, described in detail above, whereby air driven by the fan 552 flows through the air flow cavity 1016 and out the plurality of baffled openings 1022. The driven air vents through the plurality of baffled openings 1022, thus cooling the gear case 1010.

As the LAG 10 operates, increased heat and pressure forces grease out any available openings of the gear case 1010. To compensate for this, traditional gear wells are large in profile for providing a large expansion chamber. The large profile gear wells, although inhibiting forced grease flow out of the gear case 18, increase the size of the LAG 10. The gear well 1012 of the double wall gear case 1010 is generally lower in profile than traditional wells and therefore provides a lower volume expansion chamber. To account for increased pressure within the gear well, an air bleed system is provided.

Again referencing FIG. 40, a first exemplary embodiment of an air bleed system 1030 is detailed. The air bleed system 1030 includes a bleed hole 1032 formed in the outer wall 1020 of the double-wall gear case 1010. The bleed hole 1032 is disposed immediately above a cavity 1034 that retains the wheel spindle 32 and a wheel spindle bushing (not shown), and is generally conical in shape, tapering upwards until apexing at the bleed hole 1032. Developing pressure within the gear well 1012 is relieved as pressurized air seeps through the wheel spindle 32 and wheel spindle bushing interface (not shown) and out the bleed hole 1032. The conical shape of the bleed hole 1032 is designed to inhibit outward pressurized grease flow. The location of the bleed hole also reduces the risk of gears flinging grease into the opening, blocking air exhaust. Centrifugal forces tend to keep grease away from the exhaust port when the port is located on the spindle bearing hub.

With reference to FIG. 59, a second exemplary embodiment of an air bleed system 1040 is detailed. The air bleed system 1040 includes a channel 1042 formed along a length of a wheel spindle cavity 1044. A bleed hole 1046 is also included, which exits back into an upper chamber 1048 of the double-wall gear case 1010. A porous material 1050 seats within an upper portion of the cavity 1044 between the channel 1042 and the bleed hole 1046. The porous material inhibits grease from exiting the bleed hole 1046 while enabling outward flow of pressurized air.

As discussed above, the air bleed system 1030, 1040 enables pressure release from within the gear well 1012, thus reducing the chance of outward forced grease flow. In this manner, a smaller well profile is achievable. As a result of the smaller profile, grease is maintained in closer proximity to the internal components of the gearbox thus extending gear component life and reducing heat build up. Also, a smaller gear case is achievable enabling the design of smaller tools, reducing both material cost and weight. Further, the air cavity provides improved cooling of the gearbox, thus improving the operational life of the SAG 10.

Wheel Guard

Again referencing FIG. 1 the gear case 18 may further include a wheel guard mount 1060 extending downward and through which, the wheel spindle 32 is disposed. A wheel guard 1100 is attachable to the wheel guard mount 1060 for protecting an operator from the spinning grinder wheel 34. The wheel guard 1100 generally includes a wheel shield 1102 and an upward extending, circular flange 1104 having a gap 1106 therethrough. The wheel guard mount 1060 is received into the wheel guard flange 1104 for clamping the wheel guard 1100 to the gear case 18. The wheel guard 1100 covers an arcural portion of the grinder wheel 34 and is adjustable about the grinder wheel 34. Additionally, grinder wheel 34 sizes may vary and therefore each size requires a corresponding wheel guard 1100.

(Guard Clamping Mechanism)

FIGS. 60 and 61 detail an exemplary embodiment of a quick-release mechanism 1120 for a wheel guard 1100. The quick-release mechanism 1120 preferably includes an open clamping ring 1122 having a straight wall 1124 formed at a first end and a curved second end 1128. A link 1130 is included for selectively linking the first end 1124 of the clamping ring 1122 to the curved second end 1128. The link 1130 may include a lever 1132 pivotally attached at an intermediate point 1134 to a first end of an intermediate link 1138. A second end of the intermediate link 1138 is pivotally connected to the end of a bolt 1142 that is disposed through the straight wall 1124 of the clamping ring 1122. A first end of the lever 1132 includes a roller 1146.

As best seen in FIG. 61, the wheel guard mount 1060 of the gear case 18 is received into the clamping ring 1122. The roller 1146 is positioned to rest in the curved second end 1128 of the clamping ring 1122 with the lever 1132 positioned generally perpendicular to the clamping ring 1122. To tighten the clamping ring 1122 about the wheel guard mount 1060, the lever 1132 is depressed towards the clamping ring 1122 until it curves with, or is substantially parallel to the clamping ring 1122, thus tightening the clamping ring 1122 onto the wheel guard mount 1060. In this manner, the wheel guard 1100 may quickly and easily be replaced or adjusted.

(Improved Wheel Guard)

Figure 62:
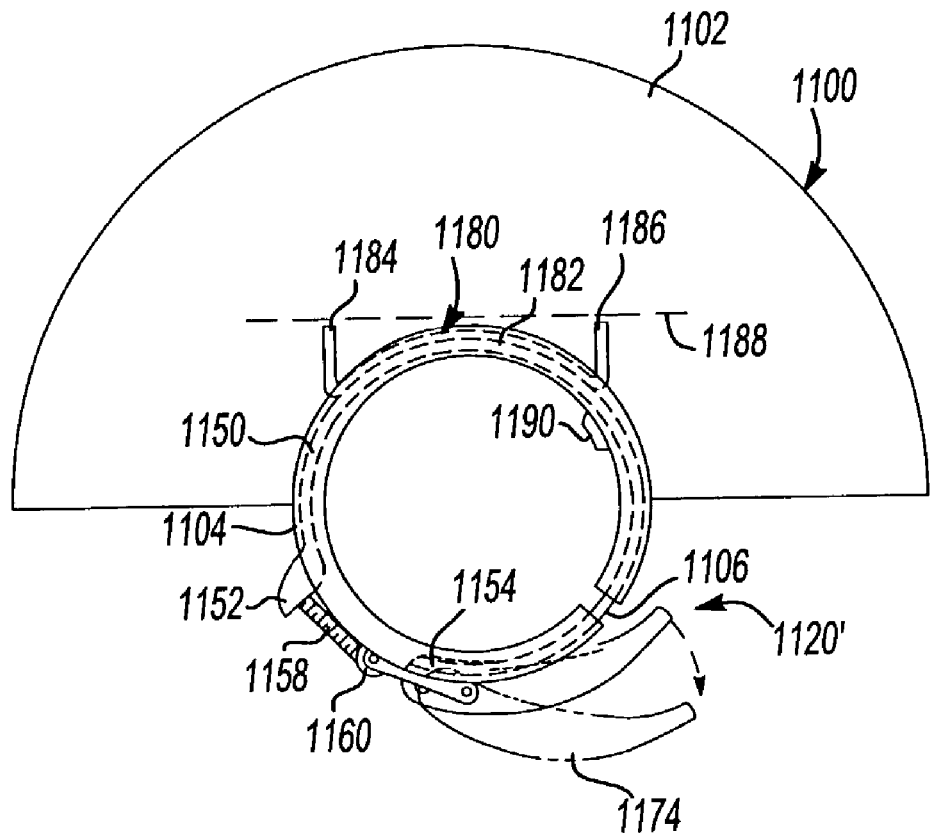
FIG. 62 is a plan view of an alternative embodiment of an adjustable wheel guard.
Figure 63:
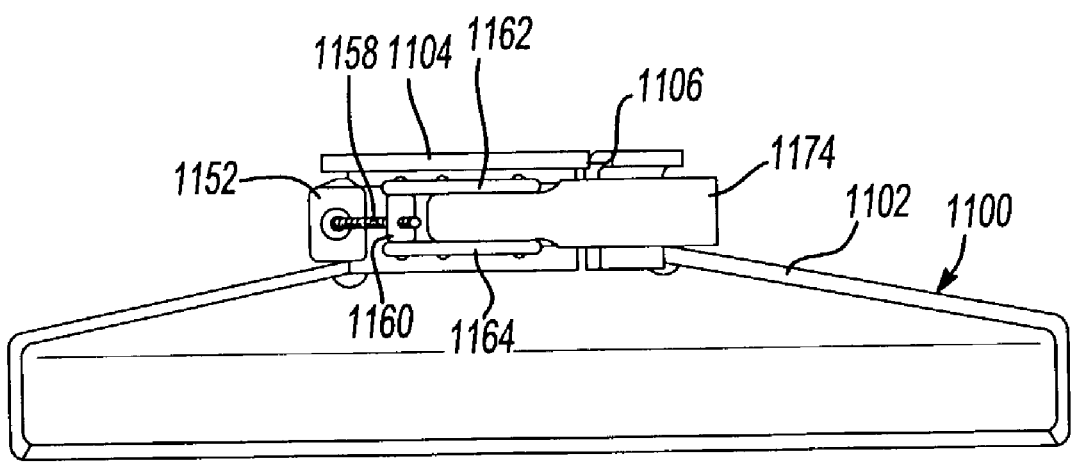
FIG. 63 is a side view of the adjustable wheel guard of FIG. 62.

An alternative embodiment of the quick-release mechanism, designated as 1120', is detailed in FIGS. 62 and 63. The quick-release mechanism 1120' includes an open clamping ring 1150 having mounting features 1152, 1154 formed at either end. A first end 1152 of the clamping ring 1150 preferably includes a threaded screw 1158 extending therefrom. The screw 1158 threads into a threaded pivot 1160 that is retained between a pair of intermediate links 1162, 1164. The intermediate links 1162, 1164, are pivotally attached to a lever 1174 along an intermediate length of the lever 1174. An end 1176 of the lever 1174 is pivotally attached to the mounting feature 1154.

An "M" shaped bracket 1180 is welded to the clamping ring 1150 on an opposite side as the lever 1174. The "M" shaped bracket 1180 includes a curved bracket portion 1182 with outward extending arms 1184, 1186 disposed on either end. The ends of the outward extending arms 1184,1186 contact an alignment feature 1188 extending downward from the gear case 18. The contact between the arms 1184, 1186 of the "M" shaped bracket 1180 and the alignment feature 1188 ensures that the quick-release mechanism 1120' remains in a constant position, relative to the gear case 18, as the wheel guard 1100 rotates for adjustment. It is also anticipated that the length of the extending arms 1184, 1186 of the "M" shaped bracket 1180 can be used as a key to ensure that proper sized wheel guards 1100 are used with their corresponding angle grinders.

The circular flange 1104 may further include an inwardly extending tab 1190 that rides in a groove 1192 (FIG. 1) formed around the wheel guard mount 1060. The tab 1190 and groove 1192 interface retains the wheel guard 1100 on the wheel guard mount 1060 as the wheel guard 1100 rotates thereabout for adjustment.

To tighten the clamping ring 1150 about the wheel guard mount 1060, the lever 1174 is depressed towards the clamping ring 1150 until it curves with, or is substantially parallel thereto. This causes the clamping ring 1150 to constrict, further constricting the circular flange 1104. The gap 1106 in the circular flange 1104 enables constricting motion of the circular flange 1104. In this manner, the wheel guard 1100 may quickly and easily be replaced or adjusted.

(Wheel Guard)

With particular reference to FIGS. 64 and 65, a second alternative embodiment of an adjustable and removable wheel guard is designated as 1100'. The wheel guard 1100' includes a flange 1200, around which a compliant ring 1202 may be disposed. The compliant ring 1202 is an open ring having first and second ends 1204, 1206, respectively, forming first and second radially extending walls 1208, 1210, respectively. The first and second walls 1208, 1210 each include an aperture 1212, 1214, respectively.

The wheel guard mount 1060 of the gear case 18 includes a ratchet surface 1216 formed around its circumference. Additionally, a groove 1218 is formed around the circumference of the wheel guard mount 1060 adjacent to the ratchet surface 1216. The wheel guard mount 1060 is received through the compliant ring 1202 which is tightened thereabout by a bolt 1220 inserted through the apertures 1212, 1214 of the first and second walls 1208, 1210. A spring 1222 is also included and is disposed about the bolt 1220, between the first wall 1208 and a bolt head 1224. The bolt 1220 is tightenable by way of threaded engagement with a nut 1226. As the bolt 1220 is tightened, the compliant ring 1202 is subsequently tightened about the wheel guard mount 1060. The spring 1222 provides slight relief of the tightening force of the compliant ring 1202.

An adjustment clip 1228 may be disposed around an external circumference of the compliant ring 1202. The adjustment clip 1228 includes an upward curving first end 1230, a tab 1232 extending radially inward, centrally disposed first and second clip arms 1234, 1236 and a ratchet tab 1238 formed at a second end 1240. The clip arms 1234, 1236 are received into first and second hooks 1242, 1244 of the compliant ring 1202, thereby holding the adjustment clip 1228 against the external circumference of the compliant ring 1202. The tab 1232 is received through an aperture 1246 in the compliant ring 1202 and seats within the groove 1218 of the wheel guard mount 1060. The tab 1232 and groove 1248 interface prevents the wheel guard 1100' from being pulled off of the wheel guard mount 1060. The ratchet tab 1238 is similarly received through an aperture 1250 in the compliant ring 1202 and interfaces with the ratchet surface 1216 of the wheel guard mount 1060. In this manner, the wheel guard 1100' is able to adjust rotationally relative to the wheel guard mount 1060, in a single rotational direction. The tightened compliant ring 1202 enables deliberate adjustment of the wheel guard, given sufficient exerted force. Thus, the wheel guard 1100' is both removable and adjustable without requiring auxiliary tools.

(Wheel Guard)

Figure 66:
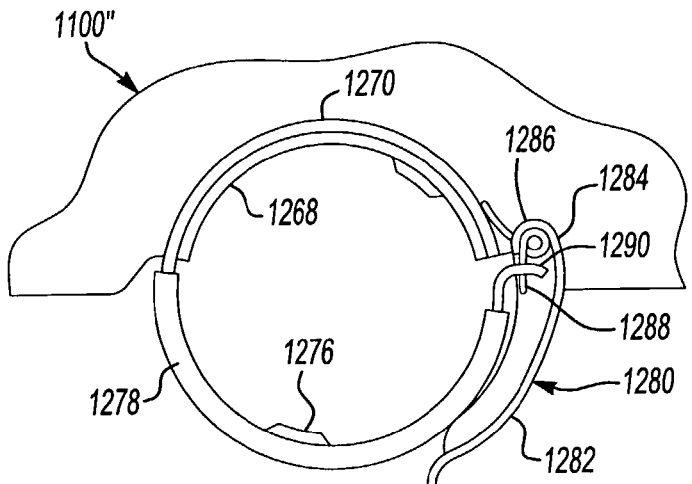
FIG. 66 is a plan view of another alternative embodiment of an adjustable wheel guard in a latched position.
Figure 67:
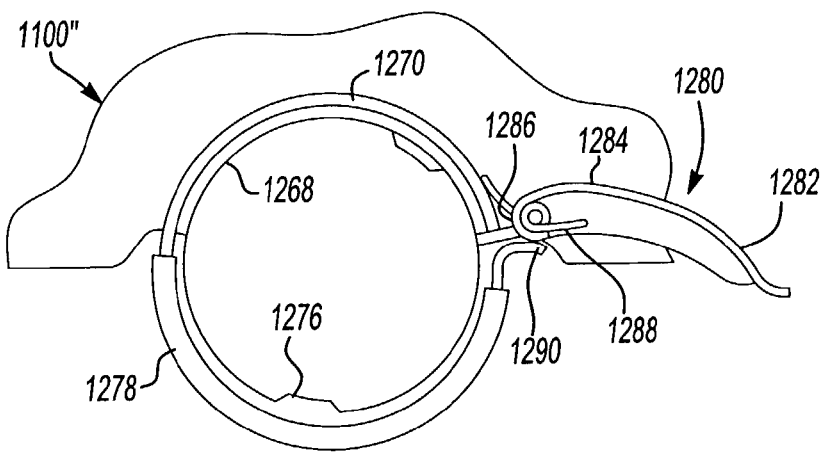
FIG. 67 is a plan view of the adjustable wheel guard of FIG. 66 in a unlatched position.
Figure 68:
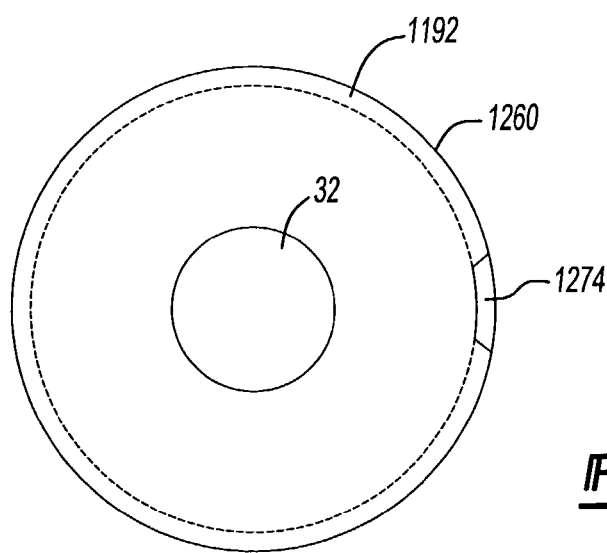
FIG. 68 is a top view of a wheel guard mount having a slot formed therein.

Referencing FIGS. 66-68, a third alternative embodiment of an adjustable and removable wheel guard 1100" is shown. The wheel guard 1100" includes a flange 1268, around which a spring ring 1270 is disposed. The spring ring 1270 is preferably fixedly attached to the flange 1268 of the wheel guard 1100" and is sprung around the wheel guard mount 1060 of the gear case 18. The wheel guard mount 1060 includes a groove 1192 (FIG. 68) formed about an external circumference and a relief notch 1274. A tab 1276 of the spring ring 1270 is slidably disposed within the groove 1192. The tab 1276 and groove 1192 interface prohibits the wheel guard 1100" from being pulled from the wheel guard mount 1060. A semi-circular rubber sleeve 1278 is also provided, through which the spring ring 1270 is disposed. The biasing force of the spring ring 1270, in concert with the frictional force provided between the rubber sleeve 1278 and the wheel guard mount 1060 secures the wheel guard 1100" in a fixed position relative to the gear case 18.

Rotational adjustment of the wheel guard 1100" relative to the gear case 18 is provided by a lever mechanism 1280. The lever mechanism 1280 includes a lever arm 1282 pivotally attached to the wheel guard 1100". The lever arm 1282 includes a first end 1284 defining a cam surface 1286 and is biased in a closed position by a coil spring 1288. In the closed position, the cam surface 1286 is out of contact with a curved end 1290 of the spring ring 1270. The lever arm 1282, is pivotable against the biasing force of the spring 1288, towards an open position. As the lever arm 1282 pivots toward the open position, the cam surface 1286 slidably engages the curved end 1290 of the spring ring 1270, pushing the spring ring 1270 open, thus relieving pressure around the wheel guard mount 1060. With the pressure about the wheel guard mount 1060 relieved, the wheel guard 1100" is rotationally adjustable therearound.

To remove the wheel guard 1100" from the wheel guard mount 1060, the lever arm 1282 is actuated to the open position, and the wheel guard 1100" is rotated until the tab 1276 aligns with the relief notch 1274. This is best shown in FIG. 68. Once aligned, the wheel guard 1100" can be pulled free from engagement with the wheel guard mount 1060 as the tab 1276 is disengaged from the groove 1192 through the relief notch 1274. In this manner, the wheel guard 1100" is both removable and adjustable without requiring any auxiliary tools.

(Tool-less Adjustable Guard)

Figure 69:
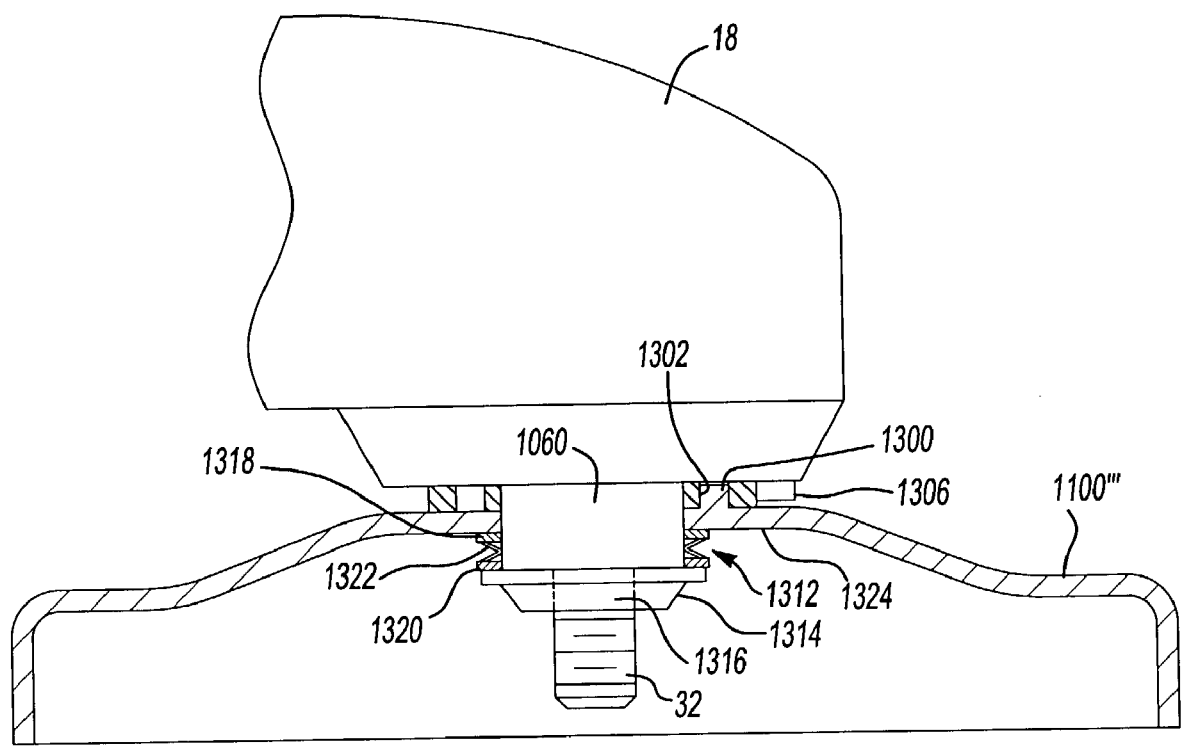
FIG. 69 is a side, partial cross-sectional view of a hand adjustable wheel guard.
Figure 70:
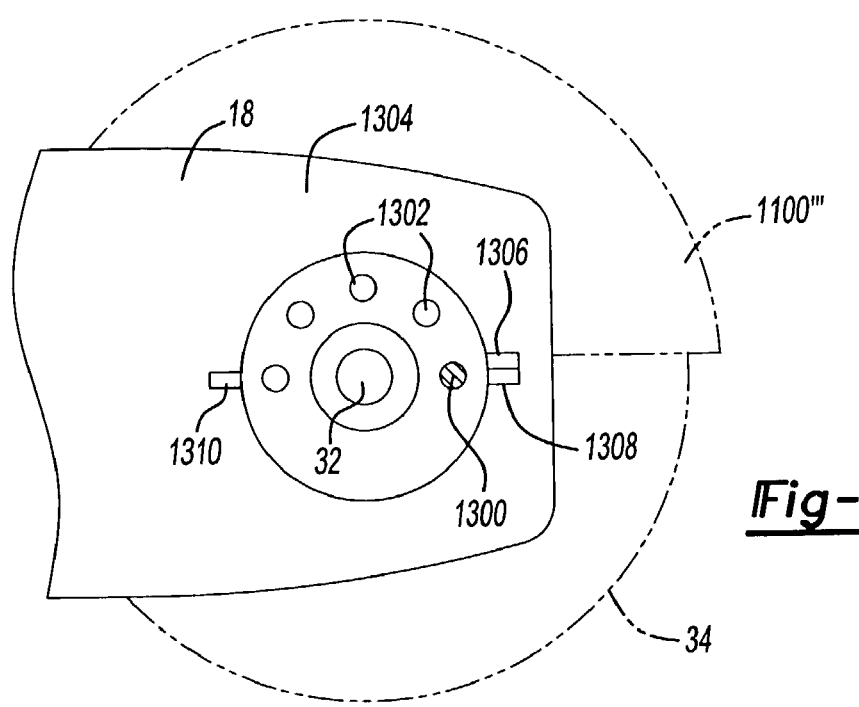
FIG. 70 is a bottom view of a large angle grinder that implements the hand adjustable wheel guard of FIG. 69.

Yet another alternative embodiment of an adjustable wheel guard 1100''' is detailed in FIGS. 69 and 70. The wheel guard 1100''' is rotatably disposed about the wheel guard mount 1060 and includes an upward extending locator pin 1300. The locator pin 1300 may be selectively receivable into one of a plurality of holes 1302 formed in a semi-circular pattern on a bottom face 1304 of the gear case 18 (best shown in FIG. 70). The wheel guard 1100''' also includes an upward extending blocking tab 1306 that interfaces with one of either two formed structures 1308, 1310 of the gear case 18 for limiting the range of rotation of the wheel guard 1100''' about the wheel guard mount 1060. The formed structures 1308, 1310 are disposed on either end of the semi-circular hole pattern.

The wheel guard 1100''' is retained on the wheel guard mount 1060 by a spring pack 1312 and a retention nut 1314. The retention nut 1314 is screwed onto an intermediate threaded portion 1316 of the wheel spindle 32, whereby the spring pack 1312 and wheel guard 1100''' are disposed and retained between the retention nut 1314 and the wheel guard mount 1060. The spring pack 1312 biases the wheel guard 1100''' up against the wheel guard mount 1060, biasing the locator pin 1300 into engagement with one of the plurality of holes 1302. The spring pack 1312 includes first and second washers 1318, 1320 having a spring washer set 1322 disposed therebetween. The first washer 1318 seats against an inside face 1324 of the wheel guard 1100''' and the second washer 1320 is grounded against the retention nut 1314.

To rotationally adjust the wheel guard 1100''' about the wheel guard mount 1060, force is applied to the wheel guard 1100''', axially in the direction of the wheel spindle axis. In this manner, the wheel guard 1100''' is depressed against the bias force of the spring pack 1312, disengaging the locator pin 1300 from the hole 1302, whereby the wheel guard 1100''' is rotationally adjustable about the wheel guard mount 1060. To lock the wheel guard 1100''' in a desired position, downward force is relieved from the wheel guard 1100''' and the spring pack 1312 again biases the locate pin 1300 into engagement with one of the plurality of holes 1302.

Miscellaneous (Rubber Bump)

An exemplary embodiment of the LAG 10, as shown in FIG. 1, includes a bumper 1350 located on a top face 1352 of the housing 12. The bumper 1350 is shown attached to the gear case 18, however, it is anticipated that the bumper 1350 may be positioned anywhere along the housing 12, as desired. The bumper 1350 is preferably made from rubber, plastic or other material that is lightweight and elastic. The bumper 1350 provides a support structure to lie the LAG 10 against when not in use and easily pick-up the LAG 10 for use.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gear case for a power tool, comprising:
 a housing portion including an inner wall and an outer wall, said inner wall defining a gear well portion adapted for receiving a drive gear and a driven gear therein, said inner wall being disposed between said outer wall and said gear well portion and said inner and outer walls defining an air flow cavity therebetween;
 a wheel spindle cavity disposed in said inner wall on an opposite side from said air flow cavity, said wheel spindle cavity being adapted to receive a spindle of the driven gear therein;
 an air bleed hole disposed in said inner wall connected between said wheel spindle cavity and said air flow cavity, said air bleed hole being substantially conical in shape with a narrow end thereof opening into said air flow cavity and a wide end thereof opening into said wheel spindle cavity.

2. The gear case according to claim 1, further comprising a plurality of baffled openings disposed on said outer wall in fluid communication with said air flow cavity.

3. A gear case for a power tool, comprising:
 a housing including a wall portion defining a gear well adapted for receiving a drive gear and a driven gear therein;
 a wheel spindle cavity disposed in an interior side of said wall portion, said wheel spindle cavity being adapted to support an end of a spindle of the driven gear therein;
 an air bleed hole disposed in said wall portion connected directly between said wheel spindle cavity and an outer surface of said wall portion; and
 a porous material disposed in said wheel spindle cavity over said air bleed hole.

4. The gear case according to claim 3, wherein said air bleed hole is substantially conical in shape with a wide end thereof opening into said wheel spindle cavity.

5. A gear case for a power tool, comprising:
 a housing including a wall portion defining a gear well adapted for receiving a drive gear and a driven gear therein;
 a wheel spindle cavity disposed in an interior side of said wall portion, said wheel spindle cavity being adapted to support an end of a spindle of the driven gear therein; and
 an air bleed hole disposed in said wall portion connected directly between said wheel spindle cavity and an outer surface of said wall portion, said air bleed hole being substantially conical in shape with a wide end thereof opening into said wheel spindle cavity.

6. A gear case for a power tool, comprising:

a housing portion including an inner wall and an outer wall, said inner wall defining a gear well portion adapted for receiving a drive gear and a driven gear therein, said inner wall being disposed between said outer wall and said gear well portion and said inner and outer walls defining an air flow cavity therebetween;

a wheel spindle cavity disposed in said inner wall on an opposite side from said air flow cavity, said wheel spindle cavity being adapted to receive a spindle of the driven gear therein;

an air bleed hole disposed in said inner wall connected between said wheel spindle cavity and said air flow cavity; and a porous material disposed over said air bleed hole.

* * * * *

UNITED STATES PATENT AND TRADEMARK OFFICE
CERTIFICATE OF CORRECTION

PATENT NO.        : 7,537,065 B2                                    Page 1 of 1
APPLICATION NO.   : 10/339634
DATED             : May 26, 2009
INVENTOR(S)       : William Gallagher et al.

It is certified that error appears in the above-identified patent and that said Letters Patent is hereby corrected as shown below:

On Title Page,
Item (56), References Cited, U.S. PATENT DOCUMENTS, insert the following:

--4,941,292   7/1990   Rudolf et al--.

Signed and Sealed this

First Day of September, 2009

David J. Kappos
*Director of the United States Patent and Trademark Office*